United States Patent
Umamoto

(10) Patent No.: US 11,151,592 B2
(45) Date of Patent: Oct. 19, 2021

(54) DEVICE FOR EVALUATING ENERGY-SAVING PROMOTION ACHIEVEMENT

(71) Applicant: NIHON TECHNO CO., LTD., Tokyo (JP)

(72) Inventor: Eiichi Umamoto, Tokyo (JP)

(73) Assignee: NIHON TECHNO CO., LTD.

(*) Notice: Subject to any disclaimer, the term of this patent is extended or adjusted under 35 U.S.C. 154(b) by 231 days.

(21) Appl. No.: 16/464,323

(22) PCT Filed: Nov. 13, 2017

(86) PCT No.: PCT/JP2017/040805
§ 371 (c)(1),
(2) Date: May 28, 2019

(87) PCT Pub. No.: WO2018/101018
PCT Pub. Date: Jun. 7, 2018

(65) Prior Publication Data
US 2021/0110420 A1    Apr. 15, 2021

(30) Foreign Application Priority Data
Nov. 29, 2016  (JP) .............................. JP2016-231761

(51) Int. Cl.
*G06Q 30/02* (2012.01)
*G06Q 30/00* (2012.01)
(Continued)

(52) U.S. Cl.
CPC ....... *G06Q 30/0211* (2013.01); *G06Q 30/018* (2013.01); *G06Q 30/0205* (2013.01);
(Continued)

(58) Field of Classification Search
CPC .................................................... G06Q 30/02
See application file for complete search history.

(56) References Cited

U.S. PATENT DOCUMENTS 9,310,785 B2 * 4/2016 Otsuki ................... G05B 13/02
9,523,587 B2   12/2016 Labate et al.
(Continued)

FOREIGN PATENT DOCUMENTS

CN   102724325 A    10/2012
CN   111967777 A *  11/2020  ............. G06Q 10/06
(Continued)

OTHER PUBLICATIONS

Incentives for rescheduling residential electricity consumption to promote renewable energy usage (English), C. Akasiadis; K. Panagidi; N. Panagiotou; P. Smani; A. Morton; I. A. Vetsikas; L. Mavrouli; K. Goutsias, 2015 SAI Intelligent System Conference (IntelliSys) (pp. 328-337), Nov. 1-2 (Year: 2015).*

(Continued)

*Primary Examiner* — Marilyn G Macasiano
(74) *Attorney, Agent, or Firm* — Harness, Dickey & Pierce, P.L.C.

(57) ABSTRACT

An energy-saving promotion achievement-evaluating device is provided in which: a population-constituting user identification information-obtaining unit comprises a population-constituting group identification information-obtaining means for obtaining population-constituting group identification information for obtaining, as comparison targets, a plurality of groups identified by group identification information for identifying a group constituted by a plurality of pieces of user identification information as the comparison target; and an energy-saving promotion achievement evaluation result-obtaining unit comprises a group-energy-saving promotion achievement evaluation result-obtaining means for obtaining energy consumption achievement data of the group identified by the population-constituting group identification information obtained by the population-constituting group identification information-obtaining means as an (Continued)

energy-saving promotion achievement evaluation result in association with the group identification information on the basis of the held energy-saving evaluation rule.

16 Claims, 39 Drawing Sheets

(51) Int. Cl.
  *G06Q 30/06* (2012.01)
  *G06Q 50/06* (2012.01)
  *G06F 16/22* (2019.01)
(52) U.S. Cl.
  CPC ..... *G06Q 30/0222* (2013.01); *G06Q 30/0641* (2013.01); *G06Q 50/06* (2013.01); *G06F 16/22* (2019.01)

(56) References Cited

U.S. PATENT DOCUMENTS

| | | | | |
|---|---|---|---|---|
| 2010/0076835 | A1* | 3/2010 | Silverman | G06Q 30/02 705/14.33 |
| 2010/0161502 | A1 | 6/2010 | Kumazawa et al. | |
| 2010/0228601 | A1* | 9/2010 | Vaswani | G06Q 40/12 705/308 |
| 2011/0202195 | A1 | 8/2011 | Finch et al. | |
| 2012/0065792 | A1* | 3/2012 | Yonezawa | H02J 3/14 700/291 |
| 2015/0262267 | A1 | 9/2015 | Inoue et al. | |

FOREIGN PATENT DOCUMENTS

| | | | |
|---|---|---|---|
| JP | 2002-312575 | A | 10/2002 |
| JP | 2004-227082 | A | 8/2004 |
| JP | 2008-217679 | A | 9/2008 |
| JP | 2010146387 | A | 7/2010 |
| JP | 2012-088892 | A | 5/2012 |
| JP | 2012-170230 | A | 9/2012 |
| JP | 2012-194608 | A | 10/2012 |
| JP | 2012-247225 | A | 12/2012 |
| JP | 2014-226036 | A | 12/2014 |
| JP | 2016-012363 | A | 1/2016 |
| JP | 2016-158369 | A | 9/2016 |
| KR | 10-2011-0108473 | A | 10/2011 |
| RU | 2 502 051 | C2 | 12/2013 |
| WO | WO 2013/048964 | A1 * | 4/2013 ............... G06F 1/32 |
| WO | WO-2014-073439 | A1 | 5/2014 |

OTHER PUBLICATIONS

Korean Office Action for corresponding Application No. 10-2019-7018207 dated Nov. 30, 2020 (26 pages).

Russian Office Action for Application No. 2019120262/08(039470) dated Jan. 29, 2020 with English translation (11 pages).

Extended European Search Report for Application No. 17877248.9-1222 / 3550496 (PCT/JP2017040805) dated Apr. 8, 2020 (9 pages).

* cited by examiner

| energy-saving evaluation rule |
|---|
| saved amount of money |
| demand target value achievement rate |
| saved power amount |
| saved time (OFF TIME) |
| drop rate of maximum demand value |
| difference between previous maximum demand value and current maximum demand value |

Fig. 31

| other users | achievement rate |
|---|---|
| Gyu-don Ichi-ban | +12.3% |
| Gyu-don Fuji | +6.3% |
| Gyu-don America | +7.1% |
| Yoshida-ya | -2.1% |
| average | 5.9% |

VS

| user to be compared | achievement rate |
|---|---|
| Katsugyu | 3.0% |

| other users | achievement rate |
|---|---|
| Gyu-don Ichi-ban | +12.3% |
| Gyu-don Fuji | +6.3% |
| Gyu-don America | +7.1% |
| Yoshida-ya | -2.1% |
| Katsugyu | 3.0% |
| average | 5.32% |

VS

| user to be compared | achievement rate |
|---|---|
| Katsugyu | 3.0% |

| comparison attribute: business type of user | |
|---|---|
| restaurant business | ☆ |
| retailing | ☆ |
| education | ☆ |
| entertainment | ☆ |
| sport exercise | ☆ |
| accommodation | ☆ |
| medical service | ☆ |
| beauty salons/barbers | ☆ |
| ceremonial services | ☆ |
| factories (machining, assembling, inspection) | ☆ |
| warehouses | ☆ |
| ..... | |

| |
|---|
| family restaurant |
| Gyu-don chain |
| Chinese restaurant chain |
| Sushi restaurant |
| |
| |

| index calculated on the basis of energy-saving promotion achievement | evaluation result |
|---|---|
| evaluation by rate | |
| ranking evaluation | |
| evaluation by language | ex. energy-saved very well |
| evaluation by award | |

Fig. 37

DEVICE FOR EVALUATING ENERGY-SAVING PROMOTION ACHIEVEMENT

CROSS REFERENCE TO RELATED APPLICATIONS

This application is a National Stage Application of PCT/JP2017/040805 filed on Nov. 13, 2017 and published in Japanese as WO/2018/101018 on Jun. 7, 2018, which claims priority to Japanese Patent Application No. JP-2016-231761 filed on Nov. 29, 2016. All of the above applications are hereby expressly incorporated by reference herein in their entireties.

BACKGROUND

Technical Field

The present invention relates to a system for giving an incentive according to an energy-saving achievement in order to promote energy saving.

Related Art

Energy saving is important for measures against exhaustion of fossil fuels, reduction of loads on global environments, cost reduction and the like. Thus, various ideas have been given for promoting energy saving.

However, even though necessity of energy saving is recognized at an abstract level, giving motivation to perform the energy saving is not easy so that improvement of energy-saving achievements cannot be easily obtained.

Thus, ideas leading to the improvement of the energy-saving achievements and a system for motivating energy-saving activities have been in demand. Such a system includes a system described in Japanese Patent Laid-Open No. 2002-312575.

Japanese Patent Laid-Open No. 2002-312575 discloses a system which enables high energy-saving consciousness in power consumers by returning a result of an energy-saving achievement as a tangible form of financial products.

Specifically, the system is a power monitoring system comprising: a power measuring means for measuring a used power amount in a power consumer's house; a storage means for storing an actually used power amount for a predetermined period of time in the past; a calculating means for calculating expected power consumption amount which is a target value of power saving on the basis of the actually used power amount stored in this storage means; and a display means for contrastively displaying the expected power consumption amount calculated by the calculating means and the measured used power amount measured by the power measuring means. If a difference between the expected power consumption and the measured used power amount of a month corresponds to an electric charge of 1000 yen, for example, a financial product is purchased for the amount of 1000 yen. As a result, the financial products as the power consumer's assets are increased with the saved power amount and thus, the consumer works on energy saving more actively.

However, in Japanese Patent Laid-Open No. 2002-312575, the target value is calculated from the actually used power amount for the predetermined period of time in the past, and the comparison is made with the calculated target amount. Therefore, it basically means comparison with the energy-saving activities of the consumers themselves. Thus, motivation for energy saving by stimulating a competitive spirit with others has not been provided.

SUMMARY

In view of the aforementioned problem, the present invention intends to provide a system which can motivate energy saving by comparison with others.

More specifically, the present invention provides an energy-saving promotion achievement-evaluating device comprising:

a user comparison information-holding unit for holding user comparison information in which user identification information of a user working on energy saving is associated with comparison attributes, the comparison attributes being indexes suitable for mutual comparison on the basis of user attributes which are any one or more attributes of a business type, a business scale, an energy consumption area, family structure, and an energy consumption achievement of the user;

an energy consumption achievement data obtaining unit for obtaining energy consumption achievement data of the user in association with the user identification information;

an energy consumption achievement data-accumulating unit for accumulating the obtained energy consumption achievement data;

an energy-saving evaluation rule-holding unit for holding an energy-saving evaluation rule which is a rule for evaluating the energy-saving promotion achievement on the basis of the energy consumption achievement data;

a population-constituting user identification information-obtaining unit for obtaining population-constituting user identification information which is information for identifying users constituting a population appropriate as mutual comparison targets in terms of the user comparison attributes on the basis of energy consumption achievement data accumulated in the energy consumption achievement data-accumulating unit;

an energy-saving promotion achievement evaluation result-obtaining unit for obtaining the energy consumption achievement data of the user identified by the population-constituting user identification information obtained by the population-constituting user identification information-obtaining unit, as an energy-saving promotion achievement evaluation result in association with the user identification information on the basis of the held energy-saving evaluation rule; and an evaluation result-outputting unit for outputting the energy-saving promotion achievement evaluation result in association with the user identification information for enabling comparison of the energy-saving promotion achievement evaluation result with the energy-saving promotion achievement evaluation result of the user in the population or the energy-saving promotion achievement evaluation result of another user in the population, or with an index calculated on the basis of the energy-saving promotion achievement evaluation result of the user in the population or an index calculated on the basis of the energy-saving promotion achievement evaluation result of another user in the population.

Moreover, the present invention provides the energy-saving promotion achievement-evaluating device in which, in addition to the aforementioned feature:

the population-constituting user identification information-obtaining unit comprises a population-constituting group identification information-obtaining means for obtaining population-constituting group identification information for obtaining, as comparison targets, a plurality of groups identified by group identification information for identifying a group constituted by a plurality of pieces of the user identification information as the comparison target; and the energy-saving promotion achievement evaluation result-obtaining unit comprises a group-energy-saving promotion achievement evaluation result-obtaining means for obtaining the energy consumption achievement data of the group identified by the population-constituting group identification information obtained by the population-constituting group identification information-obtaining means as an energy-saving promotion achievement evaluation result in association with the group identification information on the basis of the held energy-saving evaluation rule.

Moreover, the present invention provides, in addition to the aforementioned feature, the energy-saving promotion achievement-evaluating device further comprising:

a user attribute information-holding unit for holding the user identification information of the user working on the energy saving in association with the user attributes which are any one or more attributes of the business type, the business scale, the energy consumption area, the family structure, and the energy consumption achievement of the user; and a user attribute information-managing unit for adding, deleting, and modifying the user attribute in association with the user identification information.

Moreover, the present invention provides, in addition to the aforementioned feature, the energy-saving promotion achievement-evaluating device in which the energy-saving evaluation rule-holding unit comprises a reduction rate comparison rule-holding means for holding, as an energy-saving evaluation rule, a reduction rate comparison rule which is a rule for comparing an energy consumption reduction rate within a predetermined period of time.

Moreover, the present invention provides, in addition to the aforementioned feature, the energy-saving promotion achievement-evaluating device in which the energy-saving evaluation-rule-holding unit comprises a reduction amount comparison rule-holding means for holding, as an energy-saving evaluation rule, a reduction amount comparison rule which is a rule for comparing an energy consumption reduction amount within a predetermined period of time.

Moreover, the present invention provides, in addition to the aforementioned feature, the energy-saving promotion achievement-evaluating device further comprising:

an incentive information-holding unit for holding the energy-saving promotion achievement evaluation result in association with incentive information; and an incentive information-outputting unit for outputting the incentive information in association with the user identification information and/or the group identification information on the basis of the energy-saving promotion achievement evaluation result obtained in association with the user identification information and/or the group identification information.

Moreover, the present invention provides, in addition to the aforementioned feature, an energy-saving promotion system consisting of a user terminal device associated with the user identification information and any one of the aforementioned energy-saving promotion achievement-evaluating devices.

Moreover, the present invention provides, in addition to the aforementioned feature, the energy-saving promotion system in which the user terminal device comprises an energy-saving promotion achievement evaluation result-obtaining unit for obtaining an energy-saving promotion achievement evaluation result output from an evaluation result-outputting unit.

Moreover, the present invention provides, in addition to the aforementioned feature, the energy-saving promotion system in which the user terminal device comprises the energy-saving promotion achievement-evaluating device according to invention 4 comprising an incentive information-obtaining unit for obtaining incentive information output from an incentive information-outputting unit. Moreover, the energy-saving promotion system is provided in which the incentive information is information configured capable of selecting a plurality of incentives by the incentive identification information, and the user terminal device comprises:

an incentive identification information-selecting unit for selecting the incentive identification information included in the obtained incentive information; and an incentive identification information-outputting unit for outputting the selected incentive identification information.

Moreover, the present invention provides, in addition to the aforementioned feature, the energy-saving promotion system further comprising an E-commerce server device for executing purchase and sale of goods and/or services via the Internet, the user terminal device further comprising an E-commerce server-using unit for executing commercial transaction with the E-commerce server device in accordance with the obtained incentive information.

Then, the present invention provides a processing method in executing the aforementioned processing by the energy-saving promotion achievement-evaluating device. Moreover, the present invention provides a processing method for the energy-saving promotion system in executing the aforementioned processing by the energy-saving promotion achievement-evaluating device and the user terminal device.

On the basis of the above, the present invention is to provide a system capable of motivating energy saving by comparison with the others.

BRIEF DESCRIPTION OF THE DRAWINGS

FIG. 31 is a diagram illustrating an example of what is considered to be an energy-saving evaluation rule.

FIG. 34 is a diagram illustrating an example of a method of energy-saving evaluation when an achievement rate comparison is selected as the energy-saving evaluation rule.

FIG. 35 is a diagram illustrating an example of a method of energy-saving evaluation different from that in FIG. 34 when the achievement rate comparison is selected as the energy-saving evaluation rule.

FIG. 36 is a diagram illustrating a list of business types of users as a comparison attribute.

FIG. 37 is a diagram illustrating an example of an index calculated on the basis of the energy-saving promotion achievement evaluation result.

DETAILED DESCRIPTION

Figure 1:
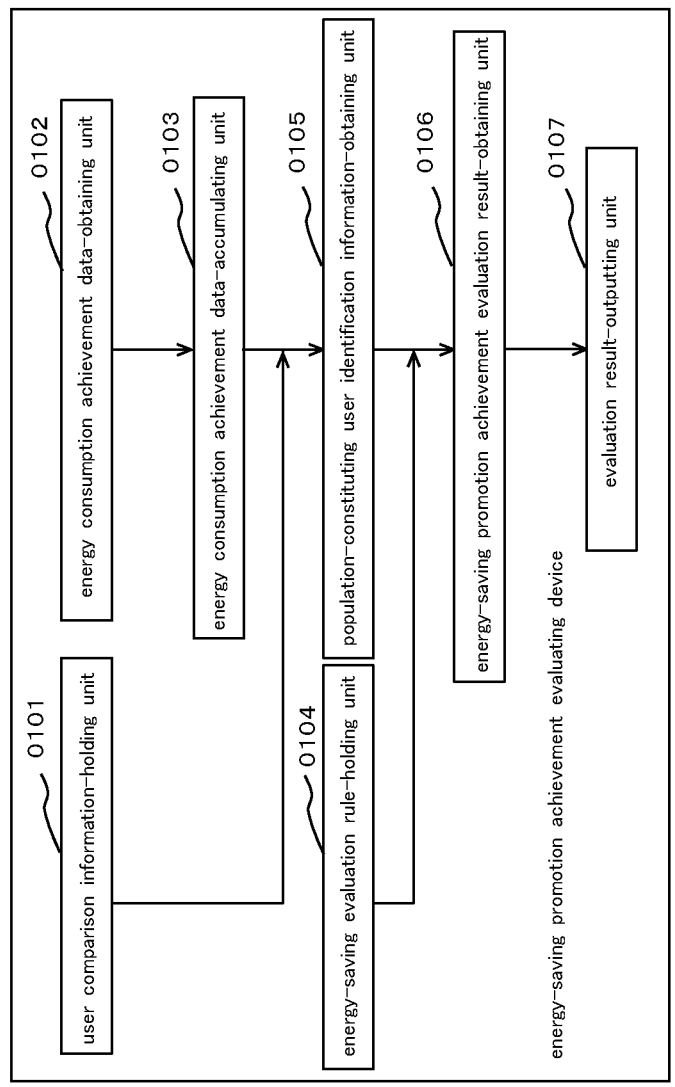
FIG. 1 is a diagram illustrating a functional configuration of an energy-saving promotion achievement-evaluating device in an embodiment 1.

Hereinafter, embodiments of the present invention will be described by using the attached drawings. Mutual relationships between the embodiments and inventions are as follows. The description of the embodiment 1 mainly relates to inventions 1 and 7, the description of the embodiment 2 mainly relates to inventions 2 and 7, the description of the embodiment 3 mainly relates to inventions 3 and 7, the description of the embodiment 4 mainly relates to inventions 4 and 7, the description of the embodiment 5 mainly relates to inventions 5 and 7, the description of the embodiment 6 mainly relates to inventions 6 and 7, the description of the embodiment 7 mainly relates to invention 8, the description of the embodiment 8 mainly relates to invention 9, the description of the embodiment 9 mainly relates to invention 10, and the description of the embodiment 10 mainly relates to invention 11. The present invention is not to be limited by these embodiments but can be put into practice in various aspects without departing from its spirit.

Embodiment 1

This embodiment is an energy-saving promotion achievement-evaluating device configured to: hold user identification information of a user working on energy saving and an energy-saving evaluation rule; obtain energy consumption achievement data of the user in association with the user identification information; accumulate the obtained energy consumption achievement data; obtain the energy consumption achievement data of the user identified by the population-constituting user identification information on the basis of the accumulated energy consumption achievement data as an energy-saving promotion achievement evaluation result in association with the user identification information on the basis of the held energy-saving evaluation rule; and output the energy-saving promotion achievement evaluation result in association with the user identification information. In addition, this embodiment provides an energy-saving promotion system consisting of the above-mentioned energy-saving promotion achievement-evaluating device and a user terminal device in association with the user identification information.

Figure 29:
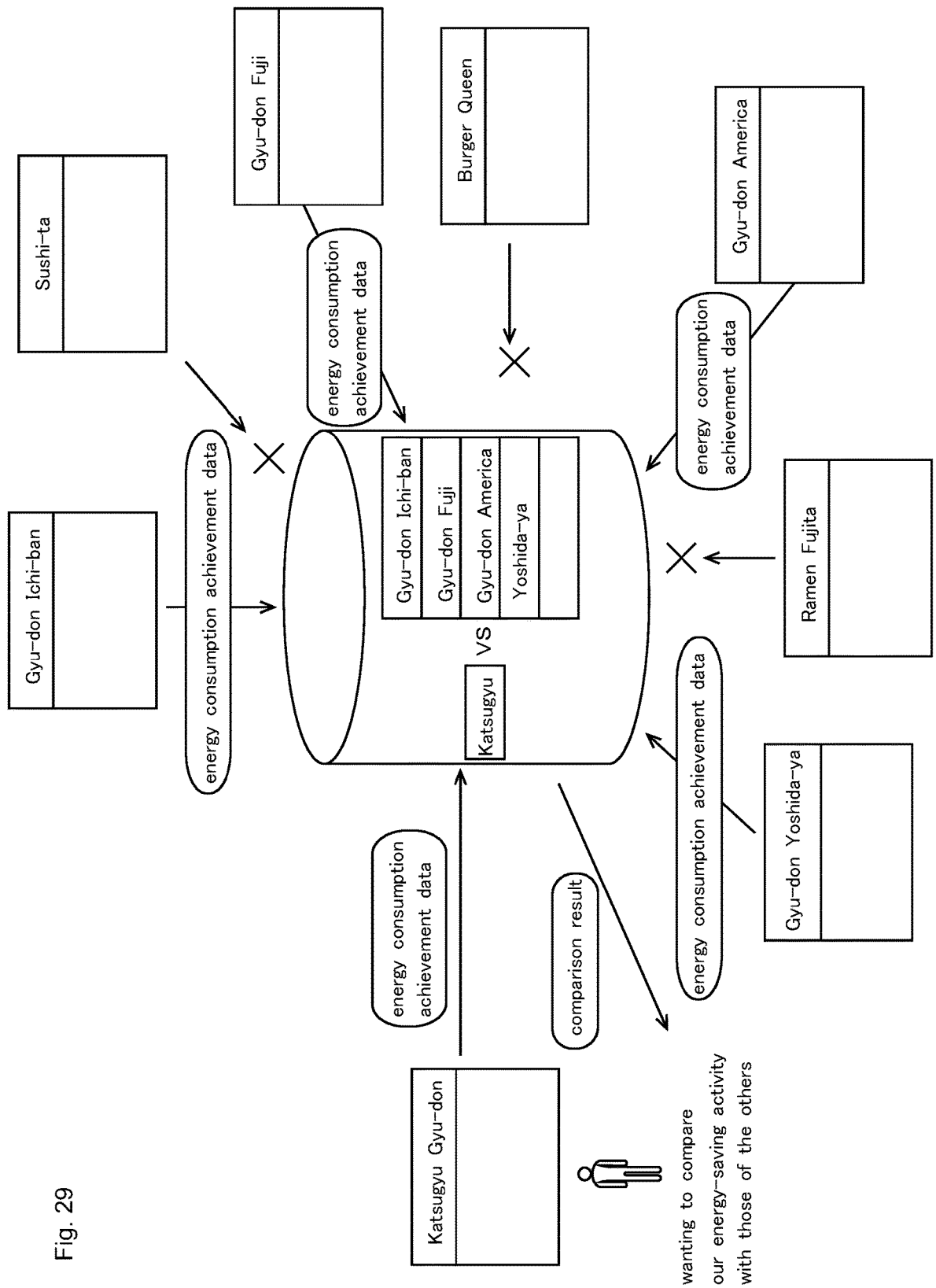
FIG. 29 is a diagram illustrating an example of an entire image in the embodiment 1.

FIG. 29 is a diagram illustrating an example of an entire image in this embodiment. Here, a case where an energy-saving promotion achievement evaluation result is acquired by using Gyu-don (bowl of rice topped with stewed beef) restaurants as a population is assumed. Assume that among eight restaurants of "Gyu-don Ichi-ban", "Sushi-ta", "Gyu-don Fuji", "Burger Queen", "Gyu-don America", "Ramen Fujita", "Gyu-don Yoshida-ya", and "Gyu-don Katsugyu", five restaurants of "Gyu-don Ichi-ban", "Gyu-don Fuji", "Gyu-don America", "Gyu-don Yoshida-ya", and "Gyu-don Katsugyu" are Gyu-don restaurants, the population would be these five restaurants. An energy-saving promotion achievement-evaluating device holds energy consumption achievement data received from the five restaurants. If "Gyu-don Katsugyu" wants to compare an energy-saving activity, for example, the energy-saving promotion achievement-evaluating device compares "Gyu-don Katsugyu" and an average value of the four restaurants of "Gyu-don Ichi-ban", "Gyu-don Fuji", "Gyu-don America", and "Gyu-don Yoshida-ya" or the like on the basis of an energy-saving evaluation rule and transmits the comparison result to "Gyu-don Katsugyu".

Figure 30:
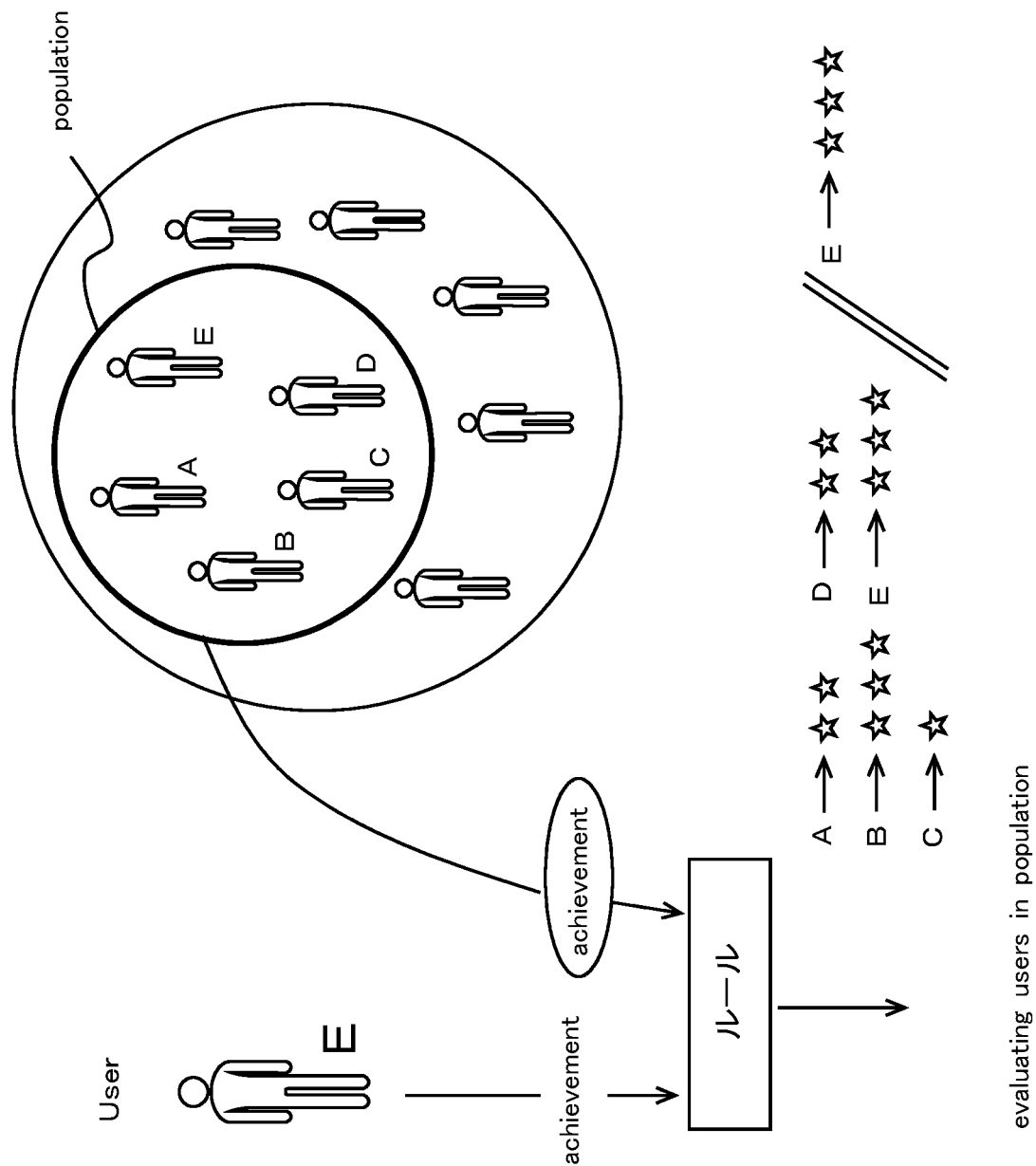
FIG. 30 is a diagram illustrating an example of contents of an energy-saving promotion achievement evaluation result acquired in this embodiment.

FIG. 30 is a diagram illustrating an example of contents of the energy-saving promotion achievement evaluation result acquired in this embodiment. In the population of five users A, B, C, D, and E, if the energy-saving promotion achievement evaluation result of the user E is to be acquired, for example, the energy consumption achievement data of the users A, B, C, D, and E is evaluated on the basis of the energy-saving evaluation rule so as to determine the evaluation of the users like the user A as "two stars", the user B as "three stars", the user C as "one star", the user D as "two stars", and the user E as "three stars", and as a result, the energy-saving promotion achievement evaluation result of the user E as "three stars" is acquired.

Hereinafter, the energy-saving promotion achievement-evaluating device in this embodiment will be described on a functional configuration, a hardware configuration, and a flow of processing in order.

Functional Configuration

FIG. 1 is a diagram illustrating the functional configuration of the energy-saving promotion achievement-evaluating device in this embodiment. The energy-saving promotion achievement-evaluating device in this embodiment comprises a user comparison information-holding unit (0101), an energy consumption achievement data-obtaining unit (0102), an energy consumption achievement data-accumulating unit (0103), an energy-saving evaluation rule-holding unit (0104), a population-constituting user identification information-obtaining unit (0105), an energy-saving promotion achievement evaluation result-obtaining unit (0106), and an evaluation result-outputting unit (0107). Hereinafter, details of each function will be described specifically for the functional configuration.

The "user comparison information-holding unit" is a function of holding user comparison information in which user identification information of a user working on energy saving is associated with comparison attributes, the comparison attributes being indexes suitable for mutual comparison on the basis of user attributes. The user attribute information is any one or more attributes of a business type, a business scale, an energy consumption area, family structure, and an energy consumption achievement of the user. As a result, fair comparison can be realized in the comparison in the population.

The "energy consumption achievement data-obtaining unit" is a function of obtaining energy consumption achievement data of the user in association with the user identification information. The "energy consumption achievement data-accumulating unit" is a function of accumulating the obtained energy consumption achievement data. This enables to obtain and accumulate the energy consumption achievement data to be a basis of the comparison in association with the user identification information.

The "energy-saving evaluation rule-holding unit" is a function of holding an energy-saving evaluation rule which is a rule for evaluating the energy-saving promotion achievement on the basis of the energy consumption achievement data. The energy-saving evaluation rule may be a ratio of energy consumption to the previous year or may be comparison of the energy consumption with a target value, for example. Moreover, the comparison may be acquired in a quantity or in a ratio. In addition, weighting may be made in the evaluation in accordance with a type or a nature of the energy. If gas or electricity tends to run short in winter and water tends to run short in summer, for example, necessity of energy-saving becomes higher for the energy which runs short more easily. Thus, by means of weighting such that the energy-saving evaluation of gas and electricity is emphasized in winter, while the energy-saving evaluation of water is emphasized in summer, energy-saving with higher necessity can be promoted strongly. Moreover, since the natures of the energy include those emitting more harmful substances such as carbon dioxide and those being cleaner, such weighting can be considered that purchase/use of clean energy is made more advantageous in evaluation, as can be expected from liberalization of power retail and the like. As a result, cleaner energy can be also promoted in addition to the promotion of energy saving.

FIG. 31 is a diagram illustrating an example of a prospective energy-saving evaluation rule. However, the energy-saving evaluation rule is not limited to the cited rule. The energy-saving evaluation rule can include a saved amount of money, a demand target value achievement rate, a saved power amount, saved time (OFF TIME), a drop rate of maximum demand value, a difference between the previous maximum demand value and the current maximum demand value, and the like.

Figure 32:
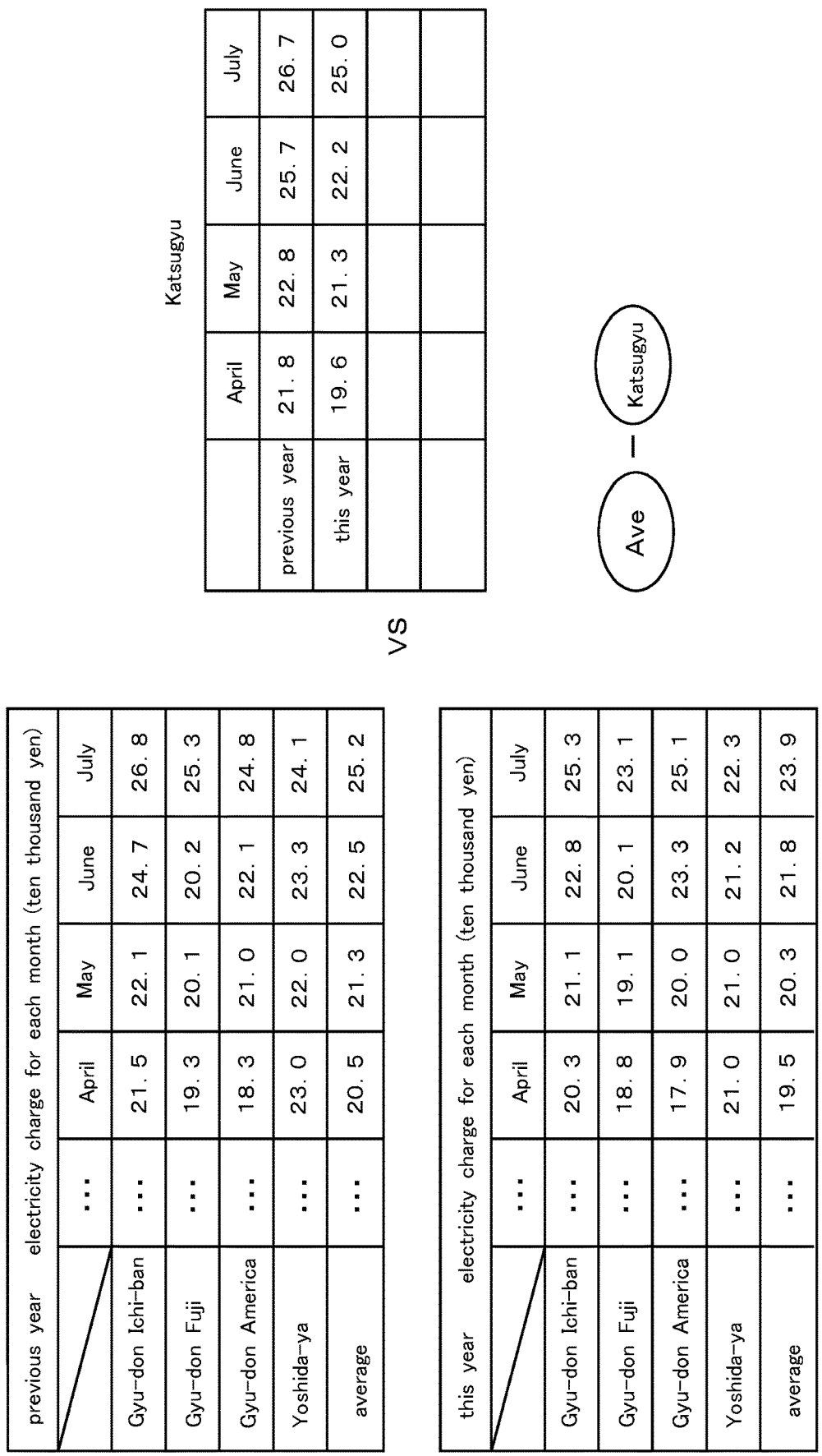
FIG. 32 is a diagram illustrating an example of a method of energy-saving evaluation when a saved amount of money is selected as the energy-saving evaluation rule.

FIG. 32 is a diagram illustrating an example of a method of energy-saving evaluation when the saved amount of money is selected as the energy-saving evaluation rule. For four restaurants of "Gyu-don Ichi-ban", "Gyu-don Fuji", "Gyu-don America", and "Yoshida-ya", electricity charges in each of April, May, June, and July of this year and the previous year are displayed with averages of the electricity charges of the four restaurants for each month in the unit of ten thousand yen. On the basis of that, the electricity charges of the user "Katsugyu" in each of April, May, June, and July of this year and the previous year are displayed in the unit of ten thousand yen, and the energy-saving promotion achievement evaluation result is acquired by a comparison method such as acquiring a difference between an average electricity charge of the four restaurants and the electricity charge of "Katsugyu" alone.

Figure 33:
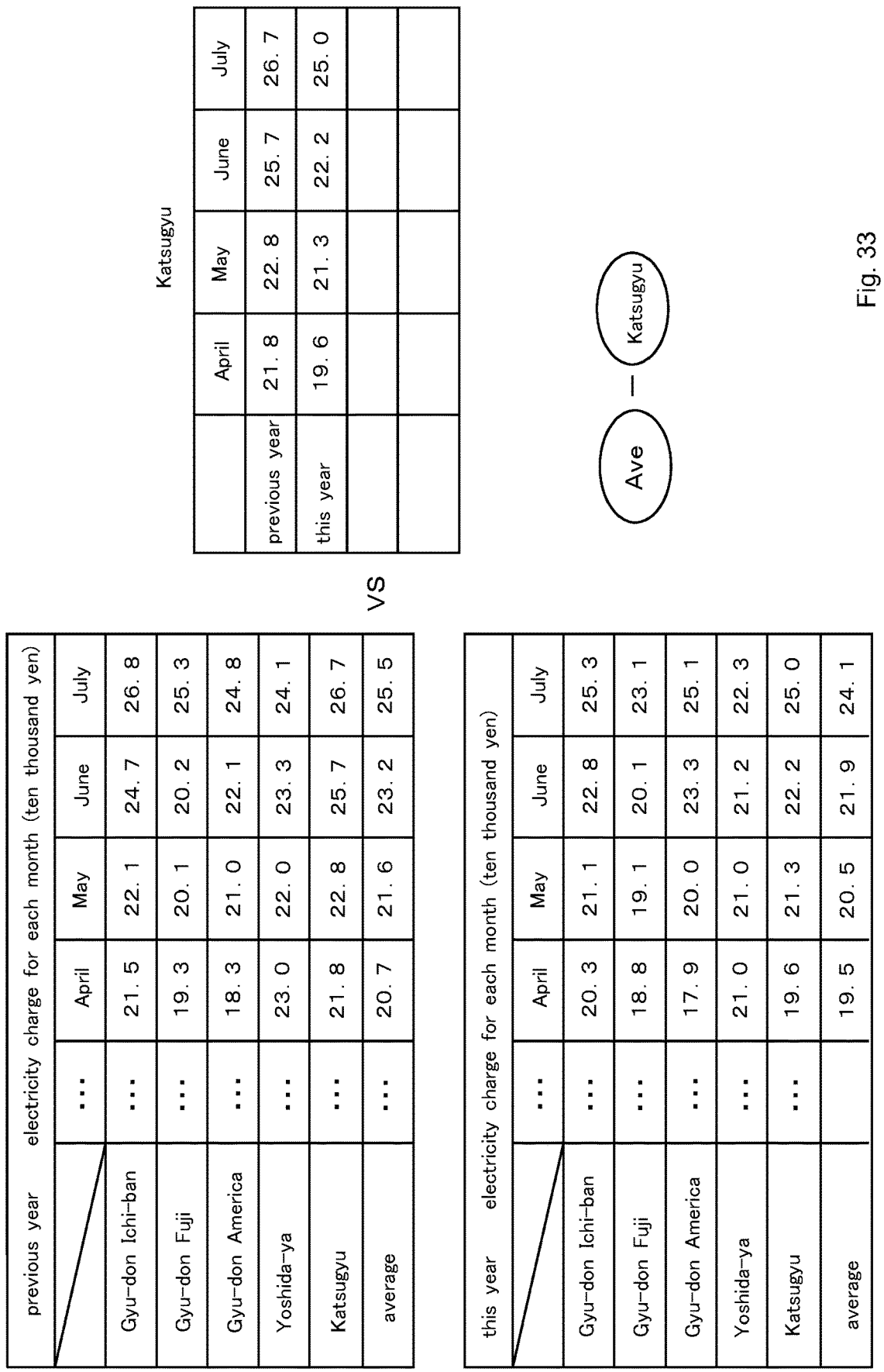
FIG. 33 is a diagram illustrating an example of a method of energy-saving evaluation different from that in FIG. 32 when the saved amount of money is selected as the energy-saving evaluation rule.

FIG. 33 is a diagram illustrating an example of a method of the energy-saving evaluation different from that in FIG. 32 when the saved amount of money is selected as the energy-saving evaluation rule. For five restaurants consisting of four restaurants of "Gyu-don Ichi-ban", "Gyu-don Fuji", "Gyu-don America", and "Yoshida-ya" as well as "Katsugyu" as a user, electricity charges in each of April, May, June, and July this year and the previous year are displayed with averages of the electricity charges of the five restaurants for each month in the unit of ten thousand yen. On the basis of that, the electricity charges of the user "Katsugyu" in each of April, May, June, and July of this year and the previous year are displayed in the unit of ten thousand yen, and the energy-saving promotion achievement evaluation result is acquired by a comparison method such as acquiring a difference between an average electricity charge of the five restaurants including the user "Katsugyu" and the electricity charge of "Katsugyu" alone.

FIG. 34 is a diagram illustrating an example of a method of the energy-saving evaluation when an achievement rate comparison is selected as the energy-saving evaluation rule. The achievement rates of the four restaurants of "Gyu-don Ichi-ban", "Gyu-don Fuji", "Gyu-don America", and "Yoshida-ya" are displayed with an average of the four restaurants. On the basis of that, the achievement rate of the user "Katsugyu" is displayed, and the energy-saving promotion achievement evaluation result is acquired by a comparison method such as acquiring a difference between an average achievement rate of the four restaurants and the achievement rate of "Katsugyu" alone.

FIG. 35 is a diagram illustrating an example of a method of energy-saving evaluation different from that in FIG. 34 when the achievement rate comparison is selected as the energy-saving evaluation rule. The achievement rates of the five restaurants including the four restaurants of "Gyu-don Ichi-ban", "Gyu-don Fuji", "Gyu-don America", and "Yoshida-ya" as well as the user "Katsugyu" are displayed with an average of the five restaurants. On the basis of that, the achievement rate of the user "Katsugyu" is displayed, and the energy-saving promotion achievement evaluation result is acquired by a comparison method such as acquiring a difference between an average achievement rate of the five restaurants including the user "Katsugyu" and the achievement rate of "Katsugyu" alone.

The "population-constituting user identification information-obtaining unit" is a function of obtaining population-constituting user identification information which is information for identifying users constituting a population appropriate as mutual comparison targets in terms of the user comparison attributes on the basis of energy consumption achievement data accumulated in the energy consumption achievement data-accumulating unit. Specific examples of the attributes constituting the population appropriate as mutual comparison targets can be as follows.

The "business type of the user" specifically includes:

restaurant business (family restaurants, Japanese restaurants, Sushi restaurants, seafood restaurants, Soba restaurants, Udon restaurants, Japanese eel restaurants, Yakitori restaurants, Tonkatsu restaurants, Kushikatsu restaurants, Tempura restaurants, Okonomi-yaki restaurants, Monj a-yaki restaurants, Shabu-shabu restaurants, Okinawan restaurants, French restaurants, Italian restaurants, Spanish restaurants, Chinese restaurants, Korean restaurants, Thai restaurants, creative cuisine/original cuisine restaurants, Ramen restaurants, curry shops, grilled meat restaurants, coffeehouses, bakeries, sweets shops and the like); general constructors/specialized constructors; professionals, consultants; printers/publishers; advertising agencies/marketing agencies; IT/information communication; facility constructors; real estate/leasing; manufacture/processing; transportation/cargo/warehouses; outsourcing; building maintenance; retailers/wholesalers; trading companies/trading firms; waste treatment; leasing/rental; event organizers; agriculture; translation/interpretation; writers/artists; connoisseurs; mining; repairing; fisheries; forestry; and the like.

The "business scale" includes the number of seats, the number of employees, the number of customers, a business site area, a business site facility scale, a business site production, a business site storage amount, a business site distribution amount, a business site sales, a business site processed amount, and the like.

The "energy consumption area" includes prefectures such as Hokkaido, Tohoku, Kanto, Kyushu, and Okinawa and municipalities or the Edo-gawa river basin, Nara valley area, and the like.

The "family structure" includes the number of family members, family structure, ages of the family members, life patterns of the family members, commuting time of the family members, average residence time in home of the family members, a house layout, and the like.

The "energy consumption achievement" includes daily average power consumption, weekly average power consumption, monthly average power consumption, annual average power consumption, and the like.

The others are generated on the basis of "structure of a building (including adiathermancy, heat insulation properties, outside-air circulation amount)", "sunshine on the building", "type of electric company in use", "types and numbers of home electric appliances", "used amount of home electric appliances", "used amount of gas", "used amount of heating/cooking equipment", "generation amount of indoor steam", "heat generation amount of upper, lower, right and left adjacent facilities and upper, lower, right and left adjacent houses", "the number of persons in the room (including employees and worker)", "heat generation amounts of working machines, storage devices, heating/cooling devices, servers, computers and the like", "generated or absorbed heat amounts of articles carried into a plant building from outside", "steam amount generated in a plant building", "annual average temperature, monthly average temperature of a location", "annual average humidity, monthly average humidity of a location" and the like. Specifically, it can be considered that the population can be constituted by: business types/business scales expected to consume the same degree of energy; areas with the similar climate since there is naturally a difference in seasonal energy consumption between Okinawa and Hokkaido, for example; or the family structures or lifestyles, since there is also a difference depending on the family structure or whether the family stays in the house or not during the daytime. Moreover, at a stage where energy consumption achievement or energy-saving promotion achievement has been accumulated, the population constituted by or on the basis of the energy consumption achievement or energy-saving promotion achievement may be slightly modified in order to stimulate a competitive spirit among those having approximately the same degree of energy-saving achievements. Then, in the comparison among the populations having superior energy-saving promotion achievements, for example, if a user with more excellent energy-saving result is made to get a higher incentive than usual, such an effect can be expected that users will make steady efforts in energy saving since they want to join the higher class of energy-saving promotion achievement population. That is because the energy-saving promotion achievement can be evaluated correctly by obtaining the population appropriate for the mutual comparison.

Assume a case in which the population is created by using the "energy consumption achievement", the "business type of users", and the "number of seats". In this case, if the business type of the user is a dining bar and the number of seats is approximately 50, for example, four populations are constituted by a group A with the daily average power consumption of 1000 to 1500 kwh, a group B with the daily average power consumption of 1500 to 2000 kwh, a group C with the daily average power consumption of 2000 to 2500 kwh, and a group D with the daily average power consumption of 2500 to 3000 kwh from the higher group in order. If a dining bar C1 belonging to the population group C has the power consumption of 250 kwh in the previous day and a condition that "grade-up to a higher population group will give a 10-yen rise in payment by hour to a worker working in the dining bar", those working in the dining bar C1 would make efforts in energy saving more actively from the next day to achieve the power consumption of 2000 kwh or less. The "energy consumption reduction rate" may be used instead of the "energy consumption achievement".

This promotion or demotion processing may be configured to be automatically calculated by a promotion/demotion unit provided in the energy-saving promotion achievement-evaluating device.

FIG. 36 is a diagram illustrating a list of the business types of the users as a comparison attribute. Large categories include restaurant business, retailing, education, entertainment, sport exercise, accommodation, medical service, beauty salons/barbers, ceremonial services, factories (machining, assembling, inspection), warehouses and the like, and small categories in the restaurant business include the family restaurants, Gyu-don chains, Chinese restaurant chain, Sushi restaurant and the like. If the business type of the user is the Gyu-don restaurant chain, for example, the star of the restaurant business is selected and then, the "Gyu-don restaurant chain" is selected as its small category.

The "energy-saving promotion achievement evaluation result-obtaining unit" is a function obtaining the energy consumption achievement data of the user identified by the population-constituting user identification information obtained by the population-constituting user identification information-obtaining unit, as an energy-saving promotion achievement evaluation result in association with the user identification information on the basis of the held energy-saving evaluation rule. The "evaluation result-outputting unit" is a function of outputting the energy-saving promotion achievement evaluation result in association with the user identification information for enabling comparison of the energy-saving promotion achievement evaluation result with the energy-saving promotion achievement evaluation result of the user in the population or the energy-saving promotion achievement evaluation result of another user in the population, or with an index calculated on the basis of the energy-saving promotion achievement evaluation result of the user in the population or an index calculated on the basis of the energy-saving promotion achievement evaluation result of another user in the population. Contents of the energy-saving promotion achievement evaluation result are generally relative comparison values in the population acquired in amount or rate in comparison with the energy consumption in the previous year or a target value of the energy consumption. In addition, a rank in the population and a rise/drop of the rank with respect to the previous year or the previous month may be indicated by characters, numeral values, illustration of faces, or the like, for example. The illustration of faces may be such that a laughing face is displayed for the rank rise and a sad face is displayed for the rank drop, for example. The energy-saving promotion achievement evaluation result may be configured to be obtained from all the users in the population or may be configured to be obtained from a part of users in the population.

Furthermore, the evaluation result-outputting unit may be configured so that the ranks or the evaluation results of the other users can be viewed. As a result, not only that the competitive spirit is stimulated but also if a user has an excellent rank in the population, an objective index that that user has actively promoted energy saving is indicated to the other users, which leads to honor of that user. Moreover, if a plurality of members are present in a user such as a restaurant, for example, it may be so configured that the members are evaluated or ranked for competition in the user or for giving honor and the results are viewed by the others. For that purpose, the energy-saving promotion achievement-evaluating device may further comprise a member registration unit for registering members constituting the user and obtain energy consumption achievement data for each member.

FIG. 37 is a diagram illustrating an example of an index calculated on the basis of the energy-saving promotion achievement evaluation result. The evaluation can be evaluation by the rate, ranking evaluation, evaluation by language such as "energy-saved very well", evaluation by award and the like, for example.

Hardware Configuration

A hardware configuration of the energy-saving promotion achievement-evaluating device in this embodiment will be described by using the drawings.

Figure 2:
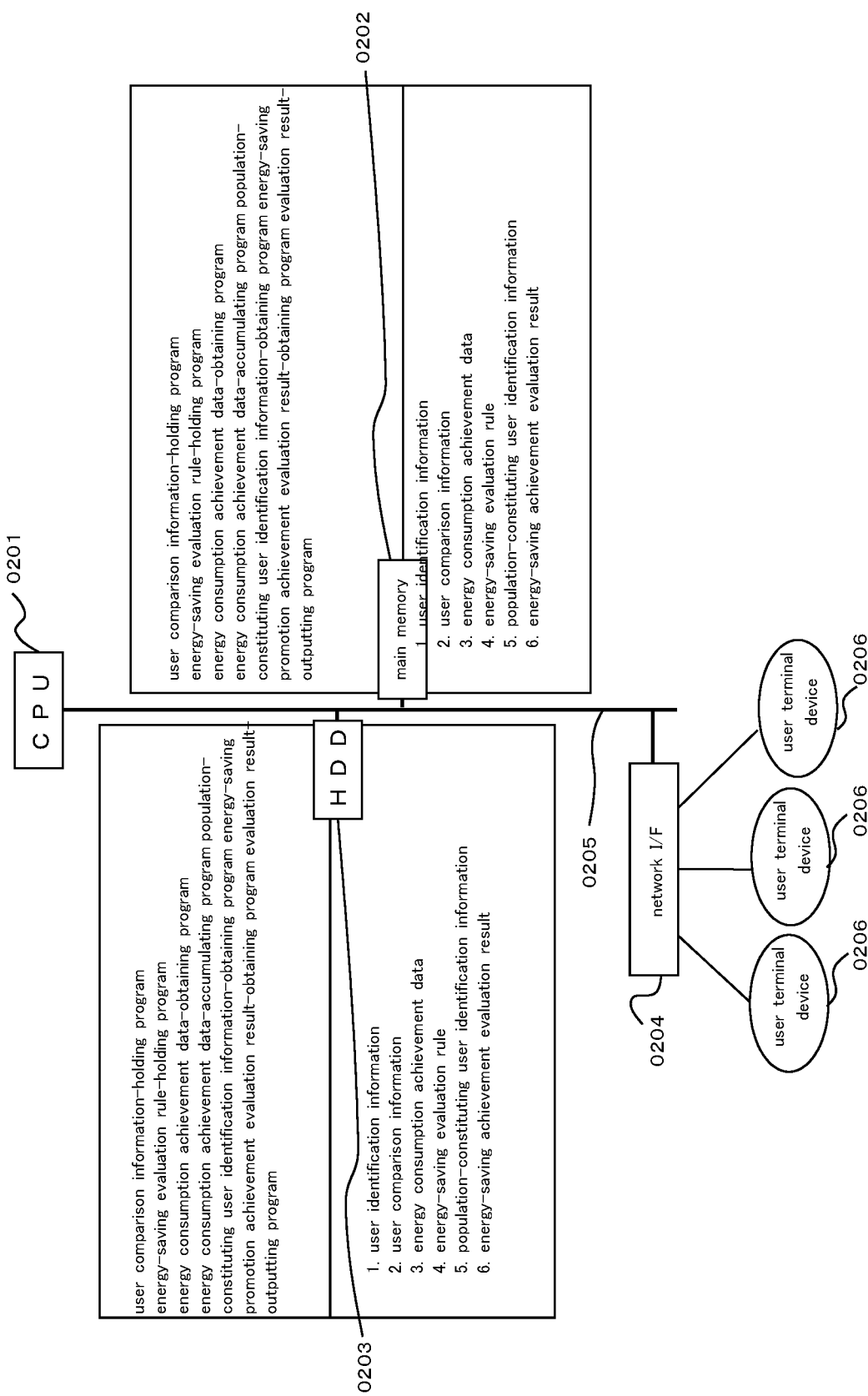
FIG. 2 is a diagram illustrating a hardware configuration of the energy-saving promotion achievement-evaluating device in the embodiment 1.

FIG. 2 is a diagram illustrating a hardware configuration of the energy-saving promotion achievement-evaluating device in this embodiment. As illustrated in this diagram, the energy-saving promotion achievement-evaluating device in this embodiment comprises a "CPU (central processing unit)" (0201) for executing various types of calculation processing and a "main memory" (0202). Moreover, it comprises an "HDD" (0203) for holding predetermined information and a "network I/F (interface)" (0204) for conducting transmission/reception of information with a user terminal device (0206) associated with a plurality of pieces of the user identification information. Then they are mutually connected via a data communication path such as a "system bus" (0205) and conducts transmission/reception and processing of the information.

Here, the "main memory" reads out programs for executing various types of processing so as to have them executed by the "CPU" and also provides a work area which is also a work region of the programs. Moreover, a plurality of addresses are assigned to each of the "main memory" and the "HDD", and the program executed by the "CPU" is capable of exchange and processing of data by specifying the address for an access. In this embodiment, the programs stored in the "main memory" are a user comparison information-holding program, an energy-saving evaluation rule-holding program, an energy consumption achievement data-obtaining program, an energy consumption achievement data-accumulating program, a population-constituting user identification information-obtaining program, an energy-saving promotion achievement evaluation result-obtaining program, and an evaluation result-outputting program. Moreover, the "main memory" and the "HDD" store: user identification information of the user promoting energy saving; user comparison information which is information associated with comparison attributes, the comparison attributes being indexes suitable for mutual comparison on the basis of user attributes; energy consumption achievement data; an energy-saving evaluation rule which is a rule for evaluating the energy-saving promotion achievement; population-constituting user identification information which is information for identifying users constituting a population appropriate as mutual comparison targets; an energy-saving promotion achievement evaluation result; and the like.

The "CPU" executes the energy consumption achievement data-obtaining program stored in the "main memory" so as to obtain the energy consumption achievement data of the user in association with the user identification information from the user terminal device via the "network interface". Then it executes the energy consumption achievement data-accumulating program stored in the "main memory" so as to accumulate the obtained energy consumption achievement data. Then it executes the population-constituting user identification information-obtaining program stored in the "main memory" so as to obtain the population-constituting user identification information which is information for identifying users constituting the population appropriate as mutual comparison targets in terms of the user comparison attributes on the basis of the accumulated energy consumption achievement data. Then it executes the energy-saving promotion achievement evaluation result-obtaining program stored in the "main memory" so as to obtain the energy consumption achievement data of the user identified by the population-constituting user identification information as the energy-saving promotion achievement evaluation result in association with the user identification information based on the held energy-saving evaluation rule. Lastly, it outputs the energy-saving promotion achievement evaluation result in association with the user identification information to the user terminal device via the "network interface" by executing the evaluation result-outputting program stored in the "main memory".

Flow of Processing

Figure 3:
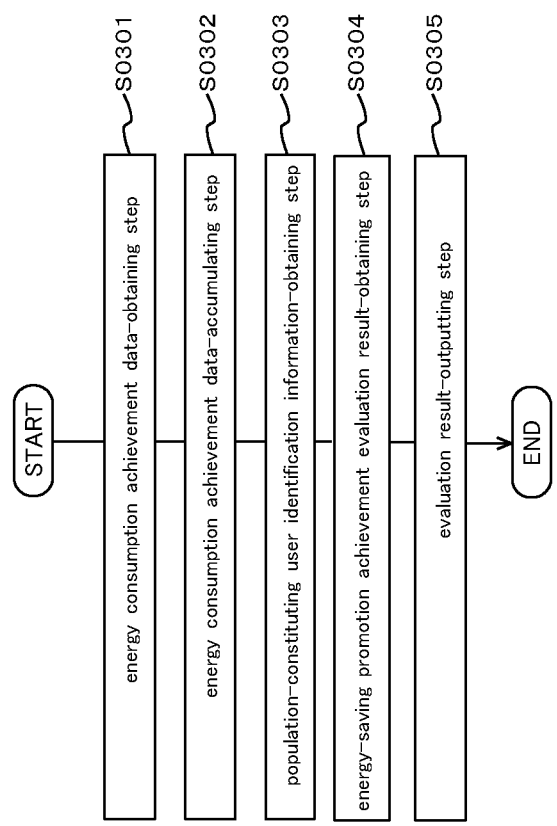
FIG. 3 is a view illustrating a flow of processing in using the energy-saving promotion achievement-evaluating device in the embodiment 1.

FIG. 3 is a diagram illustrating a flow of processing in using the energy-saving promotion achievement-evaluating device in this embodiment. As illustrated in FIG. 3, this is a processing method consisting of an energy consumption achievement data-obtaining step (S0301), an energy consumption achievement data-accumulating step (S0302), a population-constituting user identification information-obtaining step (S0303), an energy-saving promotion achievement evaluation result-obtaining step (S0304), and an evaluation result-outputting step (S0305). These processing methods are executed by the energy-saving promotion achievement-evaluating device comprising: the user comparison information-holding unit for holding the user comparison information in which the user identification information of the user working on energy saving is associated with comparison attributes, the comparison attributes being indexes suitable for mutual comparison on the basis of user attributes which are any one or more attributes of the business type, the business scale, the energy consumption area, the family structure, and the energy consumption achievement of the user; and the energy-saving evaluation rule-holding unit for holding the energy-saving evaluation rule which is a rule for evaluating the energy-saving promotion achievement on the basis of the energy consumption achievement data.

The "energy consumption achievement data-obtaining step" is a step of obtaining the energy consumption achievement data of the user in association with the user identification information.

The "energy consumption achievement data-accumulating step" is a step of accumulating the obtained energy consumption achievement data.

The "population-constituting user identification information-obtaining step" is a step of obtaining the population-constituting user identification information which is information for identifying the users constituting the population appropriate as mutual comparison targets in terms of the user comparison attributes on the basis of the energy consumption achievement data accumulated in the energy-consumption achievement data-accumulating step.

The "energy-saving promotion achievement evaluation result-obtaining step" is a step of obtaining the energy consumption achievement data of the user identified by the population-constituting user identification information obtained by the population-constituting user identification information-obtaining step, as an energy-saving promotion achievement evaluation result in association with the user identification information on the basis of the held energy-saving evaluation rule.

The "evaluation result-outputting step" is a step of outputting the energy-saving promotion achievement evaluation result in association with the user identification information for enabling comparison of the energy-saving promotion achievement evaluation result with the energy-saving promotion achievement evaluation result of the user in the population or the energy-saving promotion achievement evaluation result of another user in the population, or with an index calculated on the basis of the energy-saving promotion achievement evaluation result of the user in the population or an index calculated on the basis of the energy-saving promotion achievement evaluation result of another user in the population.

Conclusion

As described above, a system capable of motivating energy saving by comparison with the others can be provided.

Embodiment 2

This embodiment is an energy-saving promotion achievement-evaluating device further configured to, in addition to the features of the embodiment 1: obtain, as comparison targets, a plurality of groups identified by group identification information for identifying a group constituted by a plurality of pieces of the user identification information as the comparison target; and obtain energy consumption achievement data of the group identified by a population-constituting group identification information obtained by a population-constituting group identification information-obtaining means as an energy-saving promotion achievement evaluation result in association with the group identification information on the basis of the held energy-saving evaluation rule. In addition, this embodiment provides an energy-saving promotion system consisting of the above-mentioned energy-saving promotion achievement-evaluating device and a user terminal device in association with the user identification information.

Hereinafter, the energy-saving promotion achievement-evaluating device in this embodiment will be described on a functional configuration, a hardware configuration, and a flow of processing in order.

Functional Configuration

Figure 4:
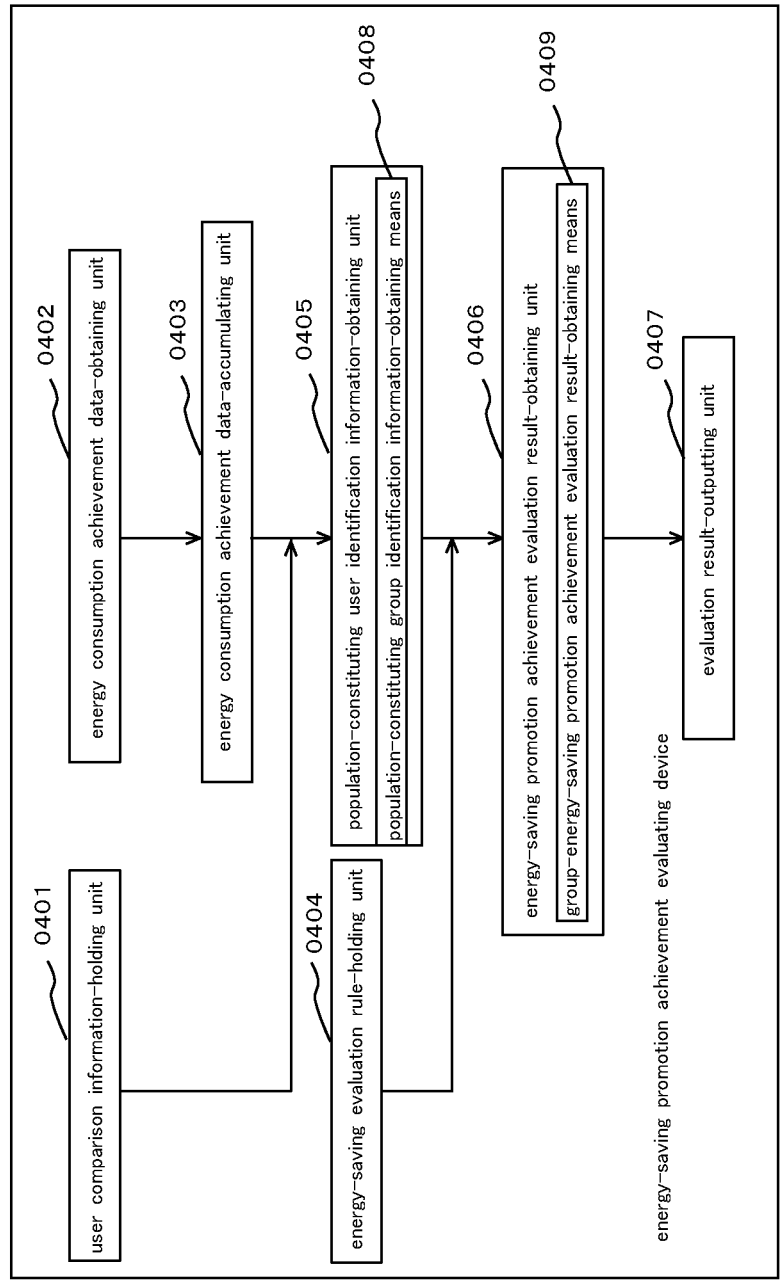
FIG. 4 is a diagram illustrating a functional configuration of an energy-saving promotion achievement-evaluating device in an embodiment 2.

FIG. 4 is a diagram illustrating the functional configuration of the energy-saving promotion achievement-evaluating device in this embodiment. The energy-saving promotion achievement-evaluating device in this embodiment comprises a user comparison information-holding unit (0401), an energy consumption achievement data-obtaining unit (0402), an energy consumption achievement data-accumulating unit (0403), an energy-saving evaluation rule-holding unit (0404), a population-constituting user identification information-obtaining unit (0405), an energy-saving promotion achievement evaluation result-obtaining unit (0406), and an evaluation result-outputting unit (0407). In addition, the population-constituting user identification information-obtaining unit comprises a population-constituting group identification information-obtaining means (0408) and the energy-saving promotion achievement evaluation result-obtaining unit comprises a group-energy-saving promotion achievement evaluation result-obtaining means (0409). Hereinafter, details of each function will be described specifically for the functional configuration. It should be noted that each of the functions except the population-constituting user identification information-obtaining unit and the energy-saving promotion achievement evaluation result-obtaining unit is similar to those in the embodiment 1, and thus, only the functions of the population-constituting user identification information-obtaining unit and the energy-saving promotion achievement evaluation result-obtaining unit will be described.

As described in the embodiment 1, the "population-constituting user identification information-obtaining unit" is a function of obtaining population-constituting user identification information which is information for identifying users constituting a population appropriate as mutual comparison targets in terms of the user comparison attributes on the basis of energy consumption achievement data accumulated in the energy consumption achievement data-accumulating unit. What is special in this embodiment is that it is provided with the population-constituting group identification information-obtaining means. The "population-constituting group identification information-obtaining means" is a function of obtaining population-constituting group identification information for obtaining, as comparison targets, a plurality of groups identified by group identification information for identifying a group constituted by a plurality of pieces of the user identification information as the comparison target. As a result, comparison for each group can be realized. Specifically, a company may have a plurality of business sites and a competition among companies can be realized by a total value or an average value in each of the company. Moreover, in terms of the energy consumption in a family, for example, a competition among municipalities can be realized by a total value or an average value in each of the municipalities.

As described in the embodiment 1, the "energy-saving promotion achievement evaluation result-obtaining unit" is a function obtaining the energy consumption achievement data of the user identified by the population-constituting user identification information obtained by the population-constituting user identification information-obtaining unit, as an energy-saving promotion achievement evaluation result in association with the user identification information on the basis of the held energy-saving evaluation rule. What is special in this embodiment is that it is provided with the group-energy-saving promotion achievement evaluation result-obtaining means. The "group-energy-saving promotion achievement evaluation result-obtaining means" is a function of obtaining the energy consumption achievement data of the group identified by the population-constituting group identification information obtained by the population-constituting group identification information-obtaining means as an energy-saving promotion achievement evaluation result in association with the group identification information on the basis of the held energy-saving evaluation rule. As a result, the energy-saving promotion achievement evaluation result, which is a result of evaluation of the total value of the group on the basis of the energy-saving evaluation rule, can be obtained.

Figure 38:
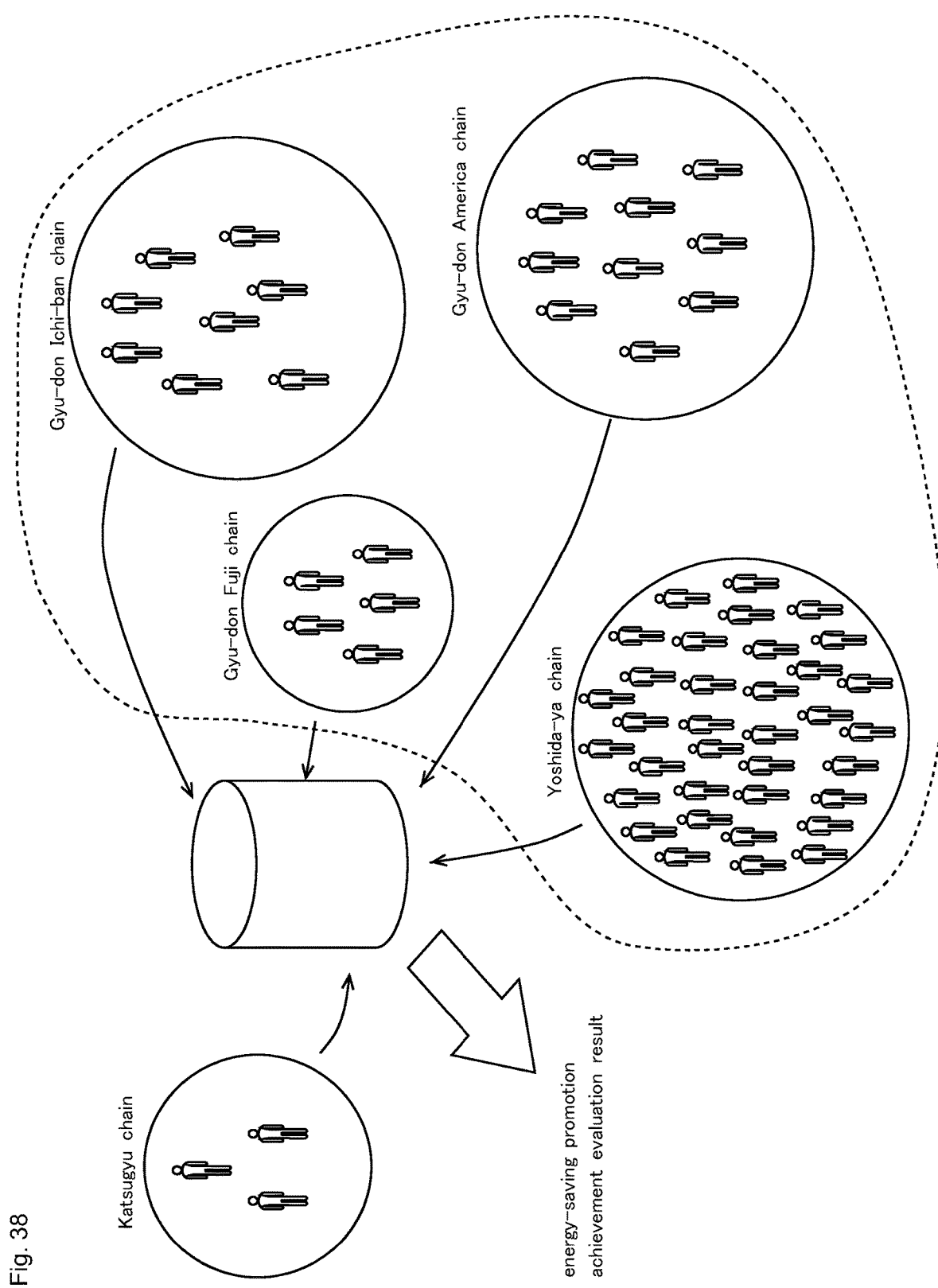
FIG. 38 is a diagram illustrating an example of an entire image until the energy-saving promotion achievement evaluation result is output in this embodiment.

FIG. 38 is a diagram illustrating an example of an entire image until the energy-saving promotion achievement evaluation result is output in this embodiment. Assume that all of the restaurants "Gyu-don Ichi-ban", "Gyu-don Fuji", "Gyu-don America", "Yoshida-ya", and "Katsugyu" develop a chain and thus have a plurality of sites. In this case, the competition among the companies can be realized by acquiring the energy-saving promotion achievement evaluation result with a total value or an average value of each of the chain restaurants as a comparison target.

Hardware Configuration

Figure 5:
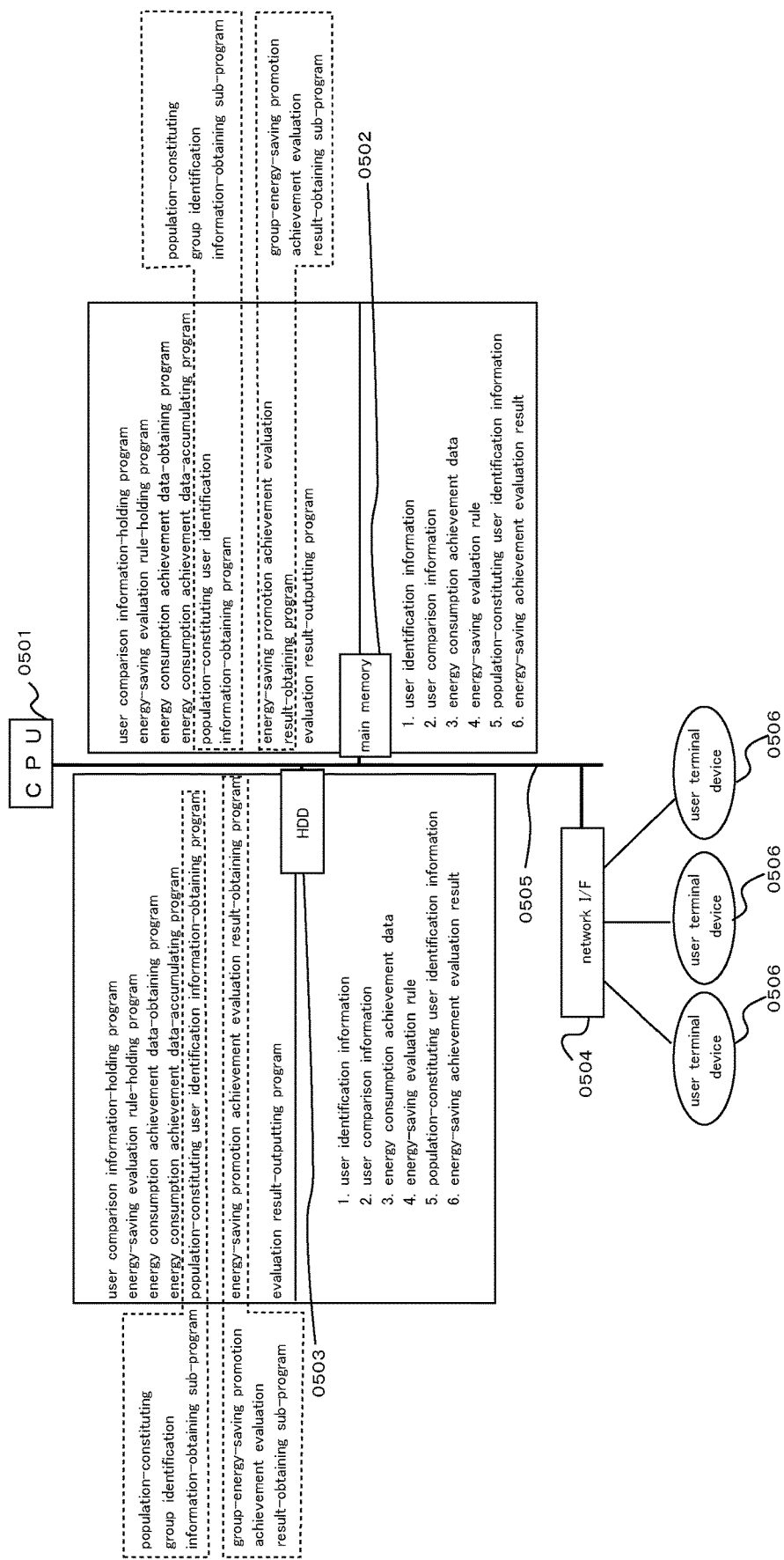
FIG. 5 is a diagram illustrating a hardware configuration of the energy-saving promotion achievement-evaluating device in the embodiment 2.

FIG. 5 is a diagram illustrating a hardware configuration of the energy-saving promotion achievement-evaluating device in this embodiment. As illustrated in this diagram, the energy-saving promotion achievement-evaluating device in this embodiment comprises a "CPU (central processing unit)" (0501) for executing various types of calculation processing and a "main memory" (0502). Moreover, it comprises an "HDD" (0503) for holding predetermined information and a "network I/F (interface)" (0504) for conducting transmission/reception of information with a user terminal device (0506) associated with a plurality of pieces of the user identification information. Then they are mutually connected via a data communication path such as a "system bus" (0505) and conducts transmission/reception and processing of the information.

Here, the "main memory" reads out programs for executing various types of processing so as to have them executed by the "CPU" and also provides a work area which is also a work region of the programs. Moreover, a plurality of addresses are assigned to each of the "main memory" and the "HDD", and the program executed by the "CPU" is capable of exchange and processing of data by specifying the address for an access. In this embodiment, the programs stored in the "main memory" are a user comparison information-holding program, an energy-saving evaluation rule-holding program, an energy consumption achievement data-obtaining program, an energy consumption achievement data-accumulating program, a population-constituting user identification information-obtaining program, an energy-saving promotion achievement evaluation result-obtaining program, and an evaluation result-outputting program. The population-constituting user identification information-obtaining program comprises population-constituting group identification information-obtaining sub-program and the energy-saving promotion achievement evaluation result-obtaining program comprises group-energy-saving promotion achievement evaluation result-obtaining sub-program.

Moreover, similar to the embodiment 1, the "main memory" and the "HDD" store the user identification information, the user comparison information, the energy consumption achievement data, the energy-saving evaluation rule, the population-constituting user identification information, the energy-saving promotion achievement evaluation result, and the like. Moreover, this embodiment is characterized in that the "population-constituting user identification information" is present as the population-constituting group identification information, and the "energy-saving promotion achievement evaluation result" is information of evaluation of the energy consumption achievement data of a group identified by the population-constituting group identification information in association with the group identification information on the basis of the held energy-saving evaluation rule.

The "CPU" executes the energy consumption achievement data-obtaining program stored in the "main memory" so as to obtain the energy consumption achievement data of the user in association with the user identification information from the user terminal device via the "network interface". Then it executes the energy consumption achievement data-accumulating program stored in the "main memory" so as to accumulate the obtained energy consumption achievement data. Then it executes the population-constituting user identification information-obtaining program stored in the "main memory" so as to obtain the population-constituting user identification information which is information for identifying users constituting the population appropriate as mutual comparison targets in terms of the user comparison attributes on the basis of the accumulated energy consumption achievement data. At the same time, a population-constituting group identification information-obtaining sub-program is executed for obtaining, as comparison targets, a plurality of groups identified by group identification information for identifying a group constituted by a plurality of pieces of the user identification information as the comparison target. Then it executes the energy-saving promotion achievement evaluation result-obtaining program stored in the "main memory" so as to obtain the energy consumption achievement data of the group identified by the population-constituting group-identification information as the energy-saving promotion achievement evaluation result in association with the group identification information based on the held energy-saving evaluation rule. Lastly, it outputs the energy-saving promotion achievement evaluation result in association with the user identification information to the user terminal device via the "network interface" by executing the evaluation result-outputting program stored in the "main memory".

Flow of Processing

Figure 6:
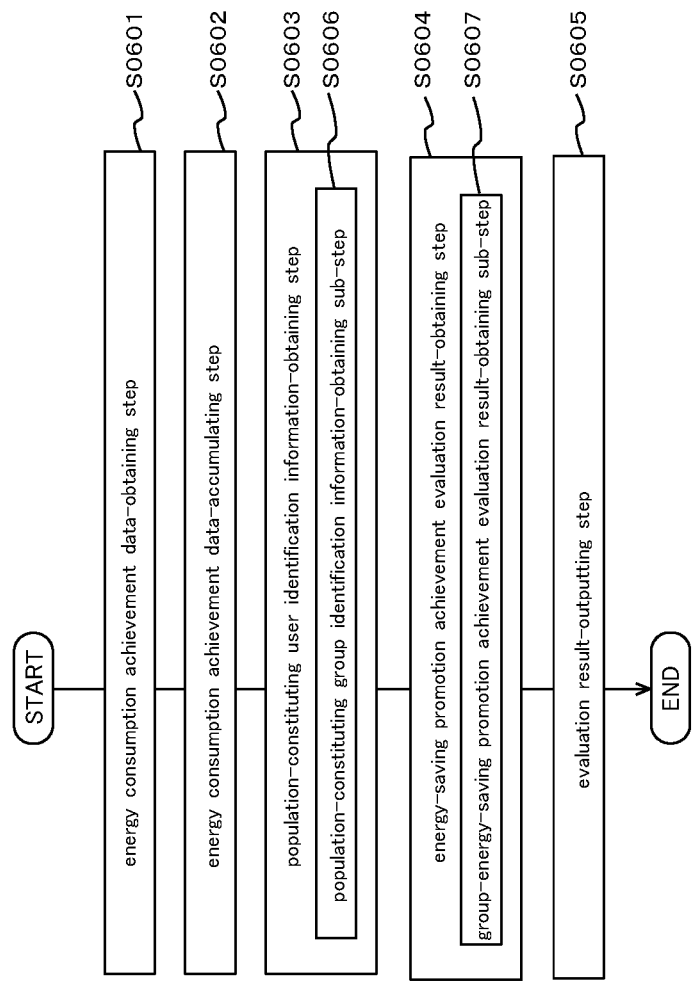
FIG. 6 is a view illustrating a flow of processing in using the energy-saving promotion achievement-evaluating device in the embodiment 2.

FIG. 6 is a diagram illustrating a flow of processing in using the energy-saving promotion achievement-evaluating device in this embodiment. As illustrated in FIG. 6, this is a processing method consisting of: an energy consumption achievement data-obtaining step (S0601); an energy consumption achievement data-accumulating step (S0602); a population-constituting user identification information-obtaining step (S0603) including a population-constituting group identification information-obtaining sub-step (S0606); an energy-saving promotion achievement evaluation result-obtaining step (S0604) including a group-energy-saving promotion achievement evaluation result-obtaining sub-step (S0607); and an evaluation result-outputting step (S0605). These processing methods are executed by the energy-saving promotion achievement-evaluating device comprising: the user comparison information-holding unit for holding the user comparison information in which the user identification information of the user working on energy saving is associated with comparison attributes, the comparison attributes being indexes suitable for mutual comparison on the basis of user attributes which are any one or more attributes of the business type, the business scale, the energy consumption area, the family structure, and the energy consumption achievement of the user; and the energy-saving evaluation rule-holding unit for holding the energy-saving evaluation rule which is a rule for evaluating the energy-saving promotion achievement on the basis of the energy consumption achievement data. It should be noted that, in FIG. 6, each of the steps except the population-constituting user identification information-obtaining step and the energy-saving promotion achievement evaluation result-obtaining step is similar to those in the embodiment 1. In the following, the population-constituting user identification information-obtaining step and the energy-saving promotion achievement evaluation result-obtaining step will be described.

As described in the embodiment 1, the "population-constituting user identification information-obtaining step" is a step of obtaining the population-constituting user identification information which is information for identifying the users constituting the population appropriate as mutual comparison targets in terms of the user comparison attributes on the basis of the energy consumption achievement data accumulated in the energy-consumption achievement data-accumulating step. What is special in this embodiment is that it is provided with the population-constituting group identification information-obtaining sub-step. The "population-constituting group identification information-obtaining sub-step" is a step of obtaining, as comparison targets, a plurality of groups identified by the group identification information for identifying a group constituted by a plurality of pieces of the user identification information as the comparison target.

As described in the embodiment 1, the "energy-saving promotion achievement evaluation result-obtaining step" is a function of obtaining the energy consumption achievement data of the user identified by the population-constituting user identification information obtained by the population-constituting user identification information-obtaining step, as an energy-saving promotion achievement evaluation result in association with the user identification information on the basis of the held energy-saving evaluation rule. What is special in this embodiment is that it is provided with the group-energy-saving promotion achievement evaluation result-obtaining sub-step. The "group energy-saving promotion achievement evaluation result-obtaining sub-step" is a function of obtaining the energy consumption achievement data of the group identified by the population-constituting group identification information obtained by the population-constituting group identification information-obtaining sub-step as an energy-saving promotion achievement evaluation result in association with the group identification information on the basis of the held energy-saving evaluation rule.

Conclusion

As described above, the comparison by group can be realized. More specifically, in the case of a company, for example, there can be a plurality of business sites, but a competition among companies can be realized by a total value in the company. Moreover, in the case of the energy consumption in a family, for example, a competition among municipalities can be realized by a total value in the municipality.

Embodiment 3

This embodiment is an energy-saving promotion achievement-evaluating device further configured to, in addition to the features of the embodiment 1 or 2: hold the user identification information of the user working on the energy saving in association with the user attributes which are any one or more attributes of the business type, the business scale, the energy consumption area, the family structure, and the energy consumption achievement of the user; and to add/delete/modify the user attribute. In addition, this embodiment provides an energy-saving promotion system consisting of the above-mentioned energy-saving promotion achievement-evaluating device and a user terminal device in association with the user identification information.

Hereinafter, the energy-saving promotion achievement-evaluating device in this embodiment will be described on a functional configuration, a hardware configuration, and a flow of processing in order.

Functional Configuration

Figure 7:
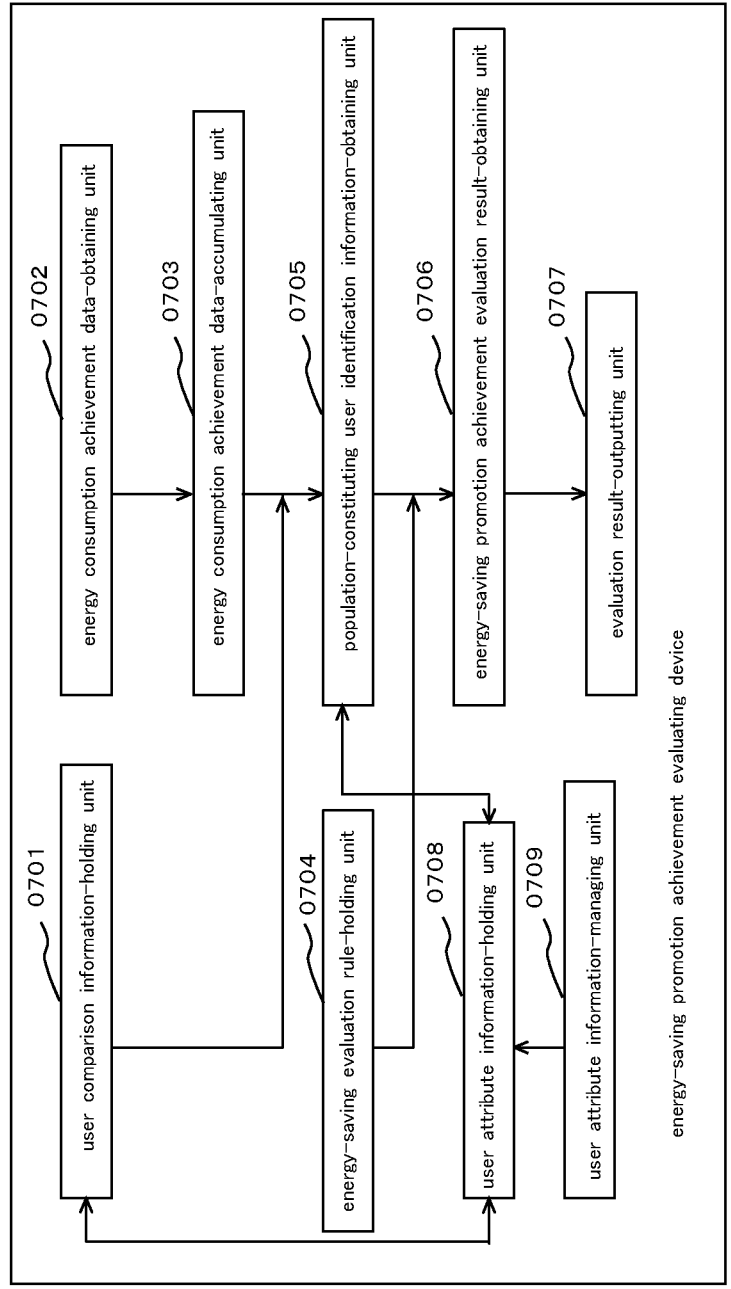
FIG. 7 is a diagram illustrating a functional configuration of an energy-saving promotion achievement-evaluating device in an embodiment 3.

FIG. 7 is a diagram illustrating the functional configuration of the energy-saving promotion achievement-evaluating device in this embodiment. The energy-saving promotion achievement-evaluating device in this embodiment comprises a user comparison information-holding unit (0701), an energy consumption achievement data-obtaining unit (0702), an energy consumption achievement data-accumulating unit (0703), an energy-saving evaluation rule-holding unit (0704), a population-constituting user identification information-obtaining unit (0705), an energy-saving promotion achievement evaluation result-obtaining unit (0706), an evaluation result-outputting unit (0707), a user attribute information-holding unit (0708), and a user attribute information-managing unit (0709).

Hereinafter, details of each function will be described specifically for the functional configuration. It should be noted that each of the functions except the user attribute information-holding unit and the user attribute information-managing unit is similar to those in the embodiment 1, and thus, only the functions of the user attribute information-holding unit and the user attribute information-managing unit will be described.

The "user attribute information-holding unit" is a function of holding the user identification information of the user working on the energy saving in association with the user attributes which are any one or more attributes of the business type, the business scale, the energy consumption area, the family structure, and the energy consumption achievement of the user. Moreover, the "user attribute information-managing unit" is a function of adding, deleting, and modifying the user attribute in association with the user identification information. The user attribute information may be changed due to expansion or reduction of business or transfer of address or the like, and in case of such a change, the user attribute can be updated to the latest one each time by the functions of the user attribute information-holding unit and the user attribute information-holding unit. Since the user attributes are important elements influencing the constitution of the population, this is an important function for realizing fair comparison.

Hardware Configuration

Figure 8:
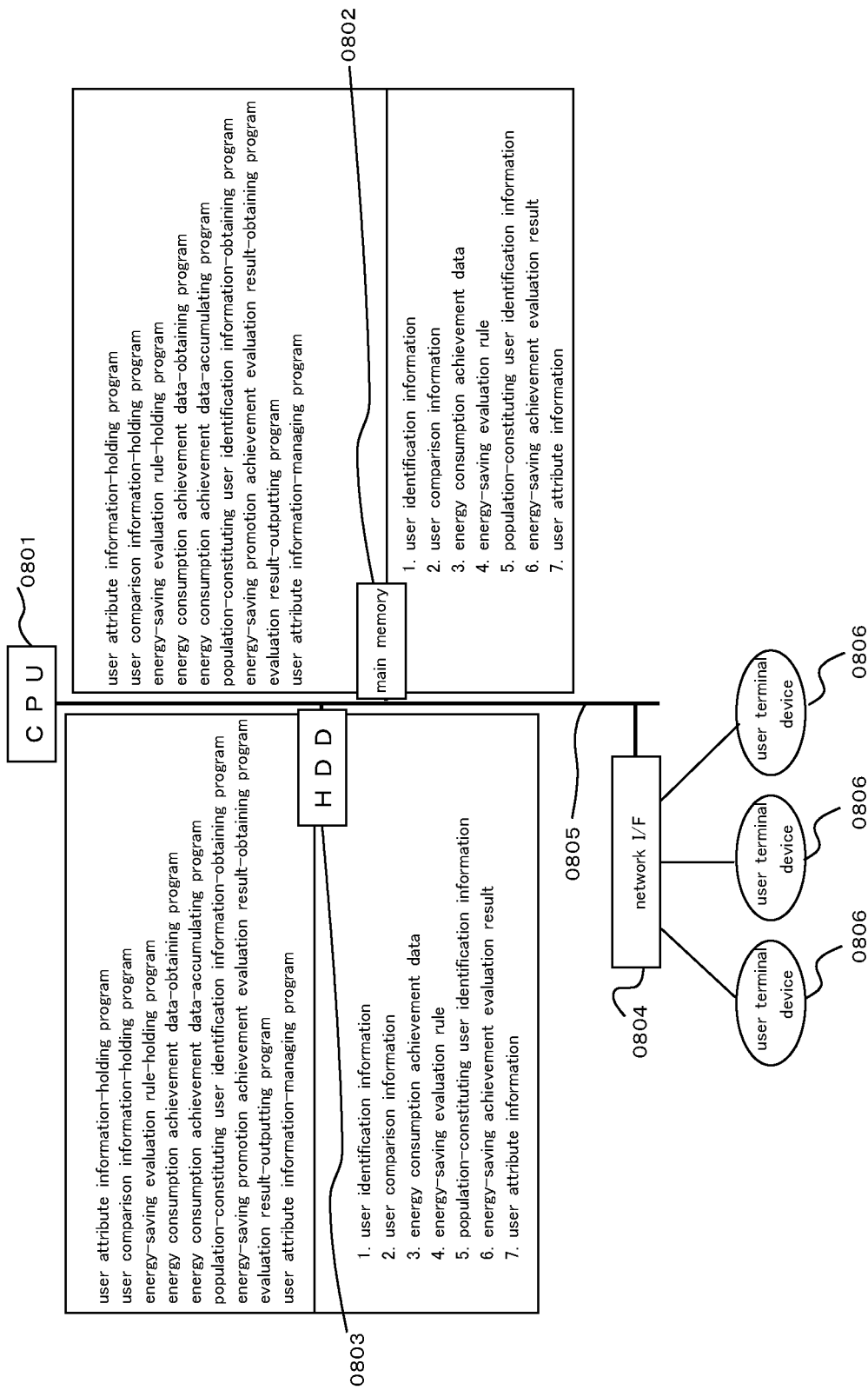
FIG. 8 is a diagram illustrating a hardware configuration of the energy-saving promotion achievement-evaluating device in the embodiment 3.

FIG. 8 is a diagram illustrating a hardware configuration of the energy-saving promotion achievement-evaluating device in this embodiment. As illustrated in this diagram, the energy-saving promotion achievement-evaluating device in this embodiment comprises a "CPU (central processing unit)" (0801) for executing various types of calculation processing and a "main memory" (0802). Moreover, it comprises an "HDD" (0803) for holding predetermined information and a "network I/F (interface)" (0804) for conducting transmission/reception of information with a user terminal device (0806) associated with a plurality of pieces of the user identification information. Then they are mutually connected via a data communication path such as a "system bus" (0805) and conducts transmission/reception and processing of the information.

Here, the "main memory" reads out programs for executing various types of processing so as to have them executed by the "CPU" and also provides a work area which is also a work region of the programs. Moreover, a plurality of addresses are assigned to each of the "main memory" and the "HDD", and the program executed by the "CPU" is capable of exchange and processing of data by specifying the address for an access. In this embodiment, the programs stored in the "main memory" are a user attribute information-holding program, a user comparison information-holding program, an energy-saving evaluation rule-holding program, an energy consumption achievement data-obtaining program, an energy consumption achievement data-accumulating program, a population-constituting user identification information-obtaining program, an energy-saving promotion achievement evaluation result-obtaining program, an evaluation result-outputting program, and a user attribute information-managing program.

Moreover, similar to the embodiment 1, the "main memory" and the "HDD" store the user identification information, the user comparison information, the energy consumption achievement data, the energy-saving evaluation rule, the population-constituting user identification information, the energy-saving promotion achievement evaluation result, and the like. Moreover, this embodiment is characterized in that the user attributes, which are any one or more attributes of a business type, a business scale, family structure, and an energy consumption achievement of the user, are stored in association with the user identification information.

The "CPU" executes the energy consumption achievement data-obtaining program stored in the "main memory" so as to obtain the energy consumption achievement data of the user in association with the user identification information from the user terminal device via the "network interface". Then it executes the energy consumption achievement data-accumulating program stored in the "main memory" so as to accumulate the obtained energy consumption achievement data. Then it executes the population-constituting user identification information-obtaining program stored in the "main memory" so as to obtain the population-constituting user identification information which is information for identifying users constituting the population appropriate as mutual comparison targets in terms of the user comparison attributes on the basis of the accumulated energy consumption achievement data. Then it executes the energy-saving promotion achievement evaluation result-obtaining program stored in the "main memory" so as to obtain the energy consumption achievement data of the user identified by the population-constituting user identification information as the energy-saving promotion achievement evaluation result in association with the user identification information based on the held energy-saving evaluation rule. Lastly, it outputs the energy-saving promotion achievement evaluation result in association with the user identification information to the user terminal device via the "network interface" by executing the evaluation result-outputting program stored in the "main memory". In addition, the user attribute is added/deleted/modified in association with the user identification information as appropriate by executing the user attribute information management program stored in the "main memory".

Flow of Processing

Figure 9:
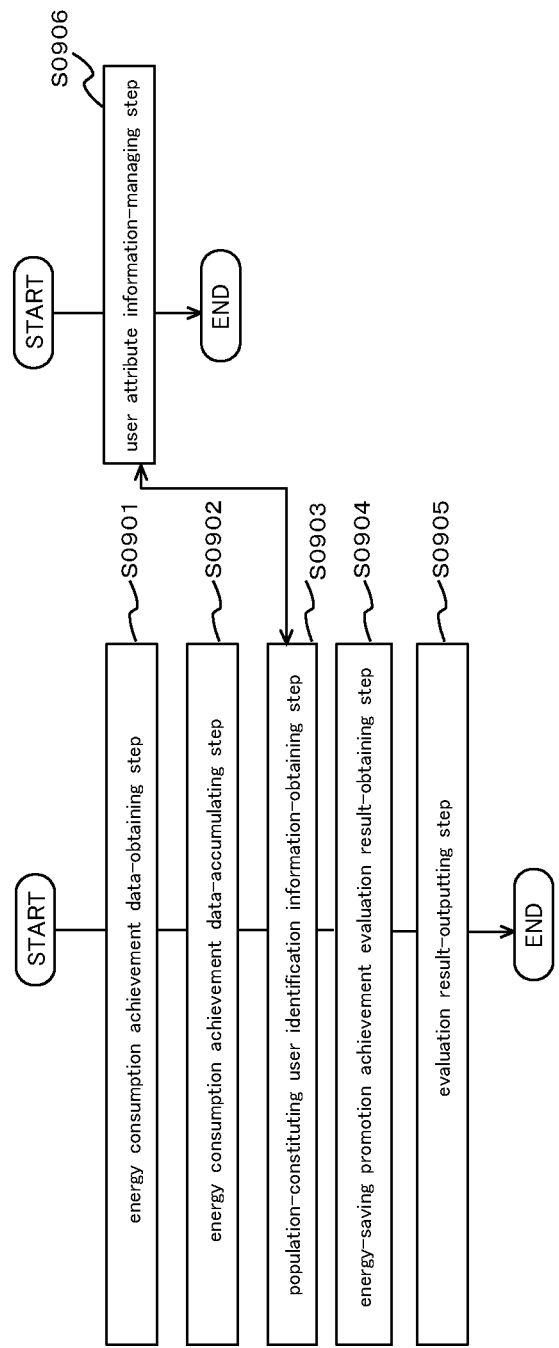
FIG. 9 is a view illustrating a flow of processing in using the energy-saving promotion achievement-evaluating device in the embodiment 3.

FIG. 9 is a diagram illustrating a flow of processing in using the energy-saving promotion achievement-evaluating device in this embodiment. As illustrated in FIG. 9, this is a processing method consisting of an energy consumption achievement data-obtaining step (S0901), an energy consumption achievement data-accumulating step (S0902), a population-constituting user identification information-obtaining step (S0903), an energy-saving promotion achievement evaluation result-obtaining step (S0904), an evaluation result-outputting step (S0905), and a user attribute information-managing step (S0906). These processing methods are executed by the energy-saving promotion achievement-evaluating device comprising: the user comparison information-holding unit for holding the user comparison information in which the user identification information of the user working on energy saving is associated with comparison attributes, the comparison attributes being indexes suitable for mutual comparison on the basis of user attributes which are any one or more attributes of the business type, the business scale, the energy consumption area, the family structure, and the energy consumption achievement of the user; the energy-saving evaluation rule-holding unit for holding the energy-saving evaluation rule which is a rule for evaluating the energy-saving promotion achievement on the basis of the energy consumption achievement data; and the user attribute information-holding unit for holding the user identification information of the user working on energy saving in association with the user attributes which are any one attributes of the business type, the business scale, the family structure, and the energy consumption achievement of the user. It should be noted that, in FIG. 9, each of the steps except the user attribute information-managing step is similar to those in the embodiment 1. In the following, the user attribute information-managing step will be described.

The "user attribute information-managing step" is a step of adding/deleting/modifying the user attributes in association with the user identification information.

Conclusion

As described above, the user attribute can be updated to the latest one each time.

Embodiment 4

This embodiment is an energy-saving promotion achievement-evaluating device further configured to, in addition to the features of the embodiments 1 to 3, compare, as a energy-saving evaluation rule, an energy consumption reduction rate within a predetermined period of time. In addition, this embodiment provides an energy-saving promotion system consisting of the above-mentioned energy-saving promotion achievement-evaluating device and a user terminal device in association with the user identification information.

Hereinafter, the energy-saving promotion achievement-evaluating device in this embodiment will be described on a functional configuration, a hardware configuration, and a flow of processing in order.

Functional Configuration

Figure 10:
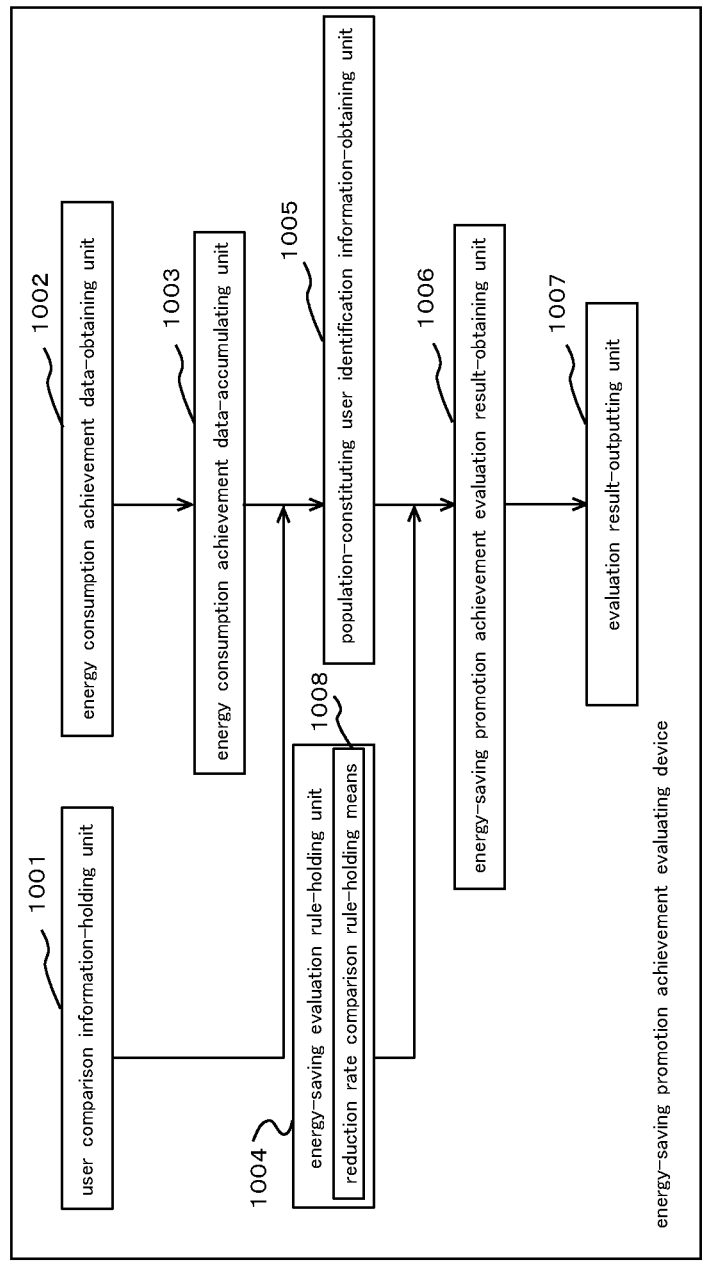
FIG. 10 is a diagram illustrating a functional configuration of an energy-saving promotion achievement-evaluating device in an embodiment 4.

FIG. 10 is a diagram illustrating the functional configuration of the energy-saving promotion achievement-evaluating device in this embodiment. The energy-saving promotion achievement-evaluating device in this embodiment comprises a user comparison information-holding unit (1001), an energy consumption achievement data-obtaining unit (1002), an energy consumption achievement data-accumulating unit (1003), an energy-saving evaluation rule-holding unit (1004), a population-constituting user identification information-obtaining unit (1005), an energy-saving promotion achievement evaluation result-obtaining unit (1006), and an evaluation result-outputting unit (1007). In addition, the energy-saving evaluation rule-holding unit comprises a reduction rate comparison rule-holding means (1008).

Hereinafter, details of each function will be described specifically for the functional configuration. It should be noted that each of the functions except the energy-saving evaluation rule-holding unit is similar to those in the embodiment 1, and thus, only the energy-saving evaluation rule-holding unit will be described.

As described in the embodiment 1, the "energy-saving evaluation rule-holding unit" is a function of holding an energy-saving evaluation rule which is a rule for evaluating the energy-saving promotion achievement on the basis of the energy consumption achievement data. What is special in this embodiment is that it is provided with the reduction rate comparison rule-holding means. The "reduction rate comparison rule-holding means" is a function of holding, as an energy-saving evaluation rule, a reduction rate comparison rule which is a rule for comparing an energy consumption reduction rate within a predetermined period of time. As a result, the energy-saving promotion achievement evaluation by comparison in the population can be based on the energy consumption amount reduction rate. The term "within a predetermined period of time" here may means within a day, a month or a year. Moreover, a start time may be determined arbitrarily. For example, if January is set to the "predetermined period of time", it does not necessarily mean a period from the first day to the last day of the month, but a period from the 15th day to the 14th day can be arbitrarily set.

Hardware Configuration

Figure 11:
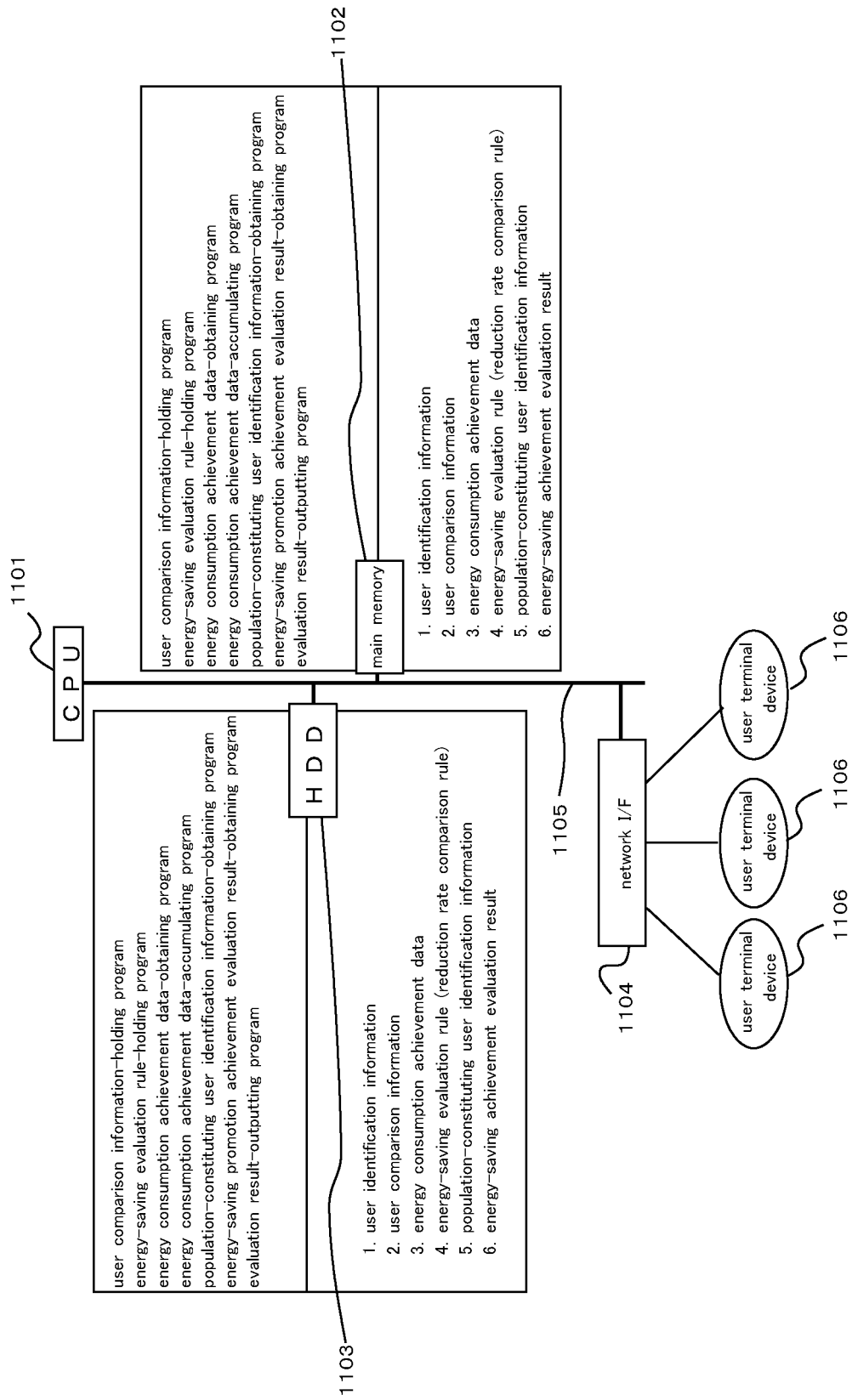
FIG. 11 is a diagram illustrating a hardware configuration of the energy-saving promotion achievement-evaluating device in the embodiment 4.

FIG. 11 is a diagram illustrating a hardware configuration of the energy-saving promotion achievement-evaluating device in this embodiment. As illustrated in this diagram, the energy-saving promotion achievement-evaluating device in this embodiment comprises a "CPU (central processing unit)" (1101) for executing various types of calculation processing and a "main memory" (1102). Moreover, it comprises an "HDD" (1103) for holding predetermined information and a "network I/F (interface)" (1104) for conducting transmission/reception of information with a user terminal device (1106) associated with a plurality of pieces of the user identification information. Then they are mutually connected via a data communication path such as a "system bus" (1105) and conducts transmission/reception and processing of the information.

Here, the "main memory" reads out programs for executing various types of processing so as to have them executed by the "CPU" and also provides a work area which is also a work region of the programs. Moreover, a plurality of addresses are assigned to each of the "main memory" and the "HDD", and the program executed by the "CPU" is capable of exchange and processing of data by specifying the address for an access. In this embodiment, the programs stored in the "main memory" are a user comparison information-holding program, an energy-saving evaluation rule-holding program, an energy consumption achievement data-obtaining program, an energy consumption achievement data-accumulating program, a population-constituting user identification information-obtaining program, an energy-saving promotion achievement evaluation result-obtaining program, and an evaluation result-outputting program.

Moreover, similar to the embodiment 1, the "main memory" and the "HDD" store the user identification information, the user comparison information, the energy consumption achievement data, the energy-saving evaluation rule, the population-constituting user identification information, the energy-saving promotion achievement evaluation result, and the like. Moreover, in this embodiment, the "energy-saving evaluation rule" is present as a reduction rate comparison rule which is a rule for comparing the energy consumption amount reduction rate within the predetermined period of time.

The "CPU" executes the energy consumption achievement data-obtaining program stored in the "main memory"

so as to obtain the energy consumption achievement data of the user in association with the user identification information from the user terminal device via the "network interface". Then it executes the energy consumption achievement data-accumulating program stored in the "main memory" so as to accumulate the obtained energy consumption achievement data. Then it executes the population-constituting user identification information-obtaining program stored in the "main memory" so as to obtain the population-constituting user identification information which is information for identifying users constituting the population appropriate as mutual comparison targets in terms of the user comparison attributes on the basis of the accumulated energy consumption achievement data. Then it executes the energy-saving promotion achievement evaluation result-obtaining program stored in the "main memory" so as to obtain the energy consumption achievement data of the user identified by the population-constituting user identification information as the energy-saving promotion achievement evaluation result in association with the user identification information based on the held energy-saving evaluation rule (reduction rate comparison rule). Lastly, it outputs the energy-saving promotion achievement evaluation result in association with the user identification information to the user terminal device via the "network interface" by executing the evaluation result-outputting program stored in the "main memory".

Flow of Processing

FIG. 3 is used to describe a flow of processing in using the energy-saving promotion achievement-evaluating device in this embodiment. As illustrated in FIG. 3, this is a processing method consisting of an energy consumption achievement data-obtaining step (S0301), an energy consumption achievement data-accumulating step (S0302), a population-constituting user identification information-obtaining step (S0303), an energy-saving promotion achievement evaluation result-obtaining step (S0304), and an evaluation result-outputting step (S0305). These processing methods are executed by the energy-saving promotion achievement-evaluating device comprising: the user comparison information-holding unit for holding the user comparison information in which the user identification information of the user working on energy saving is associated with comparison attributes, the comparison attributes being indexes suitable for mutual comparison on the basis of user attributes which are any one or more attributes of the business type, the business scale, the energy consumption area, the family structure, and the energy consumption achievement of the user; and the energy-saving evaluation rule-holding unit for holding the energy-saving evaluation rule which is a rule for evaluating the energy-saving promotion achievement on the basis of the energy consumption achievement data, the energy-saving evaluation rule-holding unit comprising the reduction rate comparison rule-holding means for holding the reduction rate comparison rule as an energy-saving evaluation rule, which is a rule for comparing the energy consumption reduction rate within a predetermined period of time. It should be noted that each of the steps except the energy-saving promotion achievement evaluation result-obtaining step is similar to those in the embodiment 1. The energy-saving promotion achievement evaluation result-obtaining step will be described below.

As described in the embodiment 1, the "energy-saving promotion achievement evaluation result-obtaining step" is a step of obtaining the energy consumption achievement data of the user identified by the population-constituting user identification information obtained by the population-constituting user identification information-obtaining step, as an energy-saving promotion achievement evaluation result in association with the user identification information on the basis of the held energy-saving evaluation rule. What is special in this embodiment is that the held energy-saving evaluation rule is the "reduction rate comparison rule". The "reduction rate comparison rule" is a rule for comparing the energy consumption amount reduction rate within a predetermined period of time.

Conclusion

As a result, the energy-saving promotion achievement evaluation by comparison in the population 38 can be based on the energy consumption amount reduction rate can be based.

Embodiment 5

This embodiment is an energy-saving promotion achievement-evaluating device further configured to, in addition to the features of the embodiments 1 to 4, compare, as an energy-saving evaluation rule, an energy consumption reduction amount within a predetermined period of time. In addition, this embodiment provides an energy-saving promotion system consisting of the above-mentioned energy-saving promotion achievement-evaluating device and a user terminal device in association with the user identification information.

Hereinafter, the energy-saving promotion achievement-evaluating device in this embodiment will be described on a functional configuration, a hardware configuration, and a flow of processing in order.

Functional Configuration

Figure 12:
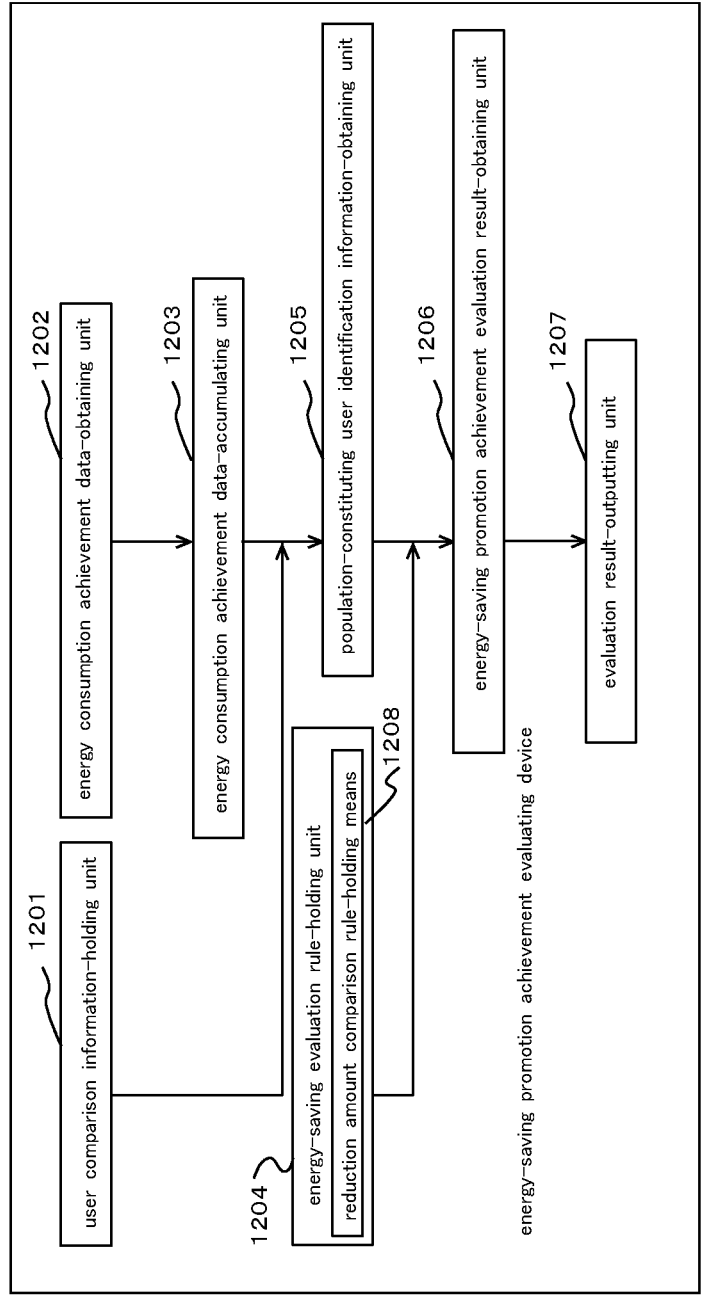
FIG. 12 is a diagram illustrating a functional configuration of an energy-saving promotion achievement-evaluating device in an embodiment 5.

FIG. 12 is a diagram illustrating the functional configuration of the energy-saving promotion achievement-evaluating device in this embodiment. The energy-saving promotion achievement-evaluating device in this embodiment comprises a user comparison information-holding unit (1201), an energy consumption achievement data-obtaining unit (1202), an energy consumption achievement data-accumulating unit (1203), an energy-saving evaluation rule-holding unit (1204), a population-constituting user identification information-obtaining unit (1205), an energy-saving promotion achievement evaluation result-obtaining unit (1206), and an evaluation result-outputting unit (1207). In addition, the energy-saving evaluation rule-holding unit comprises a reduction amount comparison rule-holding means (1208).

Hereinafter, details of each function will be described specifically for the functional configuration. It should be noted that each of the functions except the energy-saving evaluation rule-holding unit is similar to those in the embodiment 1, and thus, only the energy-saving evaluation rule-holding unit will be described.

As described in the embodiment 1, the "energy-saving evaluation rule-holding unit" is a function of holding an energy-saving evaluation rule which is a rule for evaluating the energy-saving promotion achievement on the basis of the energy consumption achievement data. What is special in this embodiment is that it is provided with the reduction amount comparison rule-holding means. The "reduction amount comparison rule-holding means" is a function of holding, as an energy-saving evaluation rule, a reduction amount comparison rule which is a rule for comparing an energy consumption reduction amount within a predetermined period of time. As a result, the energy-saving promotion achievement evaluation by comparison in the population can be based on the energy consumption amount reduction amount. The term "within a predetermined period of time" here may means within a day, a month or a year. Moreover, a start time may be determined arbitrarily. For example, if January is set to the "predetermined period of time", it does not necessarily mean a period from the first day to the last day of the month, but a period from the 15th day to the 14th day can be arbitrarily set.

Hardware Configuration

Figure 13:
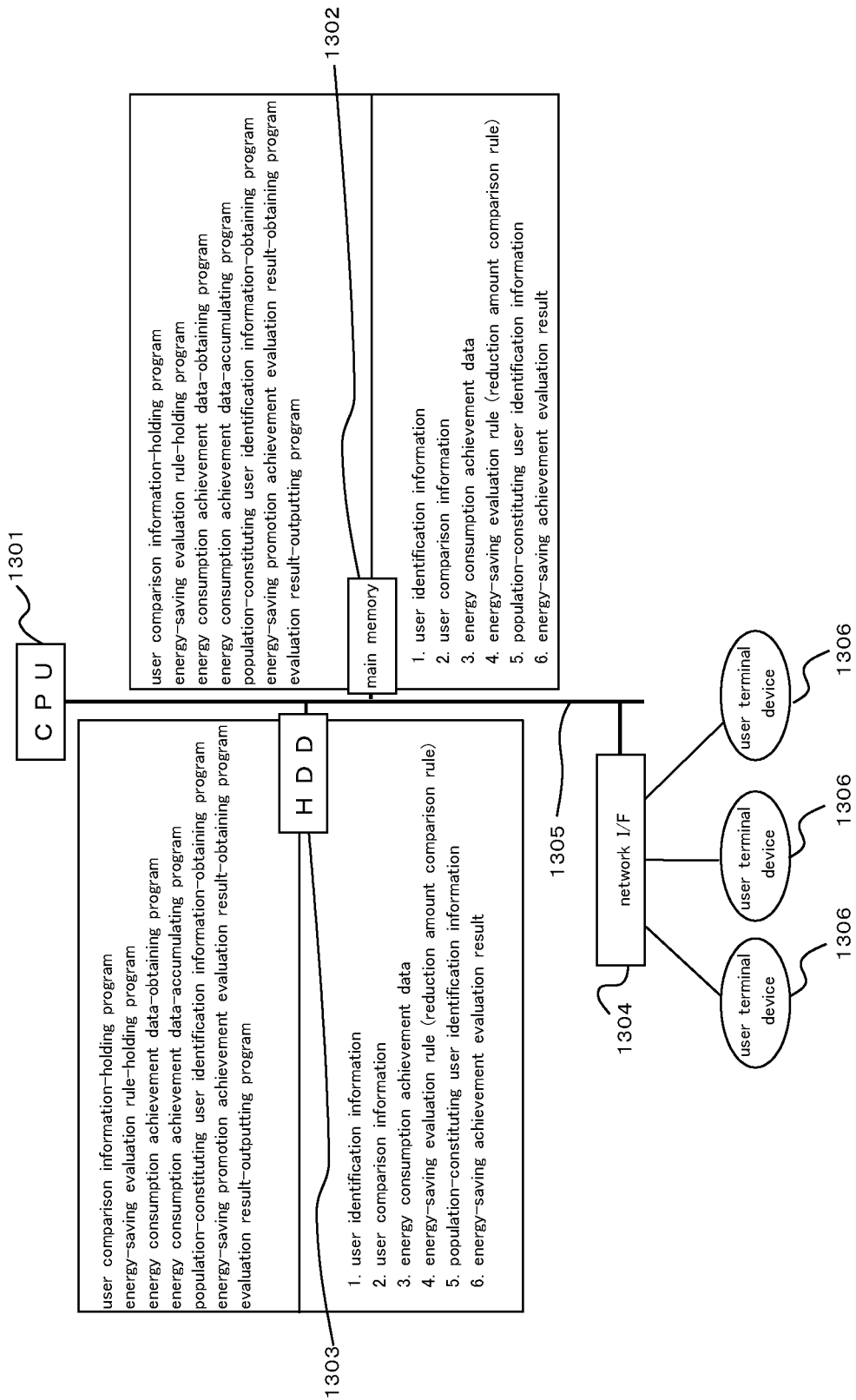
FIG. 13 is a diagram illustrating a hardware configuration of the energy-saving promotion achievement-evaluating device in the embodiment 5.

FIG. 13 is a diagram illustrating a hardware configuration of the energy-saving promotion achievement-evaluating device in this embodiment. As illustrated in this diagram, the energy-saving promotion achievement-evaluating device in this embodiment comprises a "CPU (central processing unit)" (1301) for executing various types of calculation processing and a "main memory" (1302). Moreover, it comprises an "HDD" (1303) for holding predetermined information and a "network I/F (interface)" (1304) for conducting transmission/reception of information with a user terminal device (1306) associated with a plurality of pieces of the user identification information. Then they are mutually connected via a data communication path such as a "system bus" (1305) and conducts transmission/reception and processing of the information.

Here, the "main memory" reads out programs for executing various types of processing so as to have them executed by the "CPU" and also provides a work area which is also a work region of the programs. Moreover, a plurality of addresses are assigned to each of the "main memory" and the "HDD", and the program executed by the "CPU" is capable of exchange and processing of data by specifying the address for an access. In this embodiment, the programs stored in the "main memory" are a user comparison information-holding program, an energy-saving evaluation rule-holding program, an energy consumption achievement data-obtaining program, an energy consumption achievement data-accumulating program, a population-constituting user identification information-obtaining program, an energy-saving promotion achievement evaluation result-obtaining program, and an evaluation result-outputting program.

Moreover, similar to the embodiment 1, the "main memory" and the "HDD" store the user identification information, the user comparison information, the energy consumption achievement data, the energy-saving evaluation rule, the population-constituting user identification information, the energy-saving promotion achievement evaluation result, and the like. Moreover, in this embodiment, the "energy-saving evaluation rule" is present as a reduction amount comparison rule which is a rule for comparing the energy consumption amount reduction amount within the predetermined period of time.

The "CPU" executes the energy consumption achievement data-obtaining program stored in the "main memory" so as to obtain the energy consumption achievement data of the user in association with the user identification information from the user terminal device via the "network interface". Then it executes the energy consumption achievement data-accumulating program stored in the "main memory" so as to accumulate the obtained energy consumption achievement data. Then it executes the population-constituting user identification information-obtaining program stored in the "main memory" so as to obtain the population-constituting user identification information which is information for identifying users constituting the population appropriate as mutual comparison targets in terms of the user comparison attributes on the basis of the accumulated energy consumption achievement data. Then it executes the energy-saving promotion achievement evaluation result-obtaining program stored in the "main memory" so as to obtain the energy consumption achievement data of the user identified by the population-constituting user identification information as the energy-saving promotion achievement evaluation result in association with the user identification information based on the held energy-saving evaluation rule (reduction amount comparison rule). Lastly, it outputs the energy-saving promotion achievement evaluation result in association with the user identification information to the user terminal device via the "network interface" by executing the evaluation result-outputting program stored in the "main memory".

Flow of Processing

FIG. 3 is used to describe a flow of processing in using the energy-saving promotion achievement-evaluating device in this embodiment. As illustrated in FIG. 3, this is a processing method consisting of an energy consumption achievement data-obtaining step (S0301), an energy consumption achievement data-accumulating step (S0302), a population-constituting user identification information-obtaining step (S0303), an energy-saving promotion achievement evaluation result-obtaining step (S0304), and an evaluation result-outputting step (S0305). These processing methods are executed by the energy-saving promotion achievement-evaluating device comprising: the user comparison information-holding unit for holding the user comparison information in which the user identification information of the user working on energy saving is associated with comparison attributes, the comparison attributes being indexes suitable for mutual comparison on the basis of user attributes which are any one or more attributes of the business type, the business scale, the energy consumption area, the family structure, and the energy consumption achievement of the user; and the energy-saving evaluation rule-holding unit for holding the energy-saving evaluation rule which is a rule for evaluating the energy-saving promotion achievement on the basis of the energy consumption achievement data, the energy-saving evaluation rule-holding unit comprising the reduction amount comparison rule-holding means for holding the reduction amount comparison rule as an energy-saving evaluation rule, which is a rule for comparing the energy consumption reduction amount within a predetermined period of time. It should be noted that each of the steps in FIG. 3 except the energy-saving promotion achievement evaluation result-obtaining step is similar to those in the embodiment 1. The energy-saving promotion achievement evaluation result-obtaining step will be described below.

As described in the embodiment 1, the "energy-saving promotion achievement evaluation result-obtaining step" is a step of obtaining the energy consumption achievement data of the user identified by the population-constituting user identification information obtained by the population-constituting user identification information-obtaining step, as an energy-saving promotion achievement evaluation result in association with the user identification information on the basis of the held energy-saving evaluation rule. What is special in this embodiment is that the held energy-saving evaluation rule is the "reduction amount comparison rule". The "reduction amount comparison rule" is a rule for comparing the energy consumption amount reduction amount within a predetermined period of time.

Conclusion

As a result, the energy-saving promotion achievement evaluation by comparison in the population can be based on the energy consumption amount reduction amount can be based.

Embodiment 6

This embodiment is characterized in that, in addition to the features of the embodiments 1 to 5, the energy-saving promotion achievement-evaluating device holds the energy-saving promotion achievement evaluation result in association with the incentive information and outputs the incentive information in association with the user identification information and/or the group identification information on the basis of the energy-saving promotion achievement evaluation result obtained in association with the user identification information and/or the group identification information.

Hereinafter, the energy-saving promotion achievement-evaluating device in this embodiment will be described on a functional configuration, a hardware configuration, and a flow of processing in order.

Functional Configuration

Figure 14:
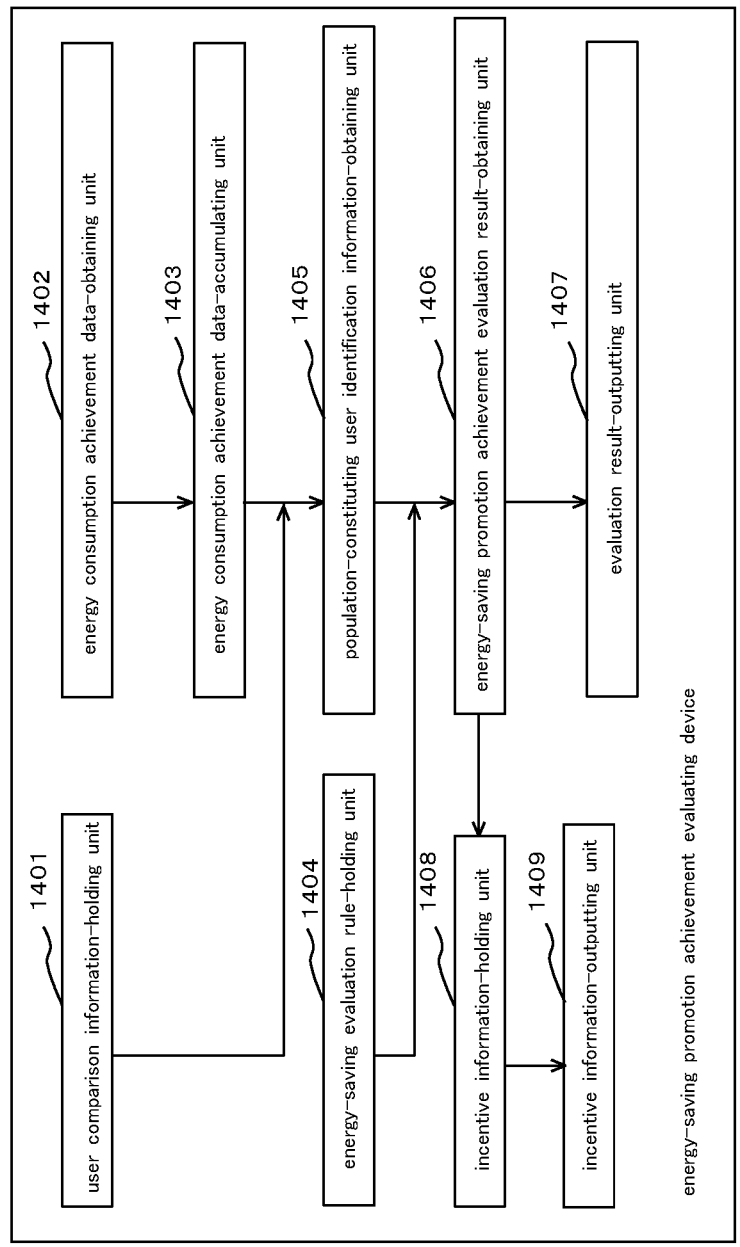
FIG. 14 is a diagram illustrating a functional configuration of an energy-saving promotion achievement-evaluating device in an embodiment 6.

FIG. 14 is a diagram illustrating the functional configuration of the energy-saving promotion achievement-evaluating device in this embodiment. The energy-saving promotion achievement-evaluating device in this embodiment comprises a user comparison information-holding unit (1401), an energy consumption achievement data-obtaining unit (1402), an energy consumption achievement data-accumulating unit (1403), an energy-saving evaluation rule-holding unit (1404), a population-constituting user identification information-obtaining unit (1405), an energy-saving promotion achievement evaluation result-obtaining unit (1406), an evaluation result-outputting unit (1407), an incentive information-holding unit (1408), and an incentive information-outputting unit (1409).

Hereinafter, details of each function will be described specifically for the functional configuration. It should be noted that each of the functions except the incentive information-holding unit and the incentive information-outputting unit is similar to those in the embodiment 1, and thus, only the functions of the incentive information-holding unit and the incentive information-outputting unit will be described.

The "incentive information-holding unit" is a function of holding the energy-saving promotion achievement evaluation result in association with incentive information. Moreover, the "incentive information-outputting unit" is a function of outputting the incentive information in association with the user identification information and/or the group identification information on the basis of the energy-saving promotion achievement evaluation result obtained in association with the user identification information and/or the group identification information. The incentive may be: gifts such as specialties from every region in the country including rice, fruits, vegetables, meat, fish, and the like; discount of energy charges or providing of points; or providing of virtual coins. The discount of the energy charges may be a 200-yen discount from the monthly charge or a discount of charges per kwh. Moreover, the contents of the incentive may be changed in accordance with the level of the population. For example, the user at the first rank in the highest-level population A can get 1.0 yen/kwh and the user at the first rank in the second highest-level population B gets 1.1 yen/kwh.

Moreover, the incentive information may be information configured capable of selecting a plurality of incentives by the incentive identification information.

Hardware Configuration

Figure 15:
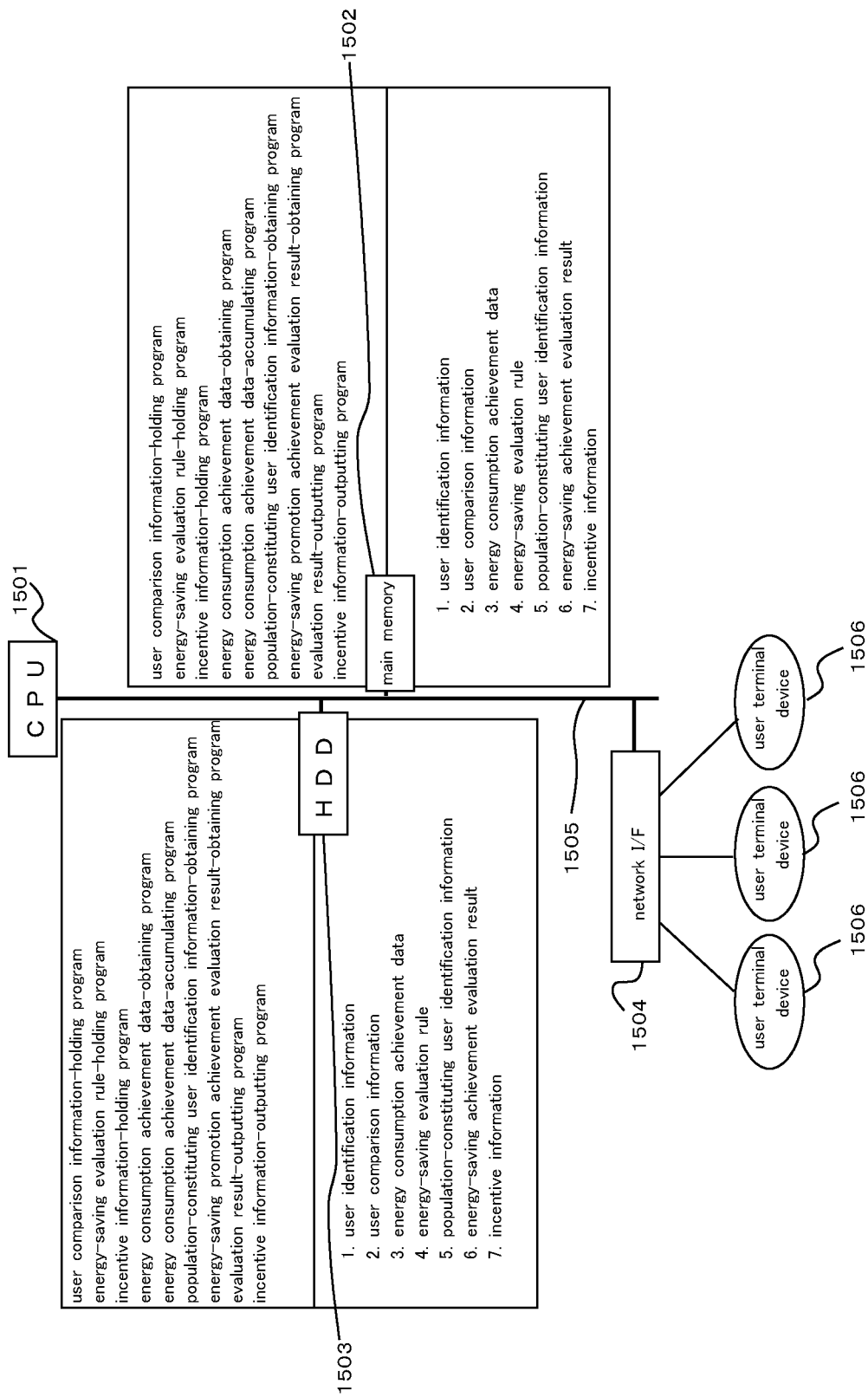
FIG. 15 is a diagram illustrating a hardware configuration of the energy-saving promotion achievement-evaluating device in the embodiment 6.

FIG. 15 is a diagram illustrating a hardware configuration of the energy-saving promotion achievement-evaluating device in this embodiment. As illustrated in this diagram, the energy-saving promotion achievement-evaluating device in this embodiment comprises a "CPU (central processing unit)" (1501) for executing various types of calculation processing and a "main memory" (1502). Moreover, it comprises an "HDD" (1503) for holding predetermined information and a "network I/F (interface)" (1504) for conducting transmission/reception of information with a user terminal device (1506) associated with a plurality of pieces of the user identification information. Then they are mutually connected via a data communication path such as a "system bus" (1505) and conducts transmission/reception and processing of the information.

Here, the "main memory" reads out programs for executing various types of processing so as to have them executed by the "CPU" and also provides a work area which is also a work region of the programs. Moreover, a plurality of addresses are assigned to each of the "main memory" and the "HDD", and the program executed by the "CPU" is capable of exchange and processing of data by specifying the address for an access. In this embodiment, the programs stored in the "main memory" are a user comparison information-holding program, an energy-saving evaluation rule-holding program, an incentive information-holding program, an energy consumption achievement data-obtaining program, an energy consumption achievement data-accumulating program, a population-constituting user identification information-obtaining program, an energy-saving promotion achievement evaluation result-obtaining program, an evaluation result-outputting program, and an incentive information-outputting program.

Moreover, similar to the embodiment 1, the "main memory" and the "HDD" store the user identification information, the user comparison information, the energy consumption achievement data, the energy-saving evaluation rule, the population-constituting user identification information, the energy-saving promotion achievement evaluation result, and the like. Moreover, this embodiment is characterized in that the energy-saving promotion achievement evaluation result is stored in association with the incentive information.

The "CPU" executes the energy consumption achievement data-obtaining program stored in the "main memory" so as to obtain the energy consumption achievement data of the user in association with the user identification information from the user terminal device via the "network interface". Then it executes the energy consumption achievement data-accumulating program stored in the "main memory" so as to accumulate the obtained energy consumption achievement data. Then it executes the population-constituting user identification information-obtaining program stored in the "main memory" so as to obtain the population-constituting user identification information which is information for identifying users constituting the population appropriate as mutual comparison targets in terms of the user comparison attributes on the basis of the accumulated energy consumption achievement data. Then it executes the energy-saving promotion achievement evaluation result-obtaining program stored in the "main memory" so as to obtain the energy consumption achievement data of the user identified by the population-constituting user identification information as the energy-saving promotion achievement evaluation result in association with the user identification information based on the held energy-saving evaluation rule. Lastly, it outputs the energy-saving promotion achievement evaluation result in association with the user identification information to the user terminal device via the "network interface" by executing the evaluation result-outputting program stored in the "main memory". In addition, the incentive information is output in association with the user identification information and/or group identification information on the basis of the energy-saving promotion achievement evaluation result obtained in association with the user identification information and/or group identification information, by executing the incentive information-outputting program stored in the "main memory".

Flow of Processing

Figure 16:
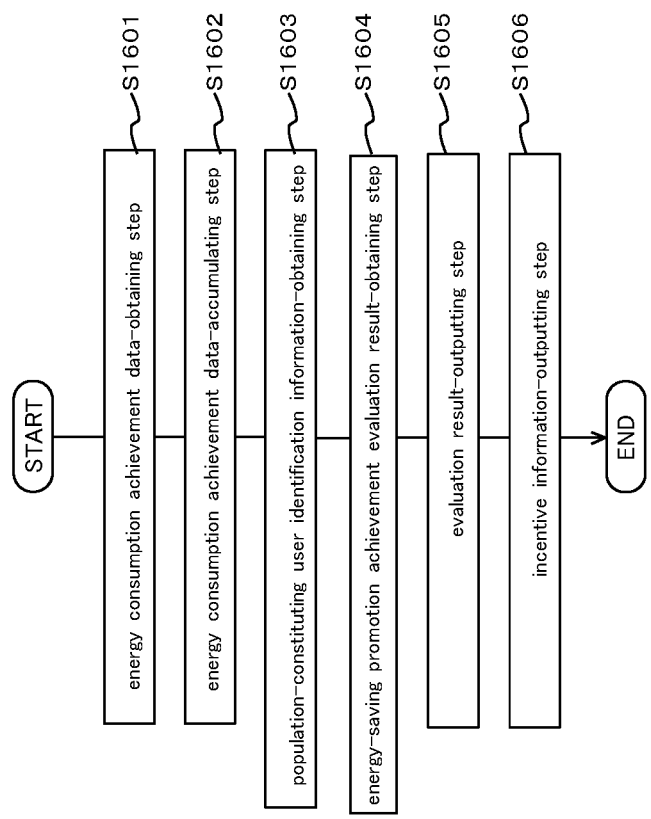
FIG. 16 is a view illustrating a flow of processing in using the energy-saving promotion achievement-evaluating device in the embodiment 6.

FIG. 16 is a diagram illustrating a flow of processing in using the energy-saving promotion achievement-evaluating device in this embodiment. As illustrated in FIG. 16, this is a processing method consisting of an energy consumption achievement data-obtaining step (S1601), an energy consumption achievement data-accumulating step (S1602), a population-constituting user identification information-obtaining step (S1603), an energy-saving promotion achievement evaluation result-obtaining step (S1604), an evaluation result-outputting step (S1605), and an incentive information-outputting step (S1606). These processing methods are executed by the energy-saving promotion achievement-evaluating device comprising: the user comparison information-holding unit for holding the user comparison information in which the user identification information of the user working on energy saving is associated with comparison attributes, the comparison attributes being indexes suitable for mutual comparison on the basis of user attributes which are any one or more attributes of the business type, the business scale, the energy consumption area, the family structure, and the energy consumption achievement of the user; the energy-saving evaluation rule-holding unit for holding the energy-saving evaluation rule which is a rule for evaluating the energy-saving promotion achievement on the basis of the energy consumption achievement data; and the incentive information-holding unit for holding the energy-saving promotion achievement evaluation result and the incentive information associated with each other. It should be noted that, in FIG. 16, each of the steps except the incentive information-outputting step is similar to those in the embodiment 1. In the following, the incentive information-outputting step will be described.

The "incentive information-outputting step" is a step of outputting the incentive information in association with the user identification information and/or group identification information on the basis of the energy-saving promotion achievement evaluation result obtained in association with the user identification information and/or group identification information.

Conclusion

As described above, an incentive can be given with respect to those making energy-saving efforts leading to some results, and thus the competitive spirit is aroused more actively.

Embodiment 7

In addition to the features of the embodiments 1 to 6, the energy-saving promotion system in this embodiment is configured such that the user terminal device obtains the energy-saving promotion achievement evaluation result output from the energy-saving promotion achievement-evaluating device.

Hereinafter, the energy-saving promotion system in this embodiment will be described on a functional configuration, a hardware configuration, and a flow of processing in order.

Functional Configuration

Figure 17:
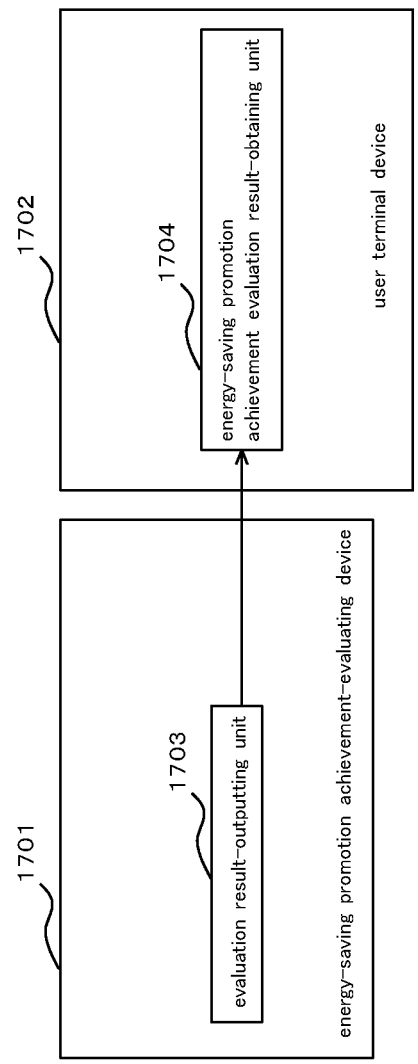
FIG. 17 is a diagram illustrating a functional configuration of an energy-saving promotion achievement-evaluating device in an embodiment 7.

FIG. 17 is a diagram illustrating the functional configuration of the energy-saving promotion system in this embodiment. The energy-saving promotion system in this embodiment consists of the energy-saving promotion achievement-evaluating device (1701) and the user terminal device (1702). The energy-saving promotion achievement-evaluating device comprises a user comparison information-holding unit, an energy consumption achievement data-obtaining unit, an energy consumption achievement data-accumulating unit, an energy-saving evaluation rule-holding unit, a population-constituting user identification information-obtaining unit, an energy-saving promotion achievement evaluation result-obtaining unit, and an evaluation result-outputting unit (1703). The user terminal device comprises an energy-saving promotion achievement evaluation result-obtaining unit (1704).

Hereinafter, details of each function will be described specifically for the functional configuration. It should be noted that each of the functions except the evaluation result-outputting unit of the energy-saving promotion achievement-evaluating device and the energy-saving promotion achievement evaluation result-obtaining unit of the user terminal device is similar to those in the embodiment 1, and thus, only the functions of the evaluation result-outputting unit of the energy-saving promotion achievement-evaluating device and the energy-saving promotion achievement evaluation result-obtaining unit of the user terminal device will be described.

The "evaluation result-outputting unit" is, as described in the embodiment 1, a function of outputting the energy-saving promotion achievement evaluation result in association with the user identification information. The contents of the energy-saving promotion achievement evaluation result are as described in the embodiment 1. In this embodiment, an output destination is the user terminal device.

The "energy-saving promotion achievement evaluation result-obtaining unit" is a function of obtaining the energy-saving promotion achievement evaluation result output from the evaluation result-outputting unit. As a result, the energy-saving promotion achievement evaluation results can be accumulated in the user terminal device. Then, if the user terminal device is provided with the function of outputting the obtained energy-saving promotion achievement evaluation result, it can display the energy-saving promotion achievement evaluation result, which leads to motivation of energy saving by the user.

Hardware Configuration

Figure 18:
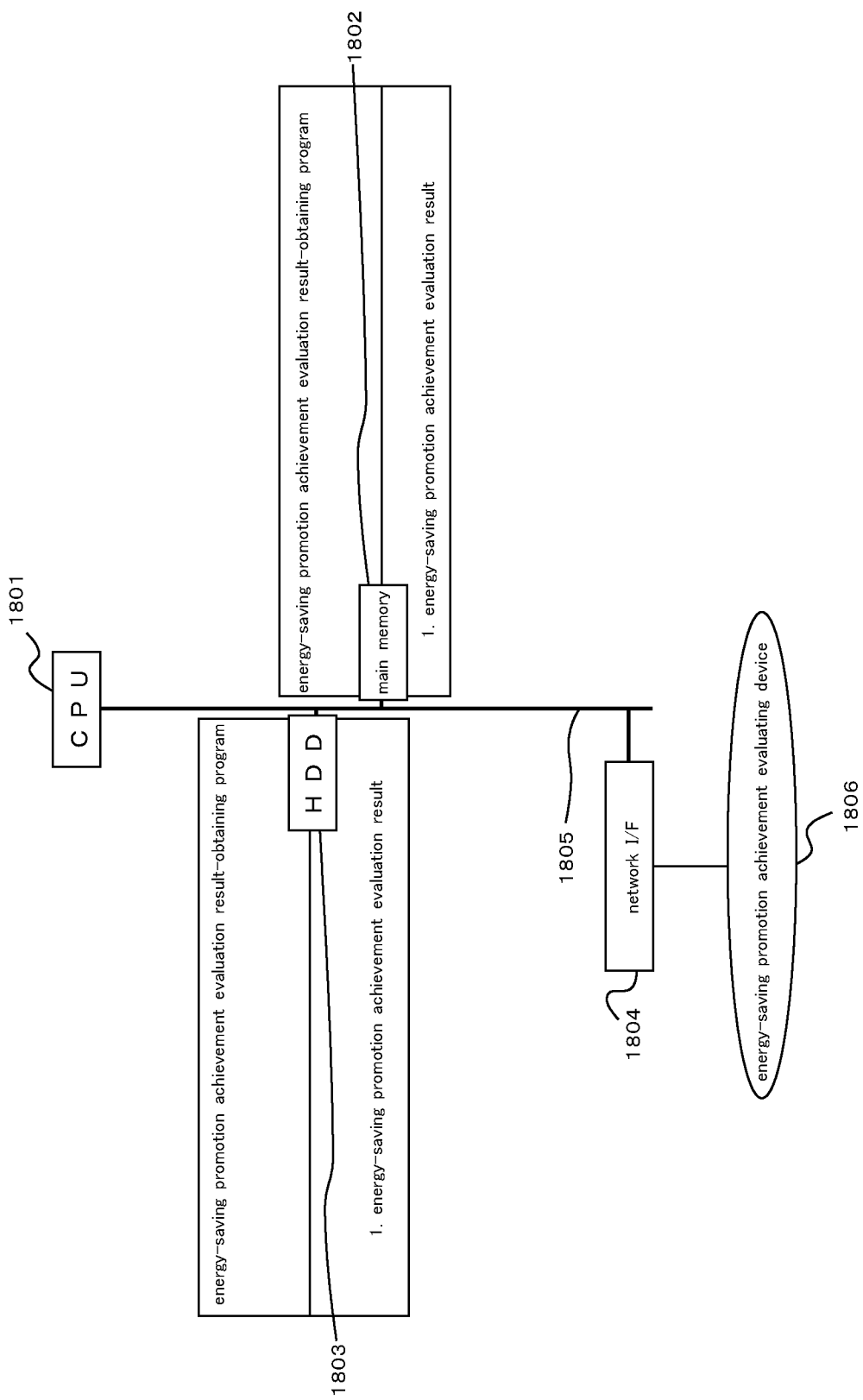
FIG. 18 is a diagram illustrating a hardware configuration of the energy-saving promotion achievement-evaluating device in the embodiment 7.

FIG. 18 is a diagram illustrating a hardware configuration of the energy-saving promotion system of this embodiment. The energy-saving promotion system consists of the energy-saving promotion achievement-evaluating device and the user terminal device. Among them, the energy-saving promotion achievement-evaluating device is similar to that described in the embodiment 1. The hardware configuration of the user terminal device will be described below.

The user terminal device comprises a "CPU (central processing unit)" (1801) for executing various types of calculation processing and a "main memory" (1802). Moreover, it comprises an "HDD" (1803) for holding predetermined information and a "network I/F (interface)" (1804) for conducting transmission/reception of information with the energy-saving promotion achievement evaluating device (1806). Then they are mutually connected via a data communication path such as a "system bus" (1805) and conducts transmission/reception and processing of the information.

Here, the "main memory" reads out programs for executing various types of processing so as to have them executed by the "CPU" and also provides a work area which is also a work region of the programs. Moreover, a plurality of addresses are assigned to each of the "main memory" and the "HDD", and the program executed by the "CPU" is capable of exchange and processing of data by specifying the address for an access.

In this embodiment, the program stored in the "main memory" is an energy-saving promotion achievement evaluation result-obtaining program. The "CPU" executes the energy-saving promotion achievement evaluation result-obtaining program stored in the "main memory" so as to obtain the energy-saving promotion achievement evaluation result from the energy-saving promotion achievement evaluating device via the "network interface". The obtained energy-saving promotion achievement evaluation result is stored in the "main memory" and the "HDD".

Flow of Processing

Figure 19:
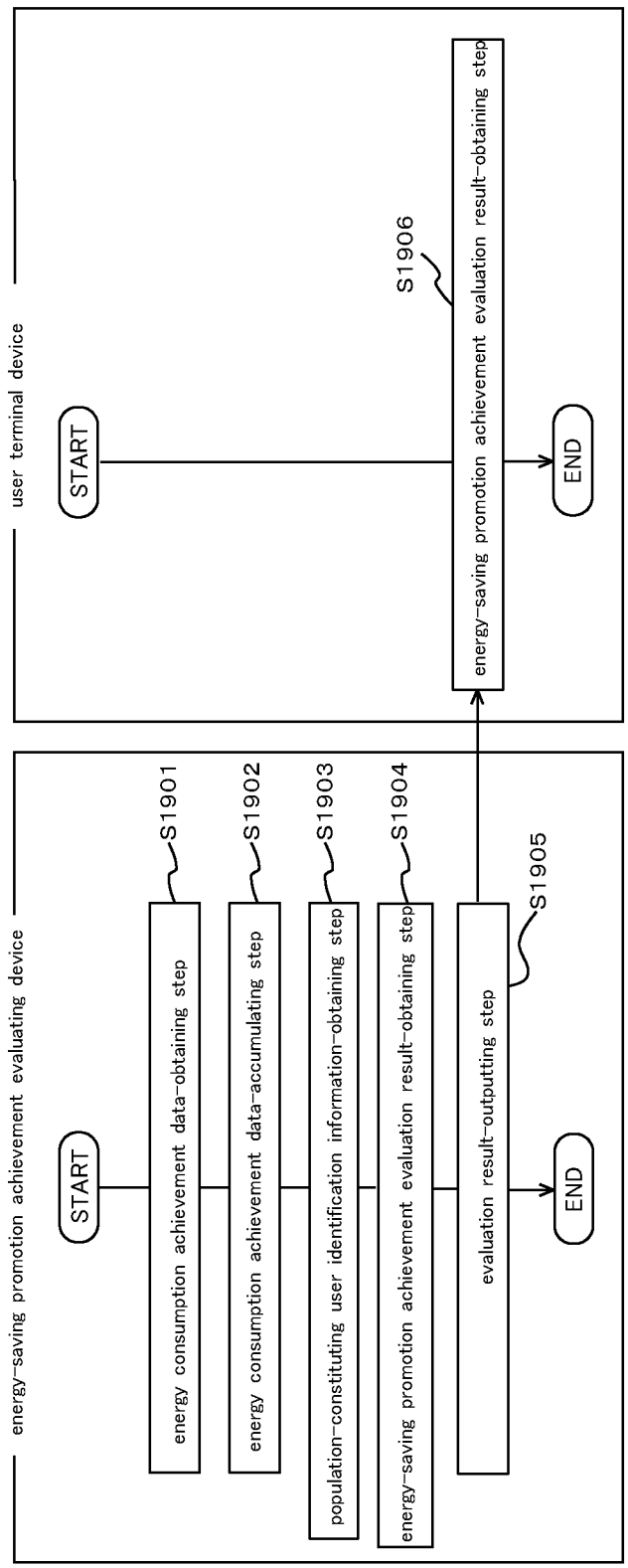
FIG. 19 is a view illustrating a flow of processing in using the energy-saving promotion achievement-evaluating device in the embodiment 7.

FIG. 19 is a diagram illustrating a flow of processing in using the energy-saving promotion system in this embodiment. As illustrated in FIG. 19, this is a processing method consisting of an energy consumption achievement data-obtaining step (S1901), an energy consumption achievement data-accumulating step (S1902), a population-constituting user identification information-obtaining step (S1903), an energy-saving promotion achievement evaluation result-obtaining step (S1904), an evaluation result-outputting step (S1905), and an energy-saving promotion achievement evaluation result-obtaining step (S1906). These processing methods are executed by the energy-saving promotion achievement-evaluating device and the user terminal device, the energy-saving promotion achievement-evaluating device comprising: the user comparison information-holding unit for holding the user comparison information in which the user identification information of the user working on energy saving is associated with comparison attributes, the comparison attributes being indexes suitable for mutual comparison on the basis of user attributes which are any one or more attributes of the business type, the business scale, the energy consumption area, the family structure, and the energy consumption achievement of the user; and the energy-saving evaluation rule-holding unit for holding the energy-saving evaluation rule which is a rule for evaluating the energy-saving promotion achievement on the basis of the energy consumption achievement data. It should be noted that, in FIG. 19, each of the steps except the energy-saving promotion achievement evaluation result-obtaining step is similar to those in the embodiment 1. In the following, the energy-saving promotion achievement evaluation result-obtaining step will be described.

The "energy-saving promotion achievement evaluation result-obtaining step" is a step of obtaining the energy-saving promotion achievement evaluation result output at the evaluation result-outputting step.

Conclusion

As described above, the energy-saving promotion achievement evaluation results can be accumulated in the user terminal device. Then, if the user terminal device is provided with the function of outputting the obtained energy-saving promotion achievement evaluation result, it can display the energy-saving promotion achievement evaluation result, which leads to motivation of energy saving by the user.

Embodiment 8

In addition to the features of the embodiment 7, the energy-saving promotion system in this embodiment is configured such that the user terminal device obtains the incentive information output from the energy-saving promotion achievement-evaluating device.

Hereinafter, the energy-saving promotion system in this embodiment will be described on a functional configuration, a hardware configuration, and a flow of processing in order.

Functional Configuration

Figure 20:
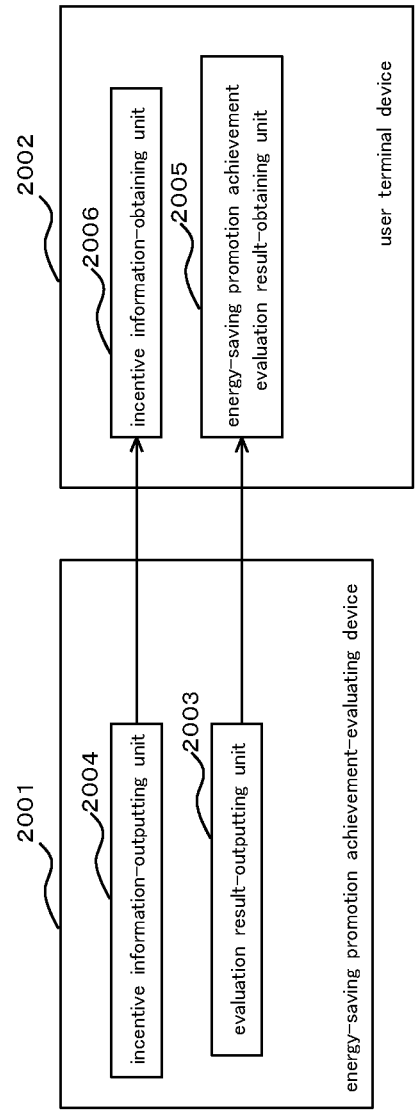
FIG. 20 is a diagram illustrating a functional configuration of an energy-saving promotion achievement-evaluating device in an embodiment 8.

FIG. 20 is a diagram illustrating the functional configuration of the energy-saving promotion system in this embodiment. The energy-saving promotion system in this embodiment consists of the energy-saving promotion achievement-evaluating device (2001) and the user terminal device (2002). The energy-saving promotion achievement-evaluating device comprises a user comparison information-holding unit, an energy consumption achievement data-obtaining unit, an energy consumption achievement data-accumulating unit, an energy-saving evaluation rule-holding unit, a population-constituting user identification information-obtaining unit, an energy-saving promotion achievement evaluation result-obtaining unit, an evaluation result-outputting unit (2003), an incentive information-holding unit, and an incentive information-outputting unit (2004). The user terminal device comprises an energy-saving promotion achievement evaluation result-obtaining unit (2005) and an incentive information-obtaining unit (2006).

Hereinafter, details of each function will be described specifically for the functional configuration. It should be noted that each of the functions except the incentive information-outputting unit of the energy-saving promotion achievement-evaluating device and the incentive information-obtaining unit of the user terminal device is similar to those in the embodiments 6 and 7, and thus, only the functions of the incentive information-outputting unit of the energy-saving promotion achievement-evaluating device and the incentive information-obtaining unit of the user terminal device will be described.

As described in the embodiment 6, the "incentive information-outputting unit" is a function of outputting the incentive information in association with the user identification information and/or the group identification information on the basis of the energy-saving promotion achievement evaluation result obtained in association with the user identification information and/or the group identification information. The contents of the incentive are as described in the embodiment 6. In this embodiment, an output destination is the user terminal device.

The "incentive information-obtaining unit" is a function of obtaining the incentive information output from the incentive information-outputting unit. As a result, the incentive information can be obtained by the user terminal device. Then, if the user terminal device is provided with the function of outputting the obtained incentive information, it can display the incentive information, which further increases the motivation of the user working on energy saving.

Hardware Configuration

Figure 21:
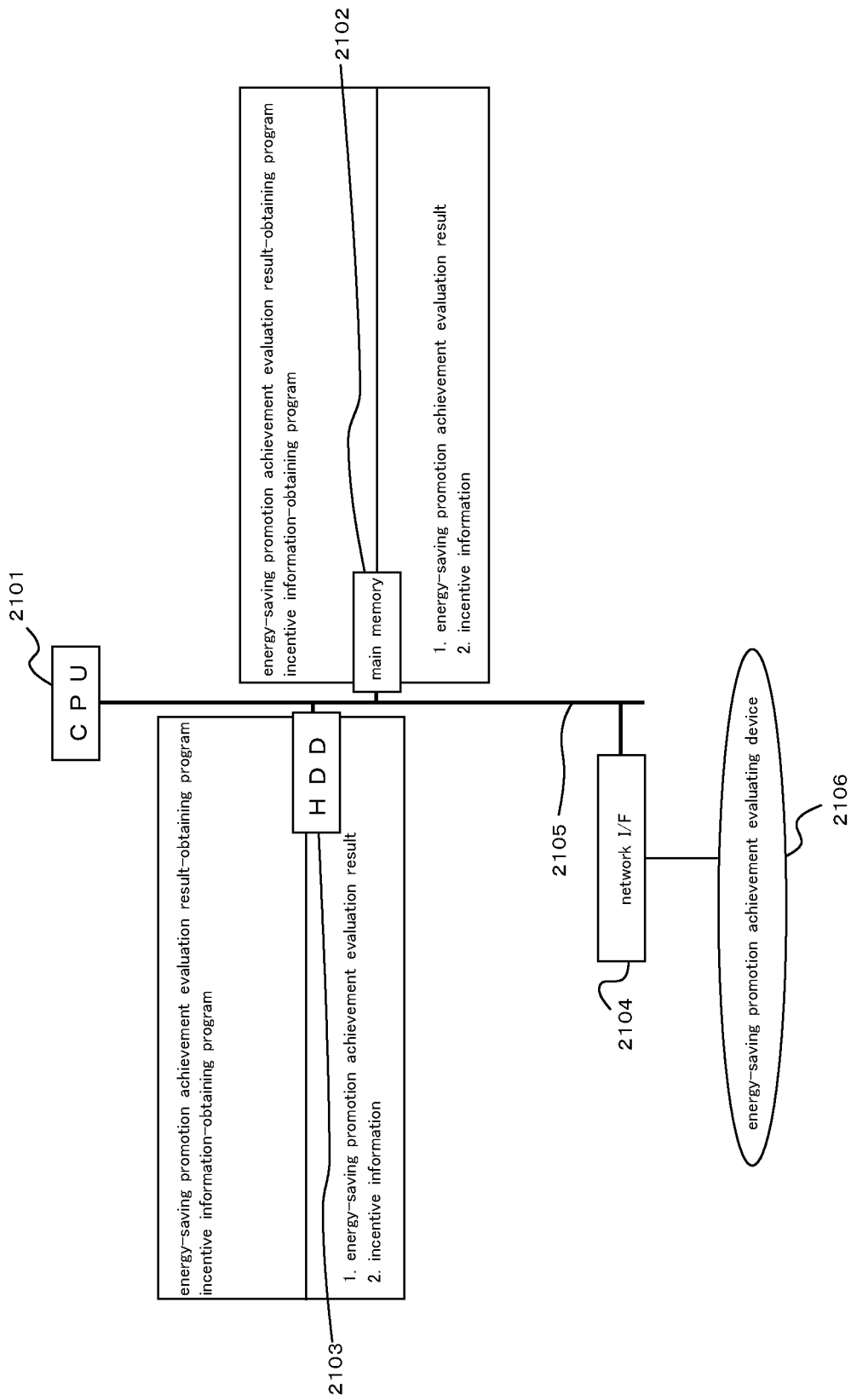
FIG. 21 is a diagram illustrating a hardware configuration of the energy-saving promotion achievement-evaluating device in the embodiment 8.

FIG. 21 is a diagram illustrating a hardware configuration of the energy-saving promotion system of this embodiment. The energy-saving promotion system consists of the energy-saving promotion achievement-evaluating device and the user terminal device. Among them, the energy-saving promotion achievement-evaluating device is similar to that described in the embodiment 6. The hardware configuration of the user terminal device will be described below.

The user terminal device comprises a "CPU (central processing unit)" (2101) for executing various types of calculation processing and a "main memory" (2102). Moreover, it comprises an "HDD" (2103) for holding predetermined information and a "network I/F (interface)" (2104) for conducting transmission/reception of information with the energy-saving promotion achievement evaluating device (2106). Then they are mutually connected via a data communication path such as a "system bus" (2105) and conducts transmission/reception and processing of the information.

Here, the "main memory" reads out programs for executing various types of processing so as to have them executed by the "CPU" and also provides a work area which is also a work region of the programs. Moreover, a plurality of addresses are assigned to each of the "main memory" and the "HDD", and the program executed by the "CPU" is capable of exchange and processing of data by specifying the address for an access.

In this embodiment, the programs stored in the "main memory" are an energy-saving promotion achievement evaluation result-obtaining program and an incentive information-obtaining program. The "CPU" executes the energy-saving promotion achievement evaluation result-obtaining program stored in the "main memory" so as to obtain the energy-saving promotion achievement evaluation result from the energy-saving promotion achievement evaluating device via the "network interface". The "CPU" executes the incentive information-obtaining program stored in the "main memory" so as to obtain the incentive information from the energy-saving promotion achievement evaluating device via the "network interface". The obtained energy-saving promotion achievement evaluation result and the incentive information are stored in the "main memory" and the "HDD".

Flow of Processing

Figure 22:
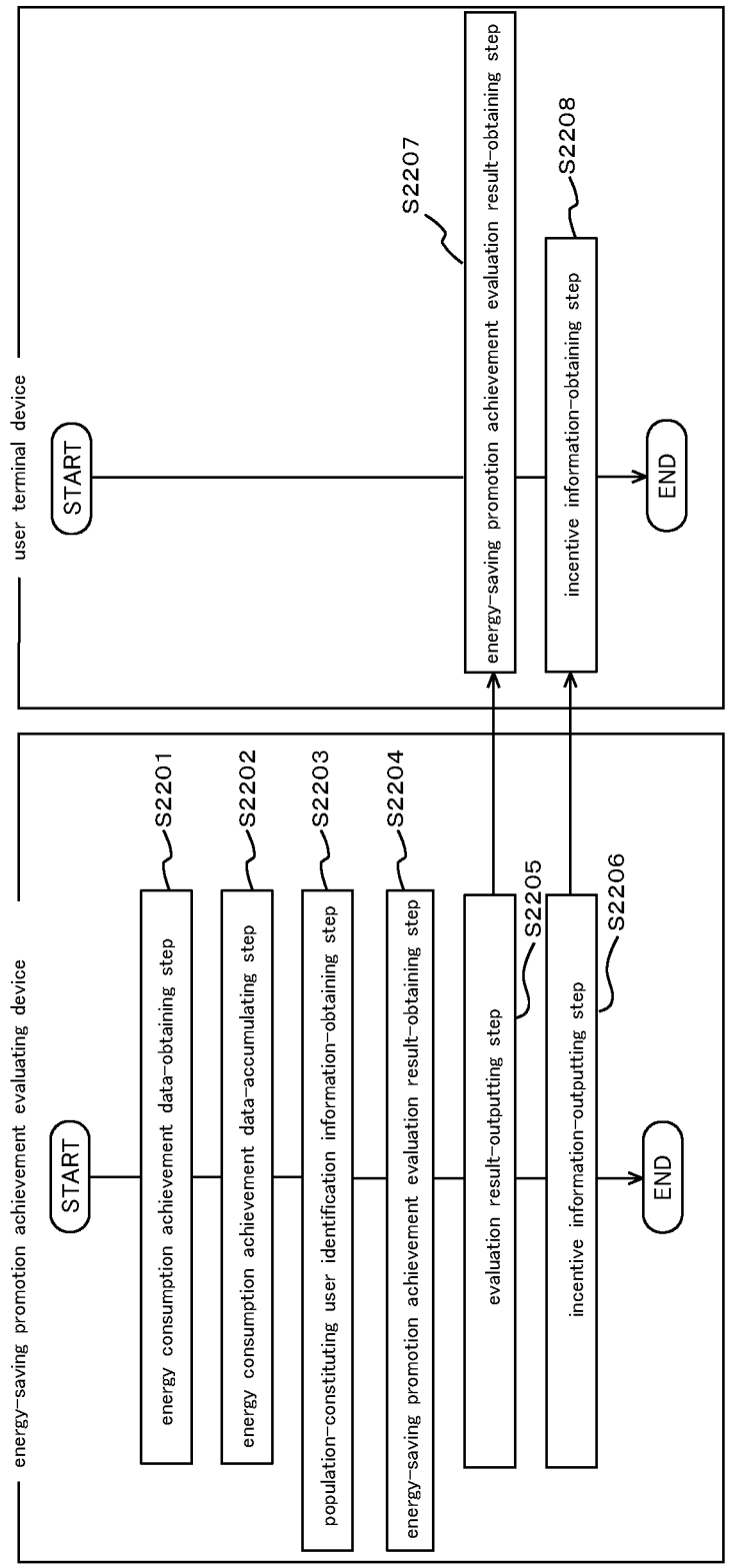
FIG. 22 is a view illustrating a flow of processing in using the energy-saving promotion achievement-evaluating device in the embodiment 8.

FIG. 22 is a diagram illustrating a flow of processing in using the energy-saving promotion system in this embodiment. As illustrated in FIG. 22, this is a processing method consisting of an energy consumption achievement data-obtaining step (S2201), an energy consumption achievement data-accumulating step (S2202), a population-constituting user identification information-obtaining step (S2203), an energy-saving promotion achievement evaluation result-obtaining step (S2204), an evaluation result-outputting step (S2205), an incentive information-outputting step (S2206), an energy-saving promotion achievement evaluation result-obtaining step (S2207), and an incentive information-obtaining step (S2208). These processing methods are executed by the energy-saving promotion achievement-evaluating device and the user terminal device, the energy-saving promotion achievement-evaluating device comprising: the user comparison information-holding unit for holding the user comparison information in which the user identification information of the user working on energy saving is associated with comparison attributes, the comparison attributes being indexes suitable for mutual comparison on the basis of user attributes which are any one or more attributes of the business type, the business scale, the energy consumption area, the family structure, and the energy consumption achievement of the user; the energy-saving evaluation rule-holding unit for holding the energy-saving evaluation rule which is a rule for evaluating the energy-saving promotion achievement on the basis of the energy consumption achievement data; and the incentive information-holding unit for holding the energy-saving promotion achievement evaluation result and the incentive information associated with each other. It should be noted that, in FIG. 22, each of the steps except the energy-saving promotion achievement evaluation result-obtaining step is similar to those in the embodiments 6 and 7. In the following, the incentive information-obtaining step will be described.

The "incentive information-obtaining step" is a step of obtaining the incentive information-outputting at the incentive information-outputting step.

Conclusion

As described above, the incentive information can be obtained by the user terminal device. Then, if the user terminal device is provided with the function of outputting the obtained incentive information, it can display the incentive information, which further increases the motivation of the user working on energy saving.

Embodiment 9

In addition to the features of the embodiment 8, the energy-saving promotion system in this embodiment is configured such that the incentive information is configured to be capable of selecting a plurality of incentives by the incentive identification information, and the user terminal device selects the incentive identification information included in the obtained incentive information and outputs the selected incentive identification information.

Hereinafter, the energy-saving promotion system in this embodiment will be described on a functional configuration, a hardware configuration, and a flow of processing in order.

Functional Configuration

Figure 23:
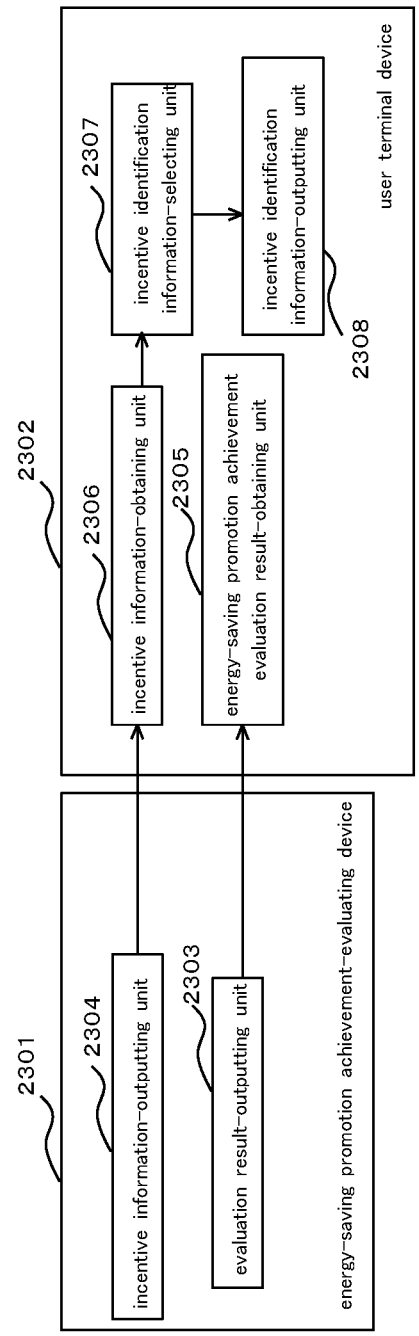
FIG. 23 is a diagram illustrating a functional configuration of an energy-saving promotion achievement-evaluating device in an embodiment 9.

FIG. 23 is a diagram illustrating the functional configuration of the energy-saving promotion system in this embodiment. The energy-saving promotion system in this embodiment consists of the energy-saving promotion achievement-evaluating device (2301) and the user terminal device (2302). The energy-saving promotion achievement-evaluating device comprises a user comparison information-holding unit, an energy consumption achievement data-obtaining unit, an energy consumption achievement data-accumulating unit, an energy-saving evaluation rule-holding unit, a population-constituting user identification information-obtaining unit, an energy-saving promotion achievement evaluation result-obtaining unit, an evaluation result-outputting unit (2303), an incentive information-holding unit, and an incentive information-outputting unit (2304). The user terminal device comprises an energy-saving promotion achievement evaluation result-obtaining unit (2305), an incentive information-obtaining unit (2306), an incentive identification information-selecting unit (2307), and an incentive identification information-outputting unit (2308).

Hereinafter, details of each function will be described specifically for the functional configuration. Each of the functions except the incentive identification information-selecting unit and the incentive identification information-outputting unit of the user terminal device is similar to those in the embodiments 6 and 8 and thus, only the functions of the incentive identification information-selecting unit and the incentive identification information-outputting unit of the user terminal device will be described.

The "incentive identification information-selecting unit" is a function of selecting the incentive identification information included in the obtained incentive information. Although the incentive may be information configured capable of selecting a plurality of incentives by the incentive identification information as described in the embodiment 4, this embodiment presupposes that the incentive is the information configured capable of selecting the plurality of incentives by the incentive identification information.

The incentive identification information refers to an order number issued when a user makes a selection in the options of a plurality of incentives, for example.

The "incentive identification information-outputting unit" is a function of outputting the selected incentive identification information. As a result, the incentive identification information related to the incentive selected by the user on the user terminal device can be output. Then, the user can receive the incentive by using the incentive identification information.

Hardware Configuration

Figure 24:
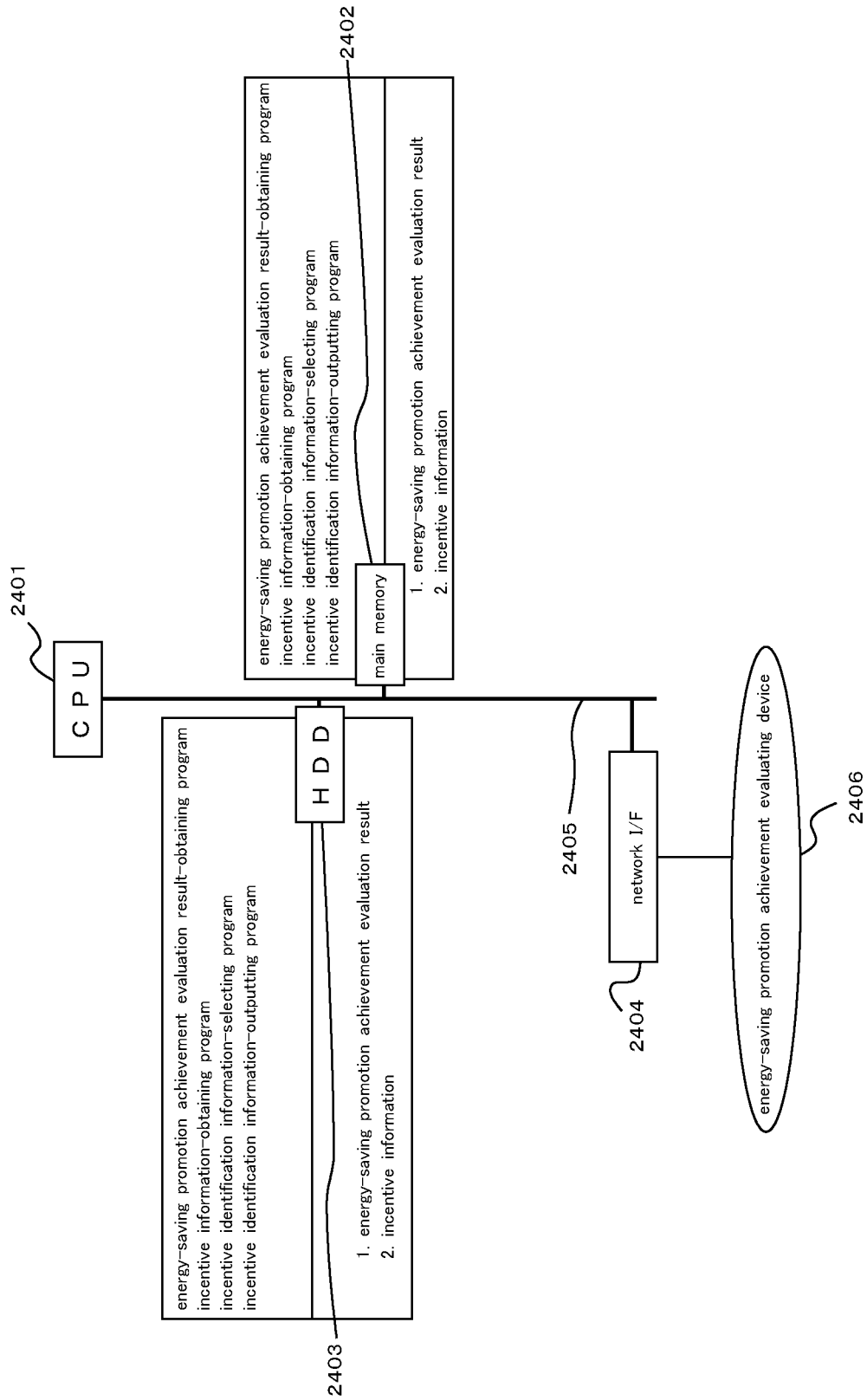
FIG. 24 is a diagram illustrating a hardware configuration of the energy-saving promotion achievement-evaluating device in the embodiment 9.

FIG. 24 is a diagram illustrating a hardware configuration of the energy-saving promotion system of this embodiment. The energy-saving promotion system consists of the energy-saving promotion achievement-evaluating device and the user terminal device. Among them, the energy-saving promotion achievement-evaluating device is similar to that described in the embodiment 6. The hardware configuration of the user terminal device will be described below.

The user terminal device comprises a "CPU (central processing unit)" (2401) for executing various types of calculation processing and a "main memory" (2402). Moreover, it comprises an "HDD" (2403) for holding predetermined information and a "network I/F (interface)" (2404) for conducting transmission/reception of information with the energy-saving promotion achievement evaluating device (2406). Then they are mutually connected via a data communication path such as a "system bus" (2405) and conducts transmission/reception and processing of the information.

Here, the "main memory" reads out programs for executing various types of processing so as to have them executed by the "CPU" and also provides a work area which is also a work region of the programs. Moreover, a plurality of addresses are assigned to each of the "main memory" and the "HDD", and the program executed by the "CPU" is capable of exchange and processing of data by specifying the address for an access.

In this embodiment, the programs stored in the "main memory" are an energy-saving promotion achievement evaluation result-obtaining program, an incentive information-obtaining program, an incentive identification information-selecting program, and an incentive identification information-outputting program. The "CPU" executes the energy-saving promotion achievement evaluation result-obtaining program stored in the "main memory" so as to obtain the energy-saving promotion achievement evaluation result from the energy-saving promotion achievement evaluating device via the "network interface". The "CPU" executes the incentive information-obtaining program stored in the "main memory" so as to obtain the incentive information including the incentive identification information from the energy-saving promotion achievement evaluating device via the "network interface". The obtained energy-saving promotion achievement evaluation result and the incentive information including the incentive identification information are stored in the "main memory" and the "HDD".

Moreover, the "CPU" selects the incentive identification information included in the obtained incentive information by using the incentive identification information-selecting program stored in the "main memory". Then, the "CPU" outputs the selected incentive identification information by using the incentive identification information-outputting program stored in the "main memory".

Flow of Processing

Figure 25:
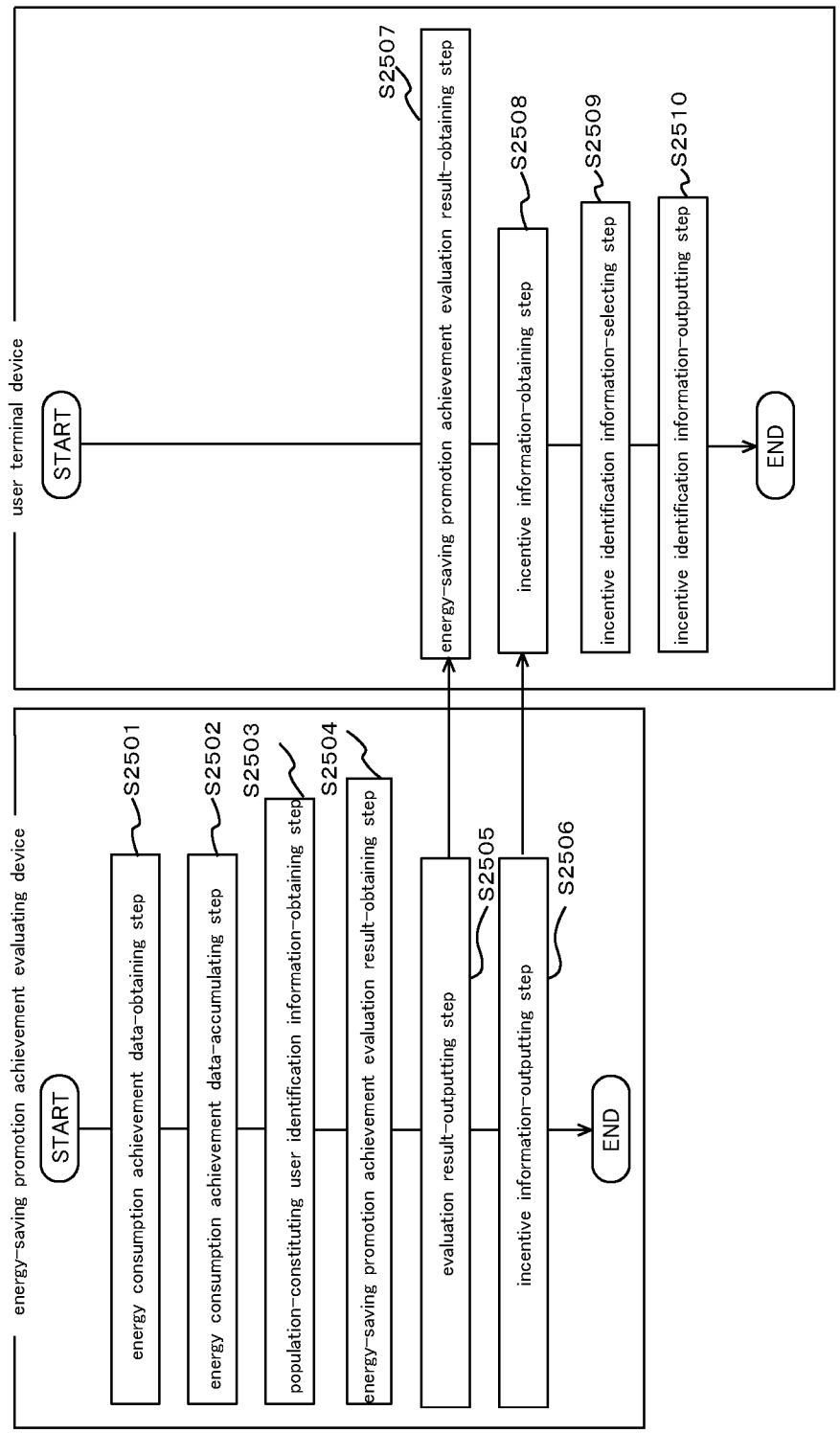
FIG. 25 is a view illustrating a flow of processing in using the energy-saving promotion achievement-evaluating device in the embodiment 9.

FIG. 25 is a diagram illustrating a flow of processing in using the energy-saving promotion system in this embodiment. As illustrated in FIG. 25, this is a processing method consisting of an energy consumption achievement data-obtaining step (S2501), an energy consumption achievement data-accumulating step (S2502), a population-constituting user identification information-obtaining step (S2503), an energy-saving promotion achievement evaluation result-obtaining step (S2504), an evaluation result-outputting step (S2505), an incentive information-outputting step (S2506), an energy-saving promotion achievement evaluation result-obtaining step (S2507), an incentive information-obtaining step (S2508), an incentive identification information-selecting step (S2509), and an incentive identification information-outputting step (S2510). These processing methods are executed by the energy-saving promotion achievement-evaluating device and the user terminal device, the energy-saving promotion achievement-evaluating device comprising: the user comparison information-holding unit for holding the user comparison information in which the user identification information of the user working on energy saving is associated with comparison attributes, the comparison attributes being indexes suitable for mutual comparison on the basis of user attributes which are any one or more attributes of the business type, the business scale, the energy consumption area, the family structure, and the energy consumption achievement of the user; the energy-saving evaluation rule-holding unit for holding the energy-saving evaluation rule which is a rule for evaluating the energy-saving promotion achievement on the basis of the energy consumption achievement data; and the incentive information-holding unit for holding the energy-saving promotion achievement evaluation result and the incentive information associated with each other. It should be noted that, in FIG. 25, each of the steps except the incentive identification information-selecting step and the incentive identification information-outputting step is similar to those in the embodiments 6 to 8. In the following, the incentive identification information-selecting step and the incentive identification information-outputting step will be described.

The "incentive identification information-selecting step" is a step of selecting the incentive identification information included in the obtained incentive information.

The "incentive identification information-outputting step" is a step of outputting the selected incentive identification information.

Conclusion

As a result, the user can select the desired incentive among the plurality of incentives and receive the desired incentive.

Embodiment 10

In addition to the features of the embodiment 9, the energy-saving promotion system in this embodiment is further configured such that it comprises an E-commerce server device for executing purchase and sale of goods and/or services via the Internet, and the user terminal device executes commercial transaction with the E-commerce server device in accordance with the obtained incentive information.

Figure 39:
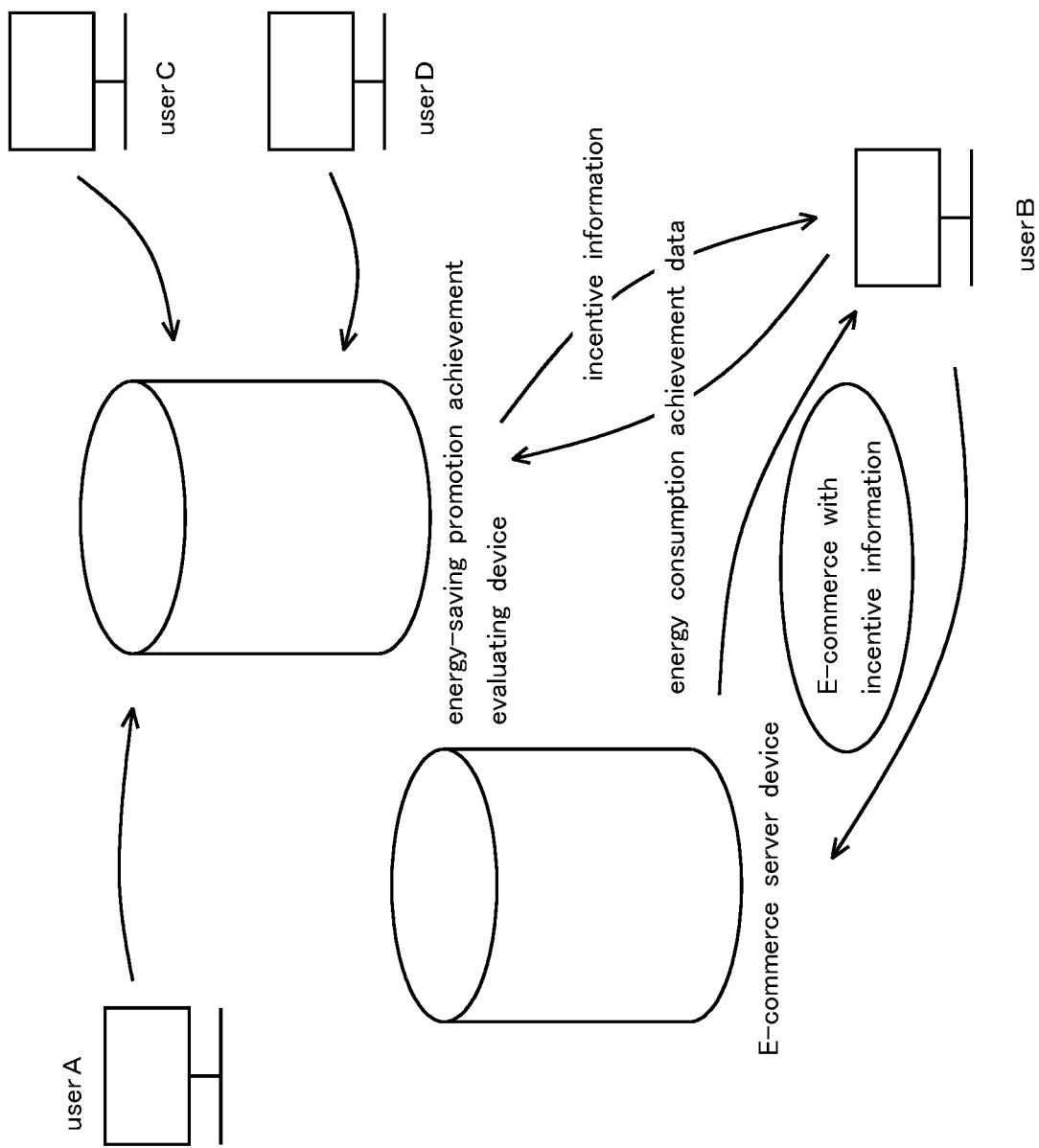
FIG. 39 is a diagram illustrating an example of the entire image of this embodiment.

FIG. 39 is a diagram illustrating an example of an entire image of this embodiment. Client terminals of each of the users A, B, C, and D communicate with the energy-saving promotion achievement-evaluating device, the energy consumption achievement data is transmitted from the client terminal to the energy-saving promotion achievement-evaluating device, and the incentive information is output from the energy-saving promotion achievement-evaluating device to the client terminal of the user B having particularly excellent energy-saving achievement. The user B who receives the output of the incentive information transmits the incentive information from his/her own client terminal to an E-commerce server device and performs E-commerce with the E-commerce server device.

Hereinafter, the energy-saving promotion system in this embodiment will be described on a functional configuration, a hardware configuration, and a flow of processing in order.

Functional Configuration

Figure 26:
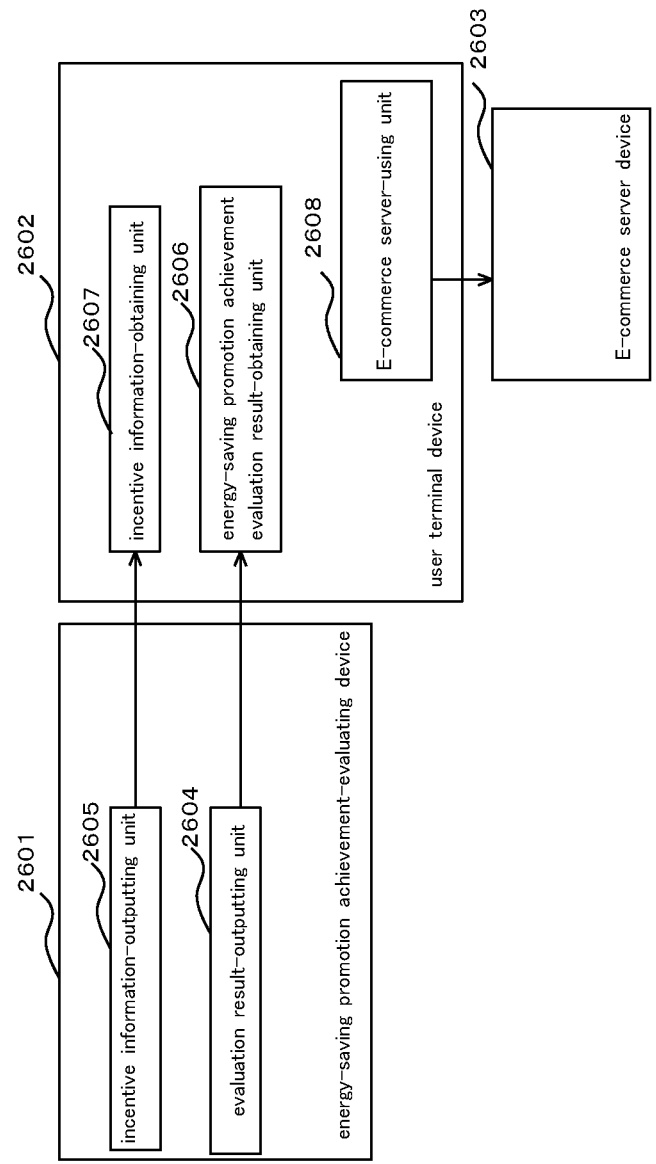
FIG. 26 is a diagram illustrating a functional configuration of an energy-saving promotion achievement-evaluating device in an embodiment 10.

FIG. 26 is a diagram illustrating the functional configuration of the energy-saving promotion system in this embodiment. The energy-saving promotion system in this embodiment consists of the energy-saving promotion achievement-evaluating device (2601), the user terminal device (2602), and the E-commerce server device (2603). The energy-saving promotion achievement-evaluating device comprises a user comparison information-holding unit, an energy consumption achievement data-obtaining unit, an energy consumption achievement data-accumulating unit, an energy-saving evaluation rule-holding unit, a population-constituting user identification information-obtaining unit, an energy-saving promotion achievement evaluation result-obtaining unit, an evaluation result-outputting unit (2604), an incentive information-holding unit, and an incentive information-outputting unit (2605). The user terminal device comprises an energy-saving promotion achievement evaluation result-obtaining unit (2606), an incentive information-obtaining unit (2607), and an E-commerce server-using unit (2608). The E-commerce server device is present as a device executing purchase/sales of articles and/or services via the Internet.

Hereinafter, details of each function will be described specifically for the functional configuration. Each of the functions except the E-commerce server-using unit of the user terminal device is similar to those in the embodiment 8 and thus, only the functions of the E-commerce server-using unit will be described.

The "E-commerce server-using unit" is a function of executing commercial transaction with the E-commerce server device in accordance with the obtained incentive information. Particularly in the case of the incentive information including the incentive identification information, the incentive identified by the incentive identification information is a target of the commercial transaction. As a result, the user can actually receive the incentive.

Hardware Configuration

Figure 27:
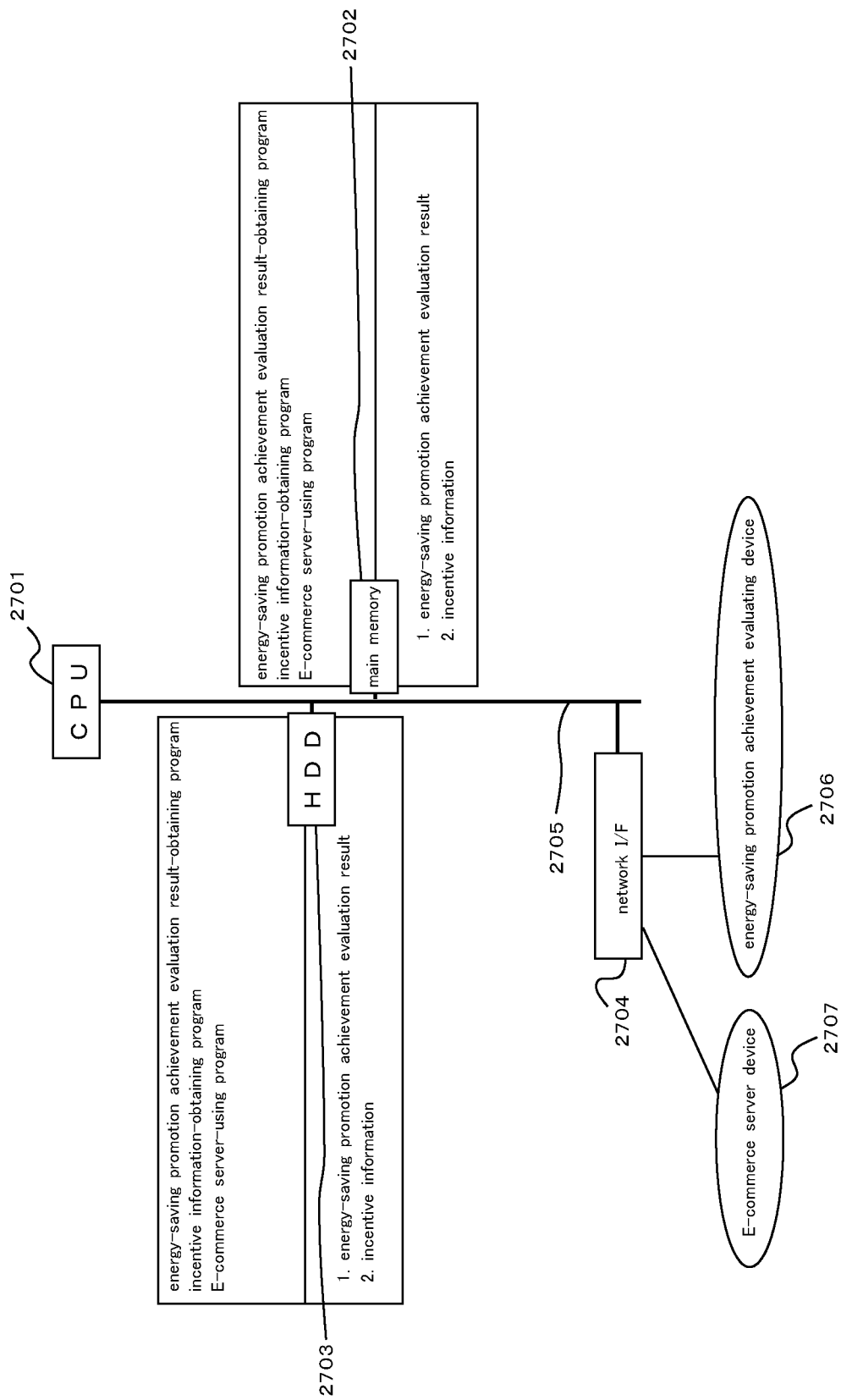
FIG. 27 is a diagram illustrating a hardware configuration of the energy-saving promotion achievement-evaluating device in the embodiment 10.

FIG. 27 is a diagram illustrating a hardware configuration of the energy-saving promotion system of this embodiment. The energy-saving promotion system consists of the energy-saving promotion achievement-evaluating device, the user terminal device, and the E-commerce server device. Among them, the energy-saving promotion achievement-evaluating device is similar to that described in the embodiment 6. It should be noted that the E-commerce server device executes purchase/sales of articles and/or services via the Internet and in the present invention, it does not comprise a particular action as a constituent. The hardware configuration of the user terminal device will be described below.

The user terminal device comprises a "CPU (central processing unit)" (2701) for executing various types of calculation processing and a "main memory" (2702). Moreover, it comprises an "HDD" (2703) for holding predetermined information and a "network I/F (interface)" (2704) for conducting transmission/reception of information with the energy-saving promotion achievement evaluating device (2706) and the E-commerce server device (2707). Then they are mutually connected via a data communication path such as a "system bus" (2705) and conducts transmission/reception and processing of the information.

Here, the "main memory" reads out programs for executing various types of processing so as to have them executed by the "CPU" and also provides a work area which is also a work region of the programs. Moreover, a plurality of addresses are assigned to each of the "main memory" and the "HDD", and the program executed by the "CPU" is capable of exchange and processing of data by specifying the address for an access.

In this embodiment, the programs stored in the "main memory" are an energy-saving promotion achievement evaluation result-obtaining program, an incentive information-obtaining program, and an E-commerce server-using program. The "CPU" executes the energy-saving promotion achievement evaluation result-obtaining program stored in the "main memory" so as to obtain the energy-saving promotion achievement evaluation result from the energy-saving promotion achievement evaluating device via the "network interface". The "CPU" executes the incentive information-obtaining program stored in the "main memory" so as to obtain the incentive information from the energy-saving promotion achievement evaluating device via the "network interface". The obtained energy-saving promotion achievement evaluation result and the incentive information are stored in the "main memory" and the "HDD". Then, the "CPU" executes the commercial transaction with the E-commerce server device in accordance with the obtained incentive information via the "network interface" by using the E-commerce server using program stored in the "main memory".

Flow of Processing

Figure 28:
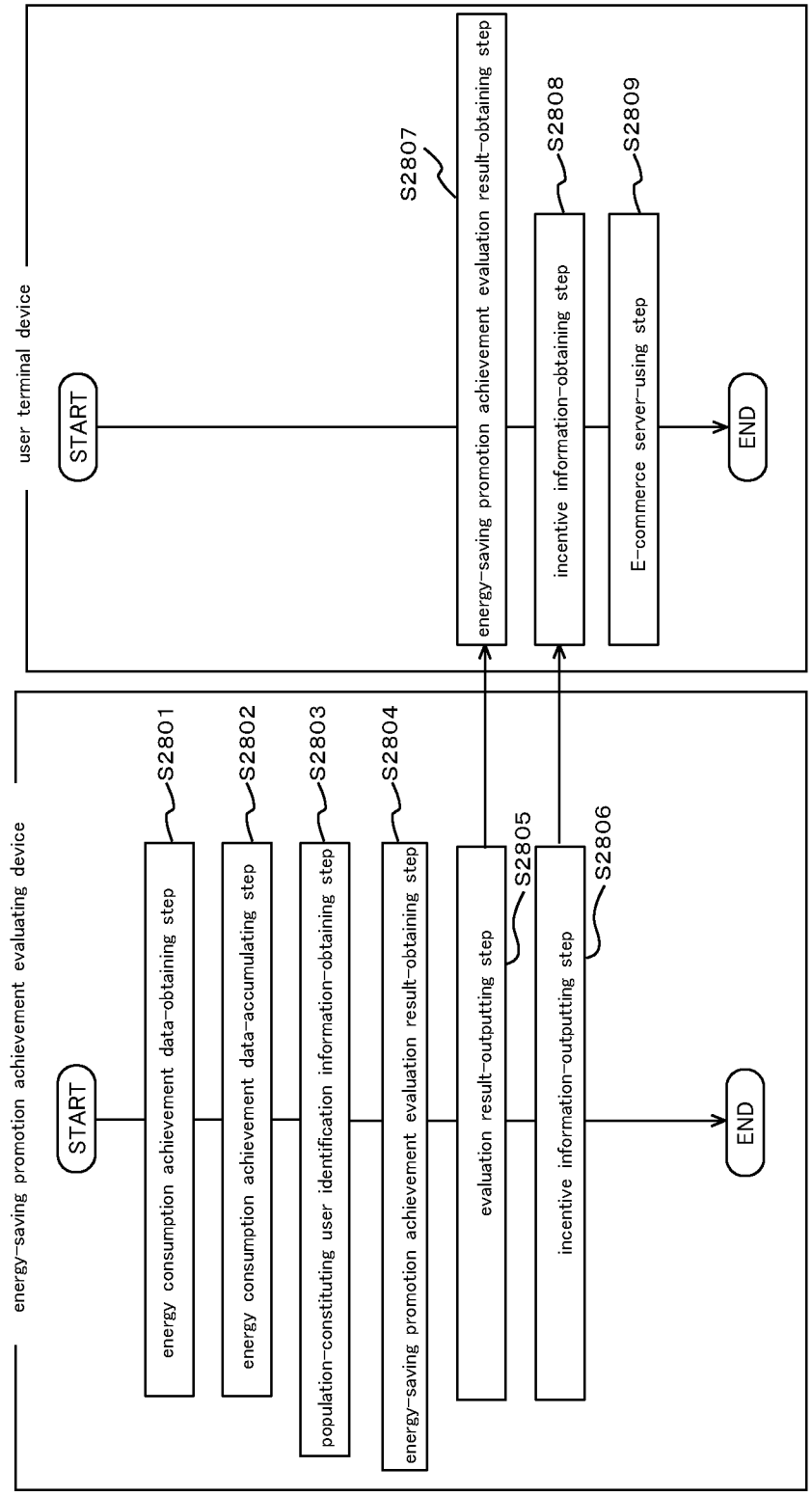
FIG. 28 is a view illustrating a flow of processing in using the energy-saving promotion achievement-evaluating device in the embodiment 10.

FIG. 28 is a diagram illustrating a flow of processing in using the energy-saving promotion system in this embodiment. As illustrated in FIG. 28, this is a processing method consisting of an energy consumption achievement data-obtaining step (S2801), an energy consumption achievement data-accumulating step (S2802), a population-constituting user identification information-obtaining step (S2803), an energy-saving promotion achievement evaluation result-obtaining step (S2804), an evaluation result-outputting step (S2805), an incentive information-outputting step (S2806), an energy-saving promotion achievement evaluation result-obtaining step (S2807), an incentive information-obtaining step (S2808), and an E-commerce server-using step (S2809). These processing methods are executed by the energy-saving promotion achievement-evaluating device and the user terminal device, the energy-saving promotion achievement-evaluating device comprising: the user comparison information-holding unit for holding the user comparison information in which the user identification information of the user working on energy saving is associated with comparison attributes, the comparison attributes being indexes suitable for mutual comparison on the basis of user attributes which are any one or more attributes of the business type, the business scale, the energy consumption area, the family structure, and the energy consumption achievement of the user; the energy-saving evaluation rule-holding unit for holding the energy-saving evaluation rule which is a rule for evaluating the energy-saving promotion achievement on the basis of the energy consumption achievement data; and the incentive information-holding unit for holding the energy-saving promotion achievement evaluation result and the incentive information associated with each other. This embodiment presupposes that the energy-saving promotion system further comprises the E-commerce server device for executing purchase/sales of articles and/or services via the Internet. In FIG. 28, each of the steps except the E-commerce server using step is similar to those in the embodiment 8. The E-commerce server-using step will be described below.

The "E-commerce server-using step" is a step of executing commercial transaction with the E-commerce server device in accordance with the obtained incentive information.

Conclusion

As a result, the user can actually receive the incentive.

The invention claimed is:

1. An energy-saving promotion achievement-evaluating device comprising:
   a memory configured to store a program and a plurality of data; and
   a processor configured to execute the program so as to:
   cause the memory to store user comparison information and user identification information as respective ones of the plurality of data, the user identification information corresponding to each of a plurality of users working on energy saving of a plurality resources, the user identification information being associated with comparison attributes in the user comparison information, the comparison attributes being indexes suitable for mutual comparison on the basis of user attributes which are any one or more attributes of a business type, a business scale, an energy consumption area, family structure, and an energy consumption achievement of the plurality of users;
   successively obtain energy consumption achievement data of the plurality of users in association with the user identification information and store the energy consumption achievement data into the memory, the energy consumption achievement data corresponding to the plurality of resources;
   accumulate the successively obtained energy consumption achievement data and generate accumulated energy consumption achievement data;
   generate an energy-saving evaluation rule that evaluates an energy-saving promotion achievement of the plurality of users on the basis of the accumulated energy consumption achievement data, the energy-saving evaluation rule including at least one weighting resource of the plurality of resources, the at least one weighting resource being considered when the processor evaluates the energy-saving promotion achievement of the plurality of users;
   generate population-constituting user identification information that identifies some users of the plurality of users, the some users constituting a population appropriate as mutual comparison targets in terms of the user attributes;
   obtain the accumulated energy consumption achievement data of each of the some users of the population;
   evaluate the accumulated energy consumption achievement data of the population by using the energy-saving evaluation rule and generate an energy-saving promotion achievement evaluation result of each of the some users of the population in association with the user identification information; and
   output the energy-saving promotion achievement evaluation results of the population in association with the user identification information by comparing between the energy-saving promotion achievement evaluation result of a first user of the some users in the population and the energy-saving promotion achievement evaluation result of a second user of the some users in the population, or by comparing between an index calculated on the basis of the energy-saving promotion achievement evaluation result of the first user in the population and an index calculated on the basis of the energy-saving promotion achievement evaluation result of the second user in the population,
   wherein the processor is configured to determine whether weighting is added to the at least one weighting resource based on one of a level of a demand of the plurality of resources of the plurality of users by seasons or a level of cleanness of the plurality of resources, and the cleanness is evaluated based on an emitting amount of harmful substances to environment when generating the plurality of resources.

2. The energy-saving promotion achievement-evaluating device according to claim 1,
   wherein the processor is further configured to:
   generate population-constituting group identification information for identifying, as comparison targets, some groups of a plurality of groups identified by group identification information for identifying a group constituted by a plurality of the user identification information as the comparison target;
   obtain the accumulated energy consumption achievement data of the some groups identified by the population-constituting group identification information; and
   evaluate the accumulated energy consumption achievement data of each of the some groups by using the energy-saving evaluation rule and generate an energy-saving promotion achievement evaluation result of each of the some groups in association with the group identification information.

3. The energy-saving promotion achievement-evaluating device according to claim 1,
   the memory is configured to store the user identification information in association with the user attributes which are any one or more attributes of the business type, the business scale, the energy consumption area, the family structure, and the energy consumption achievement of the plurality of users; and
   the processor is configured to add, delete, and modify the user attributes in association with the user identification information.

4. The energy-saving promotion achievement-evaluating device according to claim 1,
   wherein the energy-saving evaluation rule is a reduction rate comparison rule that evaluates the accumulated energy consumption achievement data by comparing an energy consumption reduction rate within a predetermined period of time.

5. The energy-saving promotion achievement-evaluating device according to claim 1,
   wherein the energy-saving evaluation rule is a reduction amount comparison rule that evaluates the accumulated energy consumption achievement data by comparing an energy consumption reduction amount within a predetermined period of time.

6. The energy-saving promotion achievement-evaluating device according to claim 1,
   the memory is configured to store the energy-saving promotion achievement evaluation results in association with incentive information; and
   the processor is configured to output the incentive information in association with the user identification information and/or group identification information on the basis of the energy-saving promotion achievement evaluation results obtained in association with the user identification information and/or the group identification information.

7. An energy-saving promotion system comprising:
a user terminal device associated with user identification information; and
the energy-saving promotion achievement-evaluating device according to claim 1.

8. The energy-saving promotion system according to claim 7,
wherein the processor of the energy-saving promotion achievement-evaluating device is configured to provide a corresponding one of the energy-saving promotion achievement evaluation results to the user terminal device.

9. The energy-saving promotion system according to claim 8,
wherein the memory of the energy-saving promotion achievement-evaluating device according to claim 1 is configured to store the energy-saving promotion achievement evaluation results in association with incentive information,
the energy-saving evaluation rule of the energy-saving promotion achievement-evaluating device according to claim 1 is a reduction rate comparison rule that evaluates the accumulated energy consumption achievement data by comparing an energy consumption reduction rate within a predetermined period of time, and
the user terminal device is configured to receive the incentive information from the energy-saving promotion achievement-evaluating device according to claim 1.

10. The energy-saving promotion system according to claim 9,
wherein the incentive information is configured to select a plurality of incentives by incentive identification information, and
the user terminal device is further configured to:
select the incentive identification information included in the received incentive information; and
output the selected incentive identification information.

11. The energy-saving promotion system according to claim 10, further comprising an E-commerce server device for executing purchase and sale of goods and/or services via the Internet, and
the user terminal device is further configured to execute a commercial transaction with the E-commerce server device in accordance with the received incentive information.

12. The energy-saving promotion system according to claim 7,
wherein the memory of the energy-saving promotion achievement-evaluating device according to claim 1 is configured to store the energy-saving promotion achievement evaluation results in association with incentive information,
the energy-saving evaluation rule of the energy-saving promotion achievement-evaluating device according to claim 1 is a reduction rate comparison rule that evaluates the accumulated energy consumption achievement data by comparing an energy consumption reduction rate within a predetermined period of time, and the user terminal device is configured to receive the incentive information from the energy-saving promotion achievement-evaluating device according to claim 1.

13. The energy-saving promotion system according to claim 12,
wherein the incentive information is configured to select a plurality of incentives by incentive identification information, and
the user terminal device is further configured to:
select the incentive identification information included in the received incentive information; and
output the selected incentive identification information.

14. The energy-saving promotion system according to claim 12, further comprising an E-commerce server device for executing purchase and sale of goods and/or services via the Internet, and
the user terminal device is further configured to execute a commercial transaction with the E-commerce server device in accordance with the received incentive information.

15. An operating method for causing a processor to execute a program stored in a memory, the method comprising executing on the processor the steps of:
successively obtaining energy consumption achievement data of a plurality of users in association with user identification information, the energy consumption achievement data corresponding to the plurality of resources;
accumulating the successively obtained energy consumption achievement data and generate accumulated energy consumption achievement data;
generating an energy-saving evaluation rule that evaluates an energy-saving promotion achievement of the plurality of users based on the accumulated energy consumption achievement data, the energy-saving evaluation rule including at least one weighting resource of the plurality of resources, the at least one weighting resource being considered when the energy-saving promotion achievement of the plurality of users is evaluated;
generating population-constituting user identification information that identifies some users of the plurality of users, the some users constituting a population appropriate as mutual comparison targets in terms of user comparison information in which the user identification information of the plurality of users working on energy saving is associated with comparison attributes, the comparison attributes being indexes suitable for mutual comparison based on user attributes which are any one or more attributes of a business type, a business scale, an energy consumption area, family structure, and an energy consumption achievement of the plurality of users;
obtaining the accumulated energy consumption achievement data of each of the some users of the population;
evaluating the accumulated energy consumption achievement data of the population by using the energy-saving evaluation rule and generate an energy-saving promotion achievement evaluation result of each of the some users of the population in association with the user identification information; and
outputting the energy-saving promotion achievement evaluation results of the population in association with the user identification information by comparing between the energy-saving promotion achievement evaluation result of a first user of the some users in the population and the energy-saving promotion achievement evaluation result of a second user of the some users in the population, or by comparing between an index calculated on the basis of the energy-saving promotion achievement evaluation result of the first user in the population and an index calculated on the basis of the energy-saving promotion achievement evaluation result of the second user in the population,
wherein the processor is configured to determine whether weighting is added to the at least one weighting resource based on one of a level of a demand of the plurality of resources of the plurality of users by seasons or a level of cleanness of the plurality of resources, and the cleanness is evaluated based on an emitting amount of harmful substances to environment when generating the plurality of resources.

16. A computer program product embodying computer readable instructions stored on a non-transitory computer-readable medium for causing a computer to execute a process by a processor so as to perform the steps of:
    successively obtaining energy consumption achievement data of a plurality of users in association with user identification information, the energy consumption achievement data corresponding to the plurality of resources;
    accumulating the successively obtained energy consumption achievement data and generate accumulated energy consumption achievement data;
    generating an energy-saving evaluation rule that evaluates an energy-saving promotion achievement of the plurality of users based on the accumulated energy consumption achievement data, the energy-saving evaluation rule including at least one weighting resource of the plurality of resources, the at least one weighting resource being considered when the energy-saving promotion achievement of the plurality of users is evaluated;
    generating population-constituting user identification information that identifies some users of the plurality of users, the some users constituting a population appropriate as mutual comparison targets in terms of user comparison information in which the user identification information of the plurality of users working on energy saving is associated with comparison attributes, the comparison attributes being indexes suitable for mutual comparison based on user attributes which are any one or more attributes of a business type, a business scale, an energy consumption area, family structure, and an energy consumption achievement of the plurality of users;
    obtaining the accumulated energy consumption achievement data each of the some users of the population;
    evaluating the accumulated energy consumption achievement data of the population by using the energy-saving evaluation rule and generate an energy-saving promotion achievement evaluation result of each of the some users of the population in association with the user identification information; and
    outputting the energy-saving promotion achievement evaluation results of the population in association with the user identification information by comparing between the energy-saving promotion achievement evaluation result of a first user of the some users in the population and the energy-saving promotion achievement evaluation result of a second user of the some users in the population, or by comparing between an index calculated on the basis of the energy-saving promotion achievement evaluation result of the first user in the population and an index calculated on the basis of the energy-saving promotion achievement evaluation result of the second user in the population,
    wherein the processor is configured to determine whether weighting is added to the at least one weighting resource based on one of a level of a demand of the plurality of resources of the plurality of users by seasons or a level of cleanness of the plurality of resources, and the cleanness is evaluated based on an emitting amount of harmful substances to environment when generating the plurality of resources.

\* \* \* \* \*